US012795110B2

(12) United States Patent
Phillips et al.

(10) Patent No.: US 12,795,110 B2
(45) Date of Patent: Nov. 10, 2026

(54) ULTRA-LOW-LATENCY VIDEO ENCODER AND RATE CONTROLLER

(71) Applicant: Adeia Guides Inc., San Jose, CA (US)

(72) Inventors: Christopher Phillips, Hartwell, GA (US); Tao Chen, Palo Alto, CA (US); Mareeta Mathai, San Jose, CA (US)

(73) Assignee: Adeia Guides Inc., San Jose, CA (US)

( * ) Notice: Subject to any disclaimer, the term of this patent is extended or adjusted under 35 U.S.C. 154(b) by 0 days.

(21) Appl. No.: 18/999,193

(22) Filed: Dec. 23, 2024

(65) Prior Publication Data

US 2026/0181158 A1 Jun. 25, 2026

(51) Int. Cl.

*H04N 19/146* (2014.01)
*H04N 19/124* (2014.01)
*H04N 19/164* (2014.01)
*H04N 19/172* (2014.01)
*H04N 19/436* (2014.01)

(52) U.S. Cl.

CPC ......... *H04N 19/146* (2014.11); *H04N 19/124* (2014.11); *H04N 19/164* (2014.11); *H04N 19/172* (2014.11); *H04N 19/436* (2014.11)

(58) Field of Classification Search

CPC .. H04N 19/146; H04N 19/124; H04N 19/164; H04N 19/172; H04N 19/436
See application file for complete search history.

(56) References Cited

U.S. PATENT DOCUMENTS

| | | | | |
|---|---|---|---|---|
| 5,929,914 A | | 7/1999 | Normand | |
| 10,567,775 B2 | | 2/2020 | McAllister | |
| 12,593,043 B2 | | 3/2026 | Chen et al. | |
| 2010/0225655 A1* | | 9/2010 | Tung | H04N 19/645 382/233 |
| 2012/0147958 A1 | | 6/2012 | Ronca et al. | |
| 2015/0003515 A1* | | 1/2015 | Normile | H04N 19/164 375/240.02 |
| 2016/0173875 A1 | | 6/2016 | Zhang et al. | |
| 2023/0009707 A1* | | 1/2023 | Pan | H04N 19/146 |
| 2024/0114162 A1* | | 4/2024 | Maharana | H04N 19/21 |

(Continued)

FOREIGN PATENT DOCUMENTS

WO WO-2014082680 A1 * 6/2014 ........... H04N 19/124

OTHER PUBLICATIONS

"Neural Network Based Rate Control for Versatile Video Coding"—Mao et al., IEEE Transactions on Circuits and Systems for Video Technology, vol. 33, No. 10, Oct. 2023 (Year: 2023).*

(Continued)

*Primary Examiner* — Mainul Hasan
(74) *Attorney, Agent, or Firm* — HG LAW LLP

(57) ABSTRACT

Ultra-low-latency video encoding and rate control methods and systems are configured to minimize latency in applications such as cloud gaming and real-time communication. The methods and systems enhance complexity estimation and buffer management. A dynamic rate controller architecture adjusts encoding based on complexity and buffer status, ensuring consistent bitrate and quality. Deep learning models predict optimal encoder instances and quantization parameter (QP) distributions, improving encoding efficiency. System architectures, pseudocode for bitrate and QP calculations, and training and testing phases for deep learning models are also provided.

20 Claims, 28 Drawing Sheets

(56) References Cited

U.S. PATENT DOCUMENTS

| | | | | |
|---|---|---|---|---|
| 2024/0171741 | A1 | 5/2024 | Chen et al. | |
| 2024/0305789 | A1 | 9/2024 | Vairavan et al. | |
| 2024/0373049 | A1 * | 11/2024 | Stockhammer | H04N 19/436 |
| 2025/0209676 | A1 * | 6/2025 | Huang | G06V 10/82 |

OTHER PUBLICATIONS

"Learning-Based Rate Control for High Efficiency Video Coding"—Chen et al., https://doi.org/10.3390/s23073607; Published: Mar. 30, 2023 (Year: 2023).*
U.S. Appl. No. 18/999,203, filed Dec. 23, 2024, Mareeta Mathai.
"Conditional Variational Autoencoders," Deepgram, Retrieved from https://deepgram.com/ai-glossary/conditional-variational-autoencoders, Jun. 24, 2024, 29 pages.
"Feed Forward Neural Network," DeepAI, Retrieved from https://deepai.org/machine-learning-glossary-and-terms/feed-forward-neural-network, Retrieved on Jan. 24, 2025, 4 pages.
"Rate Control and H.264," PixelTools, available online at <https://www.pixeltools.com/rate_control_paper.html#:~:text=264%20Rate%2DDistortion%20Optimization%20and,broken%20down%20in%20numerous%20ways.>, retrieved on Jan. 27, 2025, 9 pages.
"SCReAM (Self-clocked rate adaptation for multimedia)," available online at <https://www.ietf.org/archive/id/draft-johansson-ccwg-rfc8298bis-screamv2-00.html#name-sender-transmission-control>, Mar. 4, 2024, 25 pages.
"WebRTC," Retrieved from https://webrtc.org/, Retrieved on Jan. 24, 2025, 2 pages.
Gao. et al., "Simvp: Simpler yet better video prediction," Proceedings of the IEEE/CVF conference on computer vision and pattern recognition, 2022, 11 pages.
Ou., "Variational AutoEncoder, and a bit," Medium, Retrieved from https://medium.com/@outerrencedl/variational-autoencoder-and-a-bit-kl-divergence-with-pytorch-ce04fd55d0d7, Jan. 1, 2023, 22 pages.
U.S. Appl. No. 18/622,467, filed Mar. 29, 2024, Title: Optimized Fast Video Frame Repair For Extreme Low Latency RTP Delivery.
Xu. et al., "Masked loss residual convolutional neural network for facial keypoint detection," 10th EAI International Conference on Mobile Multimedia Communications, 2017, pp. 234-239.
Yu. et al., "Efficient and information-preserving future frame prediction and beyond," International Conference on Learning Representations, 2020, 14 pages.
Zhang. et al., "Extdm: Distribution extrapolation diffusion model for video prediction," Proceedings of the IEEE/CVF Conference on Computer Vision and Pattern Recognition, 2024, 11 pages.
U.S. Appl. No. 18/999,938, filed Dec. 23, 2024. Title: Machine Learning for Ultra-Low-Latency Video Encoder and Rate Controller.
U.S. Appl. No. 18/999,938, filed Dec. 23, 2024. Title: Residue Frame Prediction in Video Compression for Low-Latency and Ultra-Low-Latency Streaming.
"FAQ—Boosteroid Cloud Gaming," Boosteroid, boosteroid.com/faq/, accessed Nov. 10, 2022 (3 pages).
"Internet connections speed recommendations," Netflix, help.netflix.com/ennode/306, accessed Nov. 10, 2022 (2 pages).
"System Requirements for Cloud Gaming | NVIDIA GeForce NOW," NVIDIA, nvidia.com/en-us/geforce-now/system-reqs/, accessed Nov. 10, 2022 (4 pages).
Park, S., et al., "Efficient QP-per-frame Assignment Method for Low-delay HEVC Encoder," Journal of Broadcast Engineering (2016) 21:3: 349-356 (Korean original with English abstract (8 pages), and full English translation of the same (8 pages)).
Stadia—One place for all the ways we play, stadia.google.com accessed Sep. 7, 2022 (1 page).
Sullivan, G., et al., "Joint Model Reference Encoding Methods and Decoding Concealment Methods," 9th JVT Meeting, San Diego, CA, 2003 (39 pages).
Theoretical discussion on achieving rate control encoding, PixelTools, pixeltools.com/rate_control_paper.html, accessed Nov. 10, 2022 (9 pages).

* cited by examiner

1000

```
If (encoderInstances == 1) {
  Set Encoder[1] bitrate = cappedBitrate;
} else if (encoderInstances > 1)
  encoderBitrateStep = (cappedBitrate - minimum
  bitrate)/(numberOfEncoderInstances-1).
  n=1;
  encoderBitrate = minimum_Bitrate;
  Set Encoder[n] bitrate = encoderBitrate;
While (n <= encoderInstances-1) do {
  n=n+1;
  encoderBitrate = encoderBitrate +
  encoderBitrateStep;
  set Encoder[n] bitrate = encoderBitrate;
  }
  n=n+1;
  set Encoder[n] bitrate = cappedBitrate;
  requiredBitrateForPicture = ((pictureSizeInBytes x
  8)/(1/framerate))/bufferModel_Level
```

FIG. 10

1100

```
If (encoderInstances == 1) {
        Encoder[1] QP = QP;
} else if (encoderInstances > 1) {
    if (currentCalculatedQP > maxQP -
numberOfInstantiatedEncoders) {
        currentCalculatedQP = maxQP-
    numberOfInstantiatedEncoders
    }
    encoderQPStep = (maxQP-
currentCalculatedIncomingQP)/numberOfEncoderInstances-
1
        n=numberOfInstantiatedEncoders
        encoderQP = maxQP
        Set Encoder[n] = encoderQP
        n = n - 1
        While ( n > 1 ) do {
            encoderQP = encoderQP - encoderQPStep
            set Encoder[n] = encoderQP;
            n = n - 1;
        }
        set Encoder[n] = currentCalculatedQP
```

FIG. 11

1200

```
If (numberOfAllowedEncoderInstances == 1) {
    Set Encoder[1] bitrate = cappedBitrate;
} else if (numberOfAllowedEncoderInstances > 1)
    base = (minimum bitrate/cappedBitRate) ^ (1/
(numberOfAllowedEncoderInstances - 1))
    n=1;
    encoderBitrate = cappedBitrate;
    Set Encoder[n] bitrate = encoderBitrate;
While (n <= encoderInstances-1) do {
    n=n+1;
    encoderBitrateStep = cappedBitRate * (base ^
(numberOfAllowedEncoderInstances - 1-
n))
    encoderBitrate = cappedBitrate -
encoderBitrateStep;
    set Encoder[n] bitrate = encoderBitrate;
}
```

FIG. 12

ULTRA-LOW-LATENCY VIDEO ENCODER AND RATE CONTROLLER

FIELD OF THE DISCLOSURE

The present disclosure relates to content delivery, including ultra-low-latency content (e.g., video) delivery, processing, and rendering.

SUMMARY

In order to achieve ultra-low-latency content delivery, various approaches have been attempted for rate control and video compression including adjusting encoder parameters for various standards, improving video compression for cloud gaming with adaptive bitrate control, using algorithms for low-latency interactive video services, and using a standard for real-time communication in web applications. However, these approaches have limitations.

As provided in the detailed description below, the present inventors identify several technical problems and challenges in video encoding for ultra-low-latency environments, particularly when maintaining a capped bitrate, and they herein provide technical solutions to these and other problems.

To help address the limitations and problems of the various approaches, in some embodiments, methods and systems for controlling video encoding in an encoding system for delivering content (e.g., to a client device) comprise several steps. For example, one or more frame-synced parallel encoders are instantiated based at least in part on the complexity of a picture, a portion of the picture, or a residue of the picture, and the amount of motion from picture to picture over a look-back period. Additionally, a range of initial quantization parameter (QP) values is provided to the instantiated frame-synced parallel encoders. Further, each picture is encoded by the instantiated frame-synced parallel encoders into an encoded picture. Moreover, the size of each encoded picture is calculated. Based at least in part on the size of each encoded picture, one encoded picture is selected. Furthermore, the selected encoded picture is delivered.

The methods and systems also include selecting which encoded picture to deliver based at least in part on the highest available picture quality and the lowest available latency of the picture encoding or a derivative of the speed of delivery of the encoded picture.

Initial QP values are determined based at least in part on a complexity estimation system and the size of a virtual buffer model. Additionally, the size of the virtual buffer model is controlled through an application programming interface (API) and adjusted based at least in part on changing latency requirements. The API is configured with predefined latency thresholds, and the size of the virtual buffer model is controlled based on these thresholds.

The size of the virtual buffer model is dynamically adjusted based on real-time feedback from the client device. The number of instantiated frame-synced parallel encoders is directly proportional to the determined complexity and the amount of motion from picture to picture.

The methods and systems further include monitoring encoding performance and adjusting the initial QP values to optimize encoding performance. A rate controller in the encoding system prioritizes pictures for delivery to maintain the highest possible picture quality at the lowest available latency. The rate controller also predicts and controls future encoding requirements based on historical data of picture sizes. Additionally, the rate controller switches between different encoding profiles based on the complexity and the amount of motion from picture to picture.

In some embodiments, methods and systems for ultra-low-latency encoding and delivering video data (e.g., to a client device) comprise several steps. For example, encoding setting parameters, a number of encoders, a client device decoder buffer size, and a demanded capped bitrate value are received. Additionally, one or more of a plurality of encoder instances are instantiated based at least in part on the number of encoders. Further, a respective bitrate value is assigned to each encoder instance, where the bitrate value is distributed between an absolute minimum bitrate value and the demanded capped bitrate value. Moreover, video data is encoded using the instantiated encoder instances, each having the assigned respective bitrate value, to generate encoded pictures. Furthermore, an optimal encoded picture is selected from the encoded pictures based at least in part on the client device decoder buffer size and the demanded capped bitrate value. Additionally, the optimal encoded picture is transmitted.

The encoding setting parameters may include resolution, framerate, and group of pictures (GOP) structure. Further, the number of encoder instances can be dynamically updated through an API or user interface. The bitrate value assigned to each encoder instance is calculated by dividing the difference between the demanded capped bitrate value and the absolute minimum bitrate value by the number of encoder instances minus one. Additionally, the state of each encoded picture from each encoder instance is sent to an encoded picture selector.

The optimal encoded picture is selected based at least in part on the size of the picture, framerate, buffer model, or allocated bandwidth. Further, the buffer model and picture QP values of each encoder instance are adjusted based at least in part on the state of a coded picture buffer of the client device. An ultra-low-latency delivery system transmits the optimal encoded picture via the internet. Also, additional encoder instances can be instantiated from an encoder instance pool during an encoder session. The decoded pictures are stored and/or updated in a common decoded picture buffer shared by the encoder instances.

In some embodiments, methods and systems for encoding video for delivery (e.g., to a client device) using an encoder system comprise several steps. For example, uncompressed video and encoding parameters including a desired number of encoder instances are received. Additionally, a plurality of encoder instances is initialized based at least in part on the desired number of encoder instances. Further, an initial QP value is set based at least in part on a desired and/or maximum bitrate value. Moreover, the video is encoded using the plurality of encoder instances, with each encoder instance generating encoded video pictures. Furthermore, an encoded video picture is selected from the plurality of encoded video pictures based at least in part on a comparison of the encoded video picture size to a required bitrate value for the video picture. Additionally, the selected encoded video picture is transmitted.

The methods and systems also comprise receiving a picture buffer size of a decoder of the client device and adjusting the encoding based at least in part on the picture buffer size. The initial QP value is set by a QP initializer and adjusted by a ΔQP-limiter. The plurality of encoder instances comprises a first encoder instance and an n-th encoder instance, each configured to receive a QP value with an offset. Further, the uncompressed video is preprocessed before the encoding.

The selection of the encoded video picture is performed by an encoded picture selection function based at least in part on the size of the encoded video picture being closest to the required bitrate value without exceeding the required bitrate value. Additionally, a state of the encoder for the selected encoded video picture is transmitted back to each encoder instance to maintain synchronization. An ultra-low-latency delivery system is configured to set a capped bitrate value based at least in part on an estimated amount of bandwidth. The number of encoder instances is dynamically adjusted based at least in part on feedback regarding the desired maximum latency. The encoding parameters may include resolution, framerate, and GOP structure.

In some embodiments, methods and systems for controlling video encoding latency in a video encoding system for delivering content (e.g., to a client device) comprise several steps. For example, a latency request is received from an external system. Additionally, a required size of a buffer is determined based at least in part on the latency request. Further, a buffer size of a modeled buffer in the video encoding system is adjusted. Moreover, video encoding and video source rendering are paused to allow the buffer to drain or fill to the required buffer size. Furthermore, video encoding and video source rendering are resumed once the buffer has reached the required size. Additionally, encoded video data is transmitted.

The latency request may be received from a video game engine as the external system. Also, the latency request may be received from a simultaneous localization and mapping (SLAM) camera system as the external system. Further, a request to pause and/or resume video rendering is transmitted to a video source. Moreover, a flush buffer request is transmitted to the modeled buffer.

The video encoding system may comprise multiple encoders, and additional encoders are instantiated based at least in part on the latency request. Further, a deep learning model is used to predict an optimal number of encoder instances based at least in part on the complexity of a picture to be encoded, a portion of the picture, or a residue of the picture. Additionally, a deep learning model is used to determine a QP range for each encoder.

The adjustment of the buffer size may comprise rendering black frames or a still image to fill the buffer. Further, a force instantaneous decoder refresh (IDR) request is transmitted to all encoders to decode the next picture without dependency on flushed encoded pictures.

In some embodiments, methods and systems for optimizing video encoding in a multi-encoder system comprise several steps. For example, a deep learning-based computer vision model determines an optimal number of encoder instances based at least in part on the complexity of a picture to be encoded, a portion of the picture, or a residue of the picture. Additionally, a QP range required for the encoder instances is determined. Further, QP values for a rate controller are set across each of the instantiated encoders based at least in part on the determined QP range.

The deep learning-based computer vision model may comprise a hybrid model configured to predict the optimal number of encoder instances by processing a residual picture of a current timestamp using an unsupervised conditional neural network. The unsupervised conditional neural network is configured to accept conditional parameters comprising encoder settings and video genre, and provide an estimate of the complexity in a latent space. A supervised model predicts the optimal number of encoder instances based at least in part on the learned latent representations from the unsupervised conditional neural network.

The deep learning-based computer vision model is configured to predict an optimal distribution of QPs among the encoder instances. The model is trained using a supervised model that accepts a predicted number of encoder instances and an initial QP as input features. The supervised model outputs the QP value for each encoder instance.

Methods and systems also include a system for long-term video prediction to output predicted pictures and residual pictures. The system for long-term video prediction comprises a video prediction module and a residual latent learning module. The video prediction module comprises a deep learning-based long-term prediction model configured to predict P-frames in a GOP and cache the predicted P-frames in a buffer.

A decision to choose or skip an encoder instance is based at least in part on a mean squared error (MSE) of the predicted P-frames. The buffer is reset if the MSE of a current predicted picture exceeds a threshold.

In some embodiments, methods and systems for training an encoder instances prediction model comprise several steps. For example, model training is initiated by setting up a model training environment, loading a dataset, initializing model parameters, and configuring a training process. Additionally, a residual picture is processed to capture motion and identify changes over time. Further, conditional parameters comprising bandwidth, resolution, and frames per second are set. Moreover, input data is encoded based at least in part on the conditional parameters into a latent space. Furthermore, the encoded data is processed through a fully connected layer to learn complex patterns and relationships. Additionally, a number of encoder instances required (e.g., for a high complexity picture, e.g., at a scene change) is determined based at least in part on the complexity of the residual picture. The data is then reconstructed from the latent space representation using a decoder. Finally, the model training is finalized by saving the trained model and preparing the trained model for deployment or further evaluation.

The residual picture is a difference between consecutive pictures in a sequence. The conditional parameters configure the model to specific conditions and requirements to ensure optimal performance under varying scenarios. The latent space is a lower-dimensional representation of the data that captures selected features of the data. The fully connected layer applies a series of transformations to the data from the latent space. The number of encoder instances is estimated based at least in part on the complexity of each video picture, or a portion of each video picture. The decoder transforms lower-dimensional data back into the original form or a desired output format.

Methods and systems also comprise training the model using a combined loss function that comprises reconstruction loss and Kullback-Leibler (KL)-Divergence loss. The reconstruction loss measures the ability of the model to reconstruct the input data. The KL-Divergence loss regularizes the latent space by ensuring the encoded latent space distribution is close to a normal distribution.

In some embodiments, methods and systems for encoding video using a multiple encoder system comprise several steps. For example, uncompressed video pictures are received from a video source. Additionally, the uncompressed video pictures are processed into selected encoded picture bits to be sent (e.g., to a client device.). Further, a residual picture is fed to a pretrained variational autoencoder (VAE) to predict a number of encoder instances. Moreover, a pretrained QP distribution prediction model is used to predict QP for each encoder instance. Furthermore, a number of encoders are instantiated based at least in part on the predicted number of encoder instances. Additionally, the predicted QPs are distributed to the instantiated encoders. The uncompressed video pictures are then encoded using the instantiated encoders and the distributed QPs. Encoded pictures are selected from the encoded outputs of the instantiated encoders. The selected encoded picture bits are transmitted. The QPs are adjusted based at least in part on feedback from a virtual buffer model and conditional parameters.

The video source may be a game engine. The pretrained VAE receives conditional parameters comprising bandwidth, genre of a game of the game engine, resolution, and frames per second. The pretrained QP distribution prediction model is fine-tuned based at least in part on feedback from an encoded picture selection module. The virtual buffer model communicates buffer size and buffer fullness to the pretrained VAE and a rate controller of the multiple encoder system. The rate controller adjusts an initial QP based at least in part on the buffer fullness.

Methods and systems also comprise generating future pictures at a deep learning-based long-term prediction module based at least in part on past pictures. The deep learning-based long-term prediction module may comprise a conditionally reversible architecture, a simple video prediction architecture, or a distribution extrapolation diffusion model architecture. The deep learning-based long-term prediction module is trained based at least in part on a MSE loss between predicted and actual pictures. A decision to instantiate encoder instances is based at least in part on the MSE of the predicted pictures.

In some embodiments, methods and systems for training a long-term prediction module comprise several steps. For example, model training is initiated by setting up a training environment, loading a dataset, initializing model parameters, and configuring the training process. Additionally, past reference pictures are received to capture temporal dependencies for long-term video prediction. Further, predicted pictures representing anticipated future states of the video are generated based at least in part on the past reference pictures. Moreover, original pictures are received for comparison with the predicted pictures. Furthermore, differences between the original pictures and the predicted pictures are calculated to identify residual pictures. Additionally, predictions of the model are refined based at least in part on the residual picture. Conditional parameters comprising bandwidth, resolution, and frames per second are received. Input data is encoded based at least in part on the conditional parameters. The encoded data is mapped into a latent space. The data from the latent space is processed through a fully connected layer to learn complex patterns. A number of encoder instances is determined. The data is reconstructed from the latent space representation through a decoder. Finally, the model training is finalized by saving the trained model and preparing the trained model for deployment.

The initiating model training further comprises configuring hyperparameters for the prediction model. The receiving past reference pictures comprises preprocessing the pictures to enhance temporal feature extraction. The generating predicted pictures comprises a recurrent neural network (RNN). The receiving original pictures comprises synchronizing the original pictures with the predicted pictures for accurate comparison. The calculating differences comprises an MSE metric to quantify residual pictures. The refining the prediction of the model comprises iterative training to minimize the residual pictures. The conditional parameters are normalized before the encoding. The mapping into a latent space uses a VAE for dimensionality reduction. The reconstructing data comprises applying a deconvolutional neural network (DCNN) for data reconstruction.

In some embodiments, methods and systems for testing a long-term prediction module comprise several steps. For example, a testing environment is initialized. Additionally, downsampled reference video pictures from previous timestamps are received. Further, future video pictures are predicted using a pretrained long-term video prediction model. Moreover, predicted future video pictures are generated. Furthermore, the predicted future video pictures are stored in a buffer. Additionally, an actual downsampled picture for a current timestamp is obtained. An MSE between the predicted picture and the actual picture is calculated. Whether the MSE is greater than or equal to a threshold is determined. The current configuration is maintained if the MSE is within acceptable limits. A residual picture representing the difference between the predicted picture and the actual picture is calculated. The residual picture is processed using a pretrained autoencoder. An entropy of a latent space representation of the residual picture is calculated. A complexity score based at least in part on the entropy is generated. A QP range based at least in part on the complexity score is estimated. The testing process is finalized.

The initializing of the testing environment further comprises setting up configurations and loading the pretrained long-term video prediction model and the pretrained autoencoder. The receiving of downsampled reference video pictures comprises obtaining pictures from time stamps F(t−x) to F(t−1). The predicting of future pictures with the pretrained long-term video prediction model comprises forecasting future pictures based at least in part on learned temporal patterns. The generating of predicted future video pictures comprises generating pictures for time stamps F(t) to F(t+n). The storing of the predicted future video pictures in the buffer comprises preparing the pictures for further processing. The calculating of the MSE comprises comparing the predicted picture at the current time stamp with the actual downsampled picture. The determining of whether the MSE is greater than or equal to the threshold comprises evaluating the accuracy of the prediction. The maintaining of the current configuration comprises continuing with the previous number of encoder instances and QP range if the MSE is within acceptable limits. The finalizing of the testing process comprises saving the results and preparing the results for further evaluation or deployment.

Related devices, systems, non-transitory computer-readable media, and the like are provided for ultra-low-latency content delivery, processing, and/or rendering.

The present invention is not limited to the combination of the elements as listed herein and may be assembled in any combination of the elements as described herein. These and other capabilities of the disclosed subject matter will be more fully understood after a review of the following figures, detailed description, and claims.

BRIEF DESCRIPTIONS OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and should not be considered limiting of the breadth, scope, or applicability of these concepts. It should be noted that for clarity and ease of illustration these drawings are not necessarily made to scale.

The embodiments herein may be better understood by referring to the following description in conjunction with the accompanying drawings in which like reference numerals indicate identical or functionally similar elements, of which:

FIG. 10 is a listing of pseudocode for calculating bitrate steps, in accordance with some embodiments of the disclosure;

FIG. 11 is a listing of pseudocode for setting QP values per encoder for two or more encoders, in accordance with some embodiments of the disclosure;

FIG. 12 is a listing of pseudocode for bit rate step calculation, in accordance with some embodiments of the disclosure;

Figure 1:
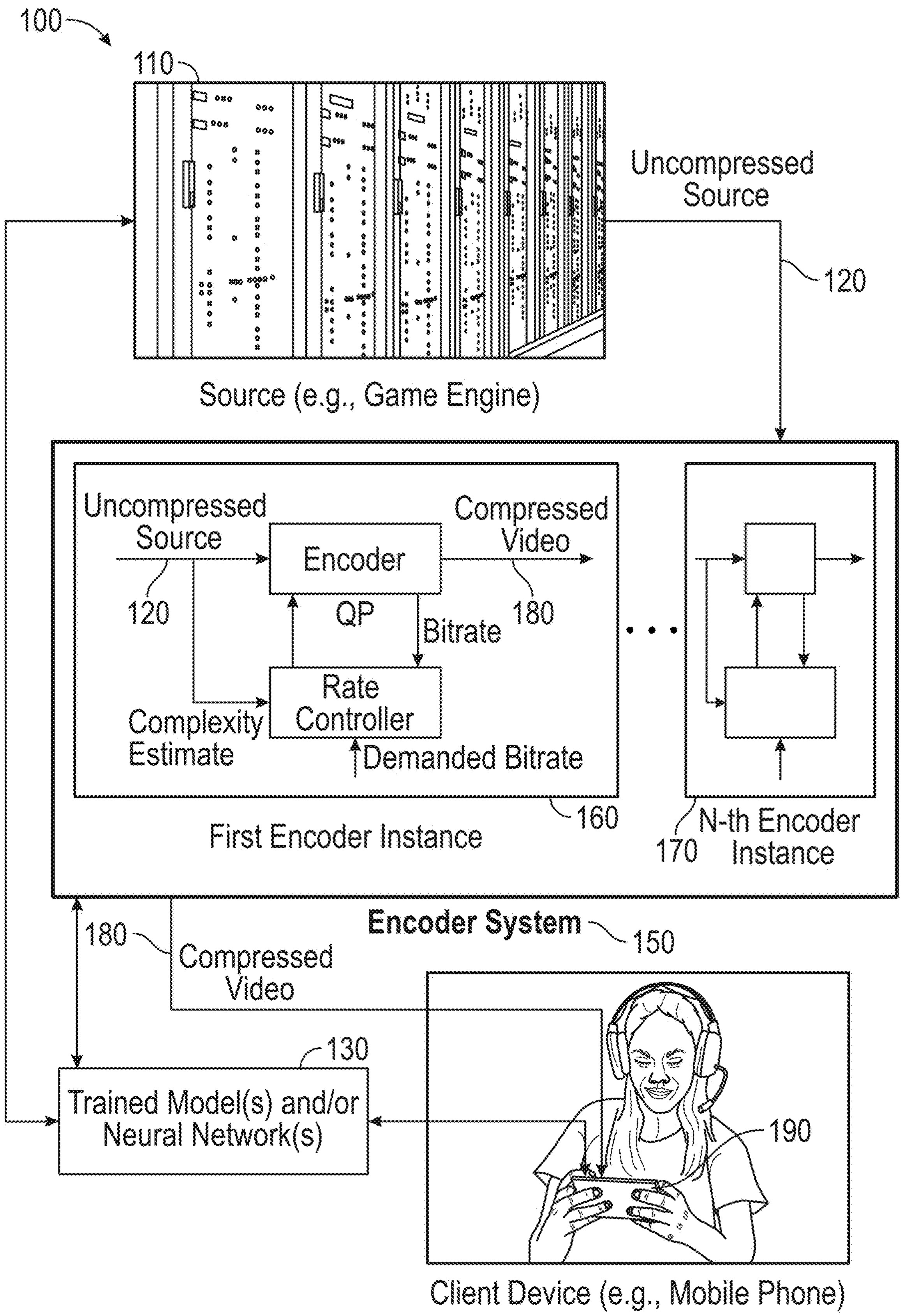
FIG. 1 depicts a system including a source, an encoder system with a rate controller system per encoder and one or more encoder instances, and a client, in accordance with some embodiments of the disclosure.

The drawings are intended to depict only typical aspects of the subject matter disclosed herein, and therefore should not be considered as limiting the scope of the disclosure. Those skilled in the art will understand that the structures, systems, devices, and methods specifically described herein and illustrated in the accompanying drawings are non-limiting exemplary embodiments and that the scope of the present invention is defined solely by the claims.

DETAILED DESCRIPTION

With the increase of cloud rendered content, especially, for example, in cloud gaming and extended reality (XR) applications and cloud based simultaneous localization and mapping (SLAM) solutions for robotics and XR, demand for optimized encoding and transport in extreme low-latency cases is also increasing. Building on earlier work (by the present inventors and their colleagues) optimizing low-latency encoding and transport for cloud rendered interactive content, as detailed herein, optimized packet loss is provided, e.g., in extreme low-latency cases and/or in a cloud rendered environment.

Methods and systems are provided for video encoding for ultra-low-latency environments. The methods and systems overcome numerous technical challenges, such as a problem associated with a large size of Intra pictures compared to Predicted and Bidirectional pictures (i.e., P-pictures and B-pictures), e.g., during high-motion scenes or instant scene changes, which can cause potentially problematic spikes in bandwidth requirements to get the encoded picture delivered in time. It is noted, in video compression, and as used herein, a “frame” generally refers a complete image in a video sequence. It represents a single point in time and is composed of all the scan lines (rows of pixels) that make up the image. For example, in a video with a resolution of 1920×1080, each frame consists of 1080 lines of 1920 pixels each. As used herein, a "picture" is a more general term. It can refer to either a frame or a field. For example, a field is half of a frame, containing either the odd-numbered or even-numbered scan lines. That is, in some contexts, while every frame is a picture, not every picture is a full frame. Also, Intra-coded (I-frames) are encoded independently and contain a complete image, serving as reference points for decoding other frames. Predicted frames (P-frames) store only the changes from previous I-frames or P-frames, using motion vectors to predict the current frame based on past frames, thus reducing data. Bidirectional predicted frames (B-frames) use both previous and subsequent frames for prediction, offering the highest compression efficiency by leveraging data from surrounding frames. The terms I-pictures, P-pictures, and B-pictures are often used interchangeably with I-frames, P-frames, and B-frames, with "picture" referring to either a full frame or a field in interlaced video. That is, I-frames provide complete images, P-frames encode changes from previous frames, and B-frames use both past and future frames for maximum compression efficiency. It is noted that P-pictures can be larger than I-pictures at a scene change as demonstrated herein. Ultimately, at a scene change, any I-picture, P-picture, or B-picture can be relatively large. Also, for example, at a scene change, if an I-frame is required, encoding the I-frame to a P-frame may result in a relatively large size.

As used herein, for example, "complexity" may refer to at least one of the complexity of a picture or frame, a portion of the picture or frame, a derivative of the picture or frame, a calculation (e.g., residue, or the like) related to one or more pictures or frames, the computational effort required for encoding or decoding processes, the variability in motion or texture within a frame, the algorithmic intricacy involved in compression techniques, combinations of the same, or the like. Also, for example, differences (e.g., amounts of differences) from one picture to the next results in an encoding complexity or encoding difficulty. That is, relatively easy encodings differ little from one picture to the next; whereas, relatively difficult encodings have major differences from one picture to the next. Further, for example, in the context of video encoding, various types of calculations are performed to compress and encode video data efficiently. These include at least one of motion estimation, motion compensation, transform coding, quantization, entropy coding, rate control, intra-frame prediction, inter-frame prediction, deblocking filtering, residual calculation, complexity estimation, combinations of the same, or the like.

In a non-limiting example, in a 4K 60 Hz AVC encoded video, a scene change can result in a Predicted picture size of around 600 KB, necessitating a bandwidth spike to approximately 288 Mbps to deliver within 16.67 ms. This is problematic in low-latency scenarios with minimal buffering. The architecture of a video encoder includes components like intra and inter prediction, mode selector, transformation and quantization, and entropy coding (e.g., context-adaptive variable-length coding (CAVLC)). The rate controller plays a crucial role in managing bitrate and quality by dynamically adjusting encoding parameters based on complexity estimation, bit allocation models, and buffer status. However, maintaining a consistent bitrate is challenging with prior approaches due to the unpredictable nature of video content and the requirement for real-time adjustments. The rate-quantization model describes the relationship between the QP, actual bitrate, and encoding complexity, but QP only affects the detail in transformed residuals, not overhead or motion vectors. Complexity estimation using the mean average difference (MAD) of prediction error is crucial but challenging, especially at scene changes. The QP-limiter helps stabilize quality by limiting QP changes between frames. The virtual buffer model simulates the decoder buffer to manage bitrate variations, requiring careful management of buffer capacity and fullness. For example, initializing QP based on demanded bits per pixel is configured to set an appropriate quality level from the start. GOP bit allocation and basic unit bit allocation are used to manage bitrate across groups of pictures and smaller units within frames. As developed by some of the present inventors, for example, very large pictures and dropped packets are controlled by generating I-frames and using slicing or tiling to distribute the load over multiple frame slots; whereas, for example, rate controllers with prior approaches struggled to maintain required picture sizes for low buffer models, leading to poor quality or oversized frames, necessitating further measures to repair the stream.

In some embodiments, the following approaches are incorporated and/or improvements are made to one or more of the approaches described as follows for video encoding and prediction. For example, at least one of Advanced Video Coding (AVC) or Moving Picture Experts Group (MPEG)-4 Part 10 (i.e., H.264), MPEG-2 standards, advanced neural network models like CrevNet and ML-ResNet, are incorporated and/or improved in terms of latency, complexity, overfitting, and implementation requirements.

For example, improvements are made to encoders for video encoding rate control in accordance with the AVC or H.264 and MPEG-2 standards, adjusting parameters like quantization and bitrate. Also, for example, the present methods and systems are provided for any encoder, e.g., AVC, High Efficiency Video Coding (HEVC), Versatile Video Coding (VVC), VP9, AV1, or the like.

For example, improvements are made to Self-Clocked Rate Adaptation for Multimedia (SCREAM), which aims for low latency and high throughput in interactive video services using a hybrid congestion control algorithm. SCREAM includes frequent feedback and handling of clock drift. It is noted that a system like SCREAM sets an encoding bitrate based on an estimated bandwidth. This would be a bandwidth set on the encoder's rate controller. In some embodiments, a low-latency rate controller is provided, which selects a picture that is encoded with a QP value, which is the best encoded picture that can be delivered in time based on a given bitrate at that point in time. That is, in some embodiments, an enhancement is made in a system such as SCREAM. That said, the various embodiments presented herein are not limited to a system like SCREAM.

For example, improvements are provided to Web Real-Time Communication (WebRTC), which provides real-time communication in web applications. WebRTC supports video, voice, and data.

As provided in detail herein, for example, improvements are made to conditional variational autoencoders (CVAEs), which generate data conditioned on attributes. Also, for example, as provided in detail herein, improvements are made to variational autoencoders (VAEs), which include probabilistic modeling and KL divergence. Further, for example, improvements are made to feedforward neural networks (FNNs), which are effective in pattern recognition and classification. In addition, for example, improvements are made to CrevNet, which uses a reversible network for video prediction and integrates 3D convolutions. Moreover, for example, improvements are made to Sim VP, which is a simple convolutional neural network (CNN)-based model for video prediction, which avoids complex modules and reduces training costs. Furthermore, for example, improvements are made to ExtDM, which predicts video frames by extrapolating motion cues, balances efficiency and accuracy, and utilizes a layered distribution adaptor and motion autoencoder. Additionally, for example, improvements are made to ML-ResNet, which addresses missing target labels in facial keypoint detection using a masked loss function, improves training efficiency, and is robust.

To overcome problems associated with prior approaches, in some embodiments, a video encoder rate controller is provided. For example, the video encoder rate controller is provided in an encoding system that can instantiate and/or take down frame synchronized parallel encoders. Also, for example, the encoding system allows the rate controller to provide a range of initial QP values to each encoder. Further, for example, a number of encoders may be directly related to at least one of a complexity, an amount of motion from frame to frame or picture to picture over a look-back period, a degree of a change of a position of an object, an appearance between consecutive frames, combinations of the same, or the like. In addition, for example, the initial QP values given to each encoder are based on a complexity estimation system and a virtual buffer model size. Moreover, for example, the rate controller calculates a size of each encoded frame and chooses which frame to deliver (e.g., to a client device). Furthermore, for example, the video encoder rate controller and encoding system allow an absolute best possible picture to be delivered (e.g., to the client device) running in an absolute lowest possible latency. Additionally, for example, a buffer model size for the rate controller is controlled through an API allowing an external system to adjust the virtual buffer model based on changing latency requirements.

FIG. 1 illustrates a system 100, which includes several components: a source 110, an encoder system 150 with multiple encoder instances (e.g., a first encoder instance 160 through an n-th encoder instance 170), and a client device 190. The system 100 is configured to efficiently control and transmit (e.g., video) data. The source 110, e.g., a game engine or another data-generating entity, is configured to generate an initial data stream, e.g., data in an uncompressed format, referred to as uncompressed source 120. In some embodiments, at least one of the source 110, the encoder system 150 (or components thereof), the client device 190, combinations of the same, or the like, exchange data with one or more trained models and/or neural networks 130, as detailed herein. The encoder system 150 is configured to receive and process the uncompressed source 120 through one or more encoder instances, ranging from the first encoder instance 160 to the n-th encoder instance 170, depending on requirements of the system 100. Exemplary details in various embodiments of the encoder system 150 and/or the first encoder instance 160 to the n-th encoder instance 170 are provided hereinbelow. One function of the encoder instances is to compress the (e.g., video) data, making the data more manageable for transmission. The client device 190 (e.g., smartphone, display device, dongle, set-top box, media streaming device, PC, game console or the like), receives compressed video (e.g., video bitstream) 180, selected from the encoder instance that provides the best possible picture quality with the lowest possible latency.

Figure 7:
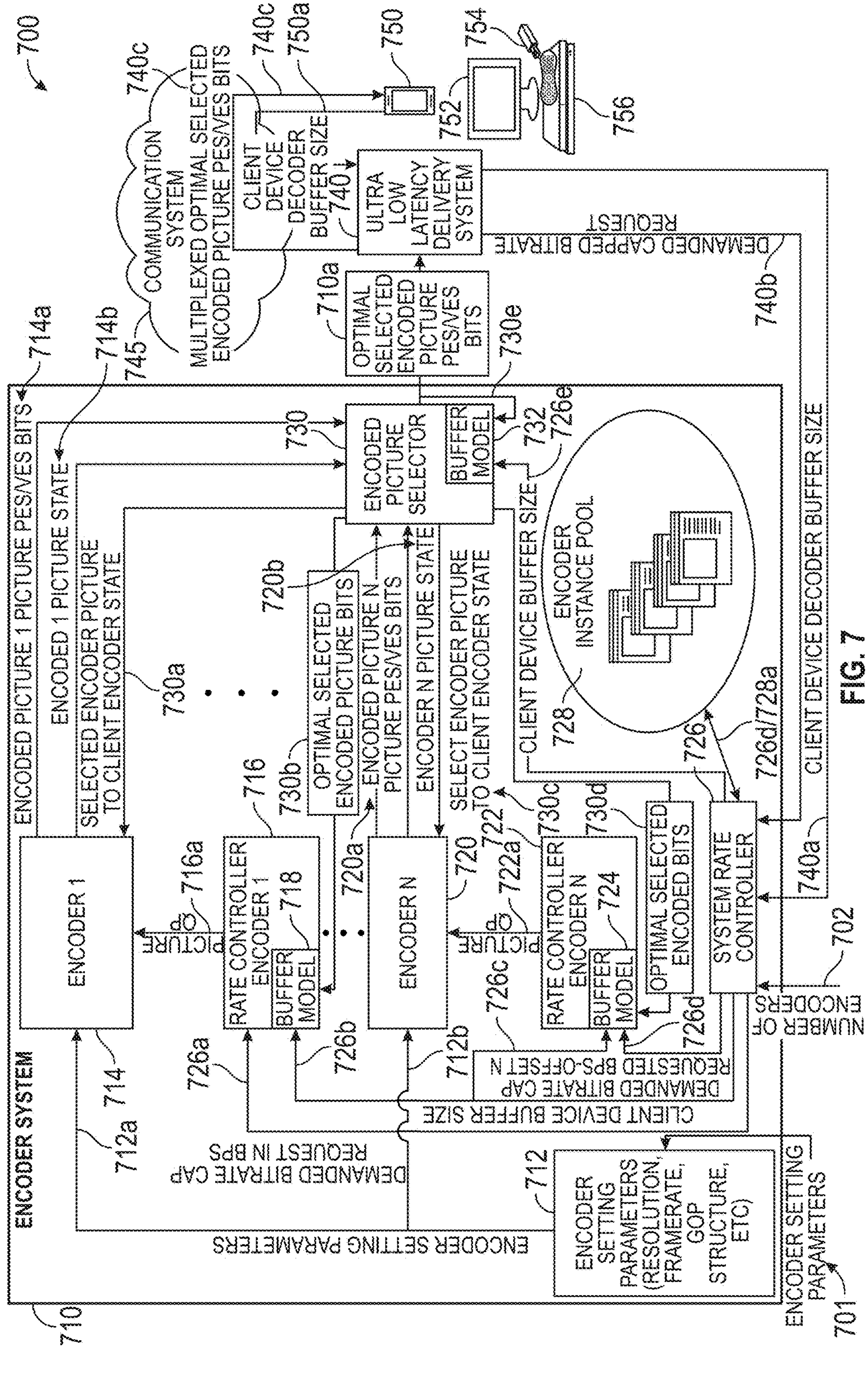
FIG. 7 depicts an encoder system with a rate controller system per encoder, in accordance with some embodiments of the disclosure.

In some embodiments, a rate controller system is configured to send estimated target bitrates to multiple encoders that are in a synced system at a frame level (see, e.g., FIG. 7). In some embodiments, a single rate controller is configured to control multiple encoder instances at a QP per picture level (see, e.g., FIG. 8). In some embodiments, a system operates in at least two modes for increasing and/or decreasing a video decoder buffer size smoothly and efficiently (see, e.g., FIG. 9).

Video encoding for ultra-low-latency video is extremely challenging when attempting to keep the video within a capped bitrate. In video encoding, there are I-pictures, P-pictures and B-pictures. Typically, I-pictures are very large in comparison to P-pictures and B-pictures, depending on the complexity of the video from frame to frame. As noted above, there are cases where a P-picture is larger than an I-picture. In extreme high motion video, both P-pictures and B-pictures can be very large, especially in the case of an instant scene change. A scene change example is where 100% of the picture to encode is different than the previous encoded picture.

Figure 2:
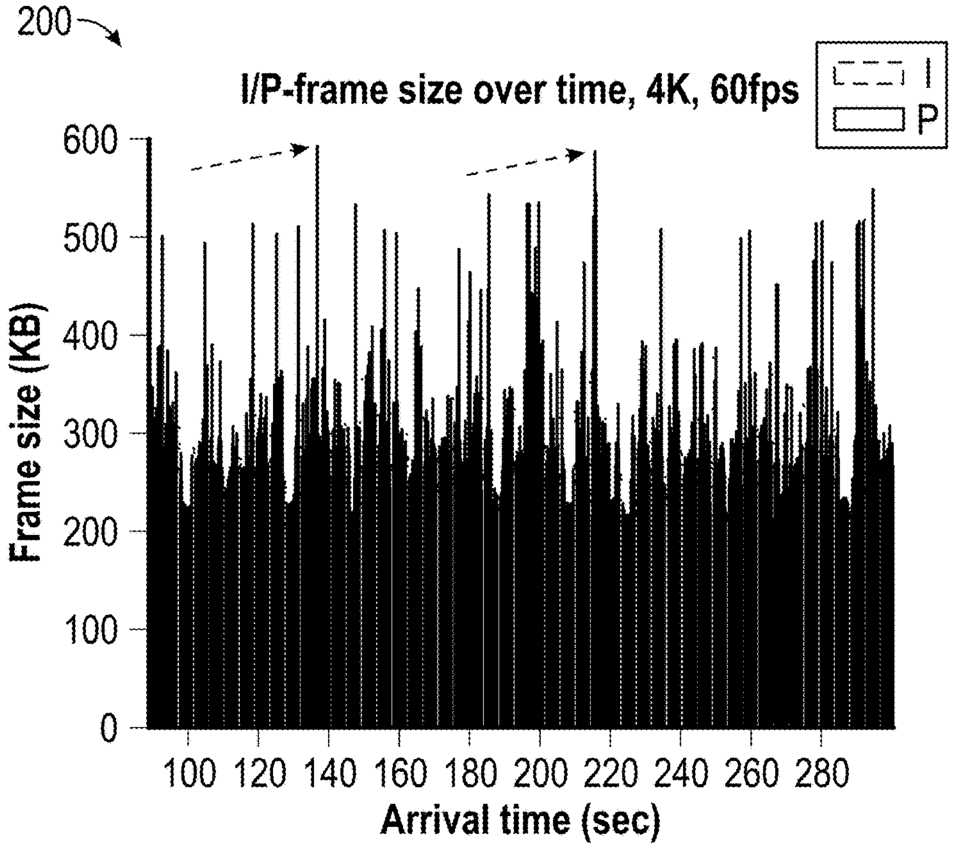
FIG. 2 depicts predicted pictures in a cloud gaming environment with a GOP structure (including intra (I), predicted (P), and bidirectional (B) coded pictures) with all P-pictures following the I-picture, in accordance with some embodiments of the disclosure.

FIG. 2 depicts a graph 200 of sizes of P-pictures in a cloud gaming environment over time, in accordance with some embodiments of the disclosure. A GOP structure is utilized with all P-pictures following the I-picture. The graph 200 shows very large P-pictures being generated in a cloud gaming environment, which, depending on the difference from one picture to the next, may or may not generate a very large amount of data for the encoding of that picture. Note there are two frames in this example that are about 600 KB in frame size (marked with arrows). This size would be typical at a scene change as described herein. The encoded video in this example (also shown, e.g., in FIG. 4) is encoded in accordance with advanced video coding (AVC) (i.e., H.264 or MPEG-4 Part 10) at a resolution of approximately 4000 pixels horizontally (i.e., 4K), at a refresh rate of about 60 Hz, and at a bitrate of about 85 Mbps. Since this represents extremely low-latency delivery with a minimal buffer size, delivery of about 600 KB in about 16.67 milliseconds results in a spike in bandwidth of about (600,000×8)×60=288,000,000 or about 288 Mbps. The video will average over time to about 85 Mbps and depending on the buffer model of the client device, this would not pose a problem since many frames will be much smaller in size, allowing the buffer to not drain completely and rebuild on smaller size frames. Other bitrates were evaluated. In all the tested bitrates, the extreme spike in bitrate compared to the encoder bitrate shown as frame size was the same at scene changes. Large frames were generated, for example, by changing the driver view. It is noted that this same problem exists in all codecs (e.g., AVC, HEVC, AV1, VP9, or the like) including the latest in the state of the art (e.g., VVC, or the like).

Figure 3:
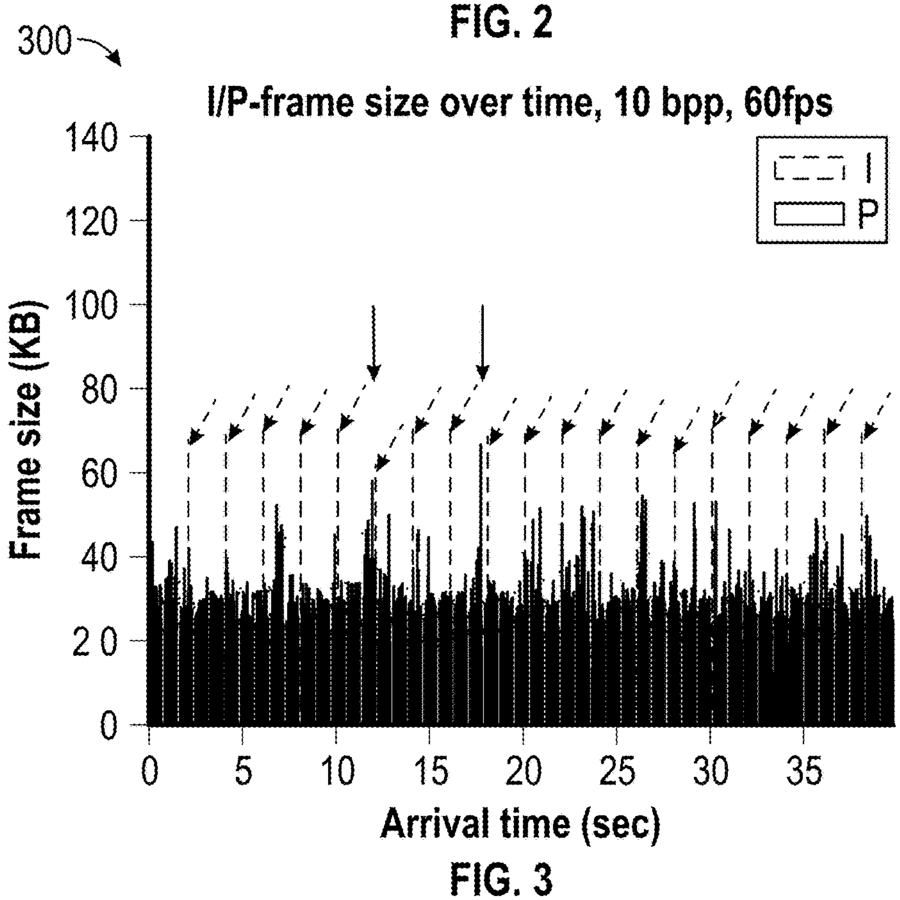
FIG. 3 depicts I-pictures in a cloud gaming environment with the GOP structure where the GOP size is about two seconds, in accordance with some embodiments of the disclosure.

FIG. 3 depicts a graph 300 of I-pictures in a cloud gaming environment with the GOP structure where the GOP size is about two seconds, in accordance with some embodiments of the disclosure. In this example, an I-picture is created and delivered (e.g., to the client device) every two seconds. The I-picture sizes are marked with 19 arrows, and the P-picture sizes are shown otherwise. In this example, the video is an analysis of a clip captured during a game that was processed at 1080p, 60 Hz, with AVC encoding at 10 Mbps. Note that a size of most of the I-pictures is greater than most P-pictures. I-pictures are often much larger than predicted pictures. This particular game clip also contains numerous large P-pictures as well. There are two cases near the sixth I-picture and near the ninth I-picture where the P-pictures are as large or larger than the I-picture (marked with two vertical arrows), which indicates, in this example, a scene change. This example did not include a user changing their view, e.g., the user was using the same viewpoint perspective, so this example is not as extreme as the racing game example of FIG. 4.

Figure 4:
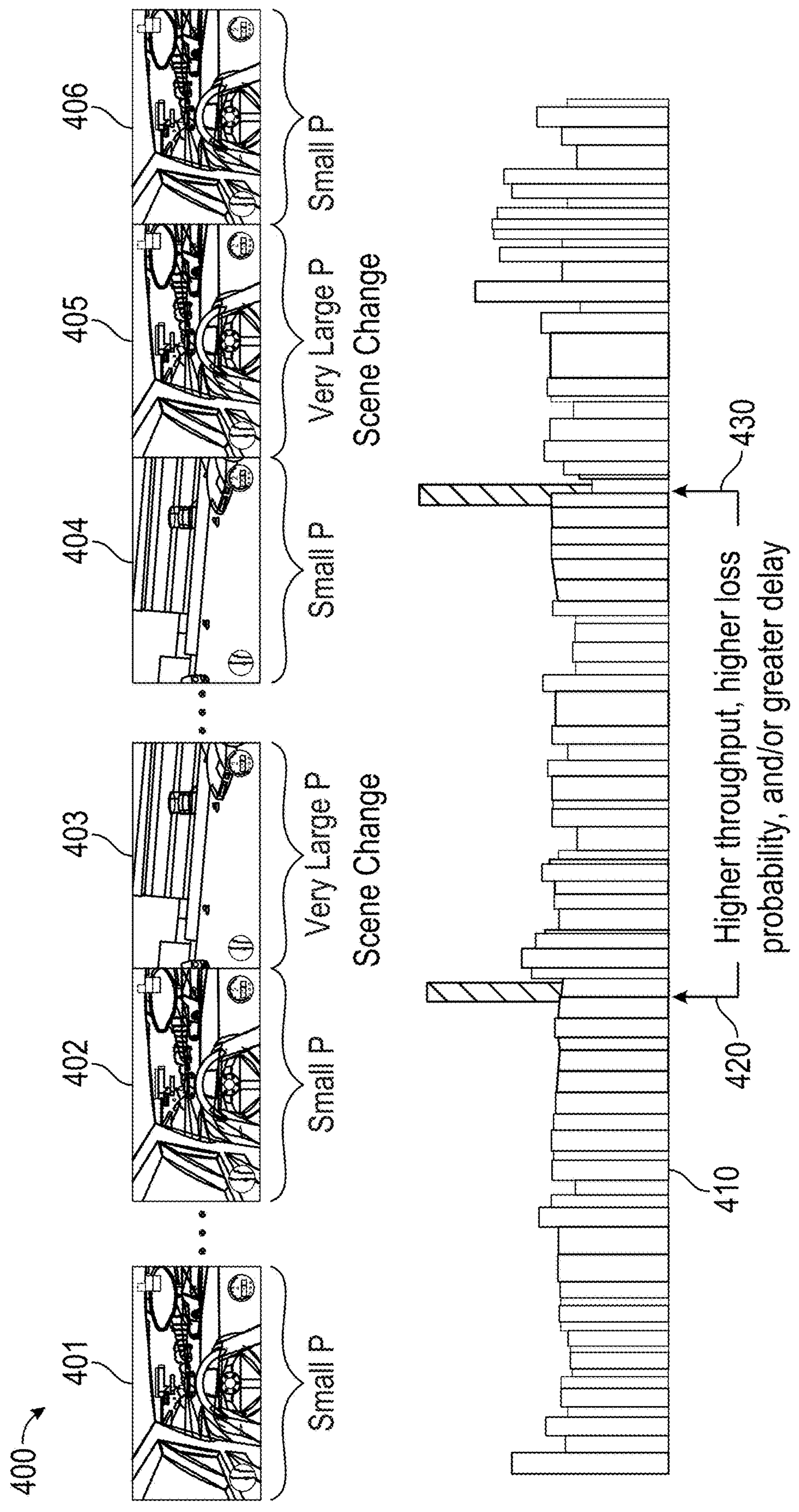
FIG. 4 depicts an example of an instant scene change resulting in a very large predicted coded picture (P-picture) and a corresponding chart of arrival time versus frame size, in accordance with some embodiments of the disclosure.

FIG. 4 is an example of a racing game showing an example of a scene change at the third picture below which will result in a very large Predicted encoded picture as shown in FIG. 2 above. In the racing game, a difference from one frame to the next can be significant, i.e., require relatively high and/or impactful levels of bandwidth usage. Some racing games allow a user playing the game to switch views, for example, from the front windshield to a left, right, or rear view. The difference from one frame to the next will cause the picture sizes to increase dramatically. A series of frames are shown in FIG. 4. The series is an example of two scene changes causing very large P-picture sizes to be generated on the encoded first frame at each scene change.

For example, FIG. 4 depicts an example of an instant scene change 400 resulting in a very large predicted coded picture (P-picture) and a corresponding chart 410 of arrival time versus frame size, in accordance with some embodiments of the disclosure. The scene change 400 includes, for example, a first frame 401 and a second frame 402 depicting a first-person viewpoint of a driver (corresponding with the gamer). There may be additional frames (depicted with an ellipsis) between the first frame 401 and the second frame 402. The corresponding chart 410 of arrival time (x-axis) versus frame size (y-axis) shows a relatively small difference between frames 401 and 402. Whereas, for example, if a user selects a viewpoint change, e.g., a switch from the first-person viewpoint of the driver at the second frame 402 to the driver checking their right side in a third frame 403, an extremely large P-picture 420 is generated due to the scene change. The extremely large P-picture 420 is associated with higher throughput, suffers higher loss probability, and/or suffers greater delay resulting in late arrival (e.g., to the client device), and the present disclosure helps to address these issues.

As above, there may be additional frames (depicted with an ellipsis) between the third frame 403 and a fourth frame 404, where the viewpoint may remain on the driver checking their right side. Again, the corresponding chart 410 shows a relatively small difference between frames 403 and 404. If, as in this example, the driver selects another viewpoint change, e.g., a switch from the driver checking their right side in the fourth frame 404 back to the first-person viewpoint of the driver at a fifth frame 405, again, an extremely large P-picture 430 is generated due to the scene change. A subsequent frame, a sixth frame 406, continues in this example with a relatively small difference between frames 405 and 406. In some approaches, the extremely large P-picture 430 utilizes higher throughput, suffers higher loss probability, and/or suffers greater delay associated with such scene changes.

To further understand the challenges in encoding video at an extremely low bitrate, some background information is provided below to explain one reason for a very large frame size. A high-level architecture of a video encoder is provided. Descriptions are provided below of major components of the video encoder. A current video frame (f(n)) is a video frame currently being processed by the encoder. A reference video frame (f(n-1)) is a previous video frame that has already been encoded and is used as a reference for predicting the current frame. Intra prediction performs prediction based on the spatial redundancy within the current frame. Intra prediction uses information from neighboring blocks within the same frame. Inter prediction performs prediction based on the temporal redundancy between the current frame and the reference frame (f(n-1)). Intra prediction uses motion estimation and compensation techniques. A mode selector decides whether to use intra prediction or inter prediction for encoding the current block of the frame. The mode selector selects the mode that results in the best compression efficiency. Within a frame, the mode selection can be applied to intra or inter coding of a macroblock. Transformation and quantization refer to a state, after prediction, in which a residual (e.g., a difference between the actual block and the predicted block) is transformed using techniques like discrete cosine transform (DCT) and then quantized to reduce the number of bits required to represent the data. Context-adaptive variable-length coding (CAVL) performs entropy coding on the quantized coefficients to further compress the data by exploiting statistical redundancies. Context adaptive binary arithmetic coding (CABAC) is another process for entropy coding, and, in the following discussion, CAVLC is used as an example. An Encoded Stream is output of the CAVLC block and is the final compressed bitstream that can be transmitted or stored. Inv(erse) transformation and quantization perform inverse operations of the transformation and quantization blocks to reconstruct the residual signal. A reconstructed video frame (f(n)) refers to the residual being added back to the predicted frame (either intra or inter) to reconstruct the current frame, which will be used as the reference frame for the next frame in the sequence.

For example, the video encoder receives an initial QP value for setting a desired quality for the encoded video. The initial QP value may, for example, be set to always have a set video quality regardless of the complexity of residue (difference after motion compensation) from picture to picture. As a result, an initial QP value of 15, as an example, may generate extremely large encoded pictures or fairly small encoded pictures depending on the motion-compensated difference between the current frame and the previous frame. The video encoder itself does not guarantee to operate and output a desired or capped bit rate. For example, in a single pass encoding for ultra-low-latency streaming, unknown picture characteristics contribute to less predictable resultant picture size.

FIGS. 5-9 and 13-17 share several similarities. All of them involve video encoding processes and rate control mechanisms to manage bitrate and quality. Specifically, FIGS. 5-9 describe systems with rate controllers that dynamically adjust encoding parameters based on video complexity and bitrate requirements. Additionally, FIGS. 7-9 and 14-17 discuss the use of multiple encoder instances to control varying video complexities and maintain low latency. FIGS. 13-17 incorporate conditional parameters such as bandwidth, resolution, and frame rate to guide the encoding process and optimize performance. Furthermore, FIGS. 6-9 and 15-17 include modules or steps for estimating the complexity of video frames, pictures, or residues to adjust encoding parameters accordingly.

Figure 5:
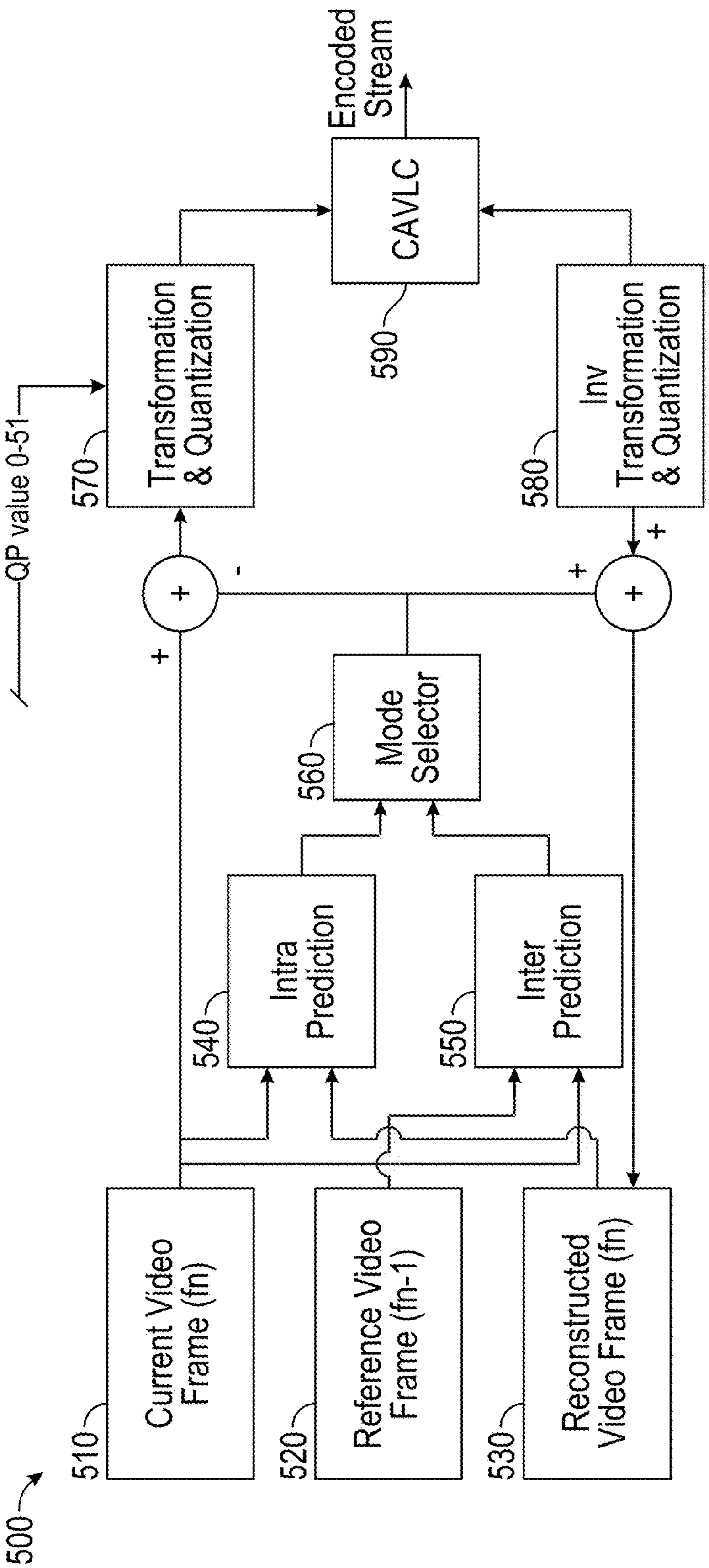
FIG. 5 depicts an architecture of a video encoder for the system of any of FIGS. 7-9 and 15, in accordance with some embodiments of the disclosure.
Figure 6:
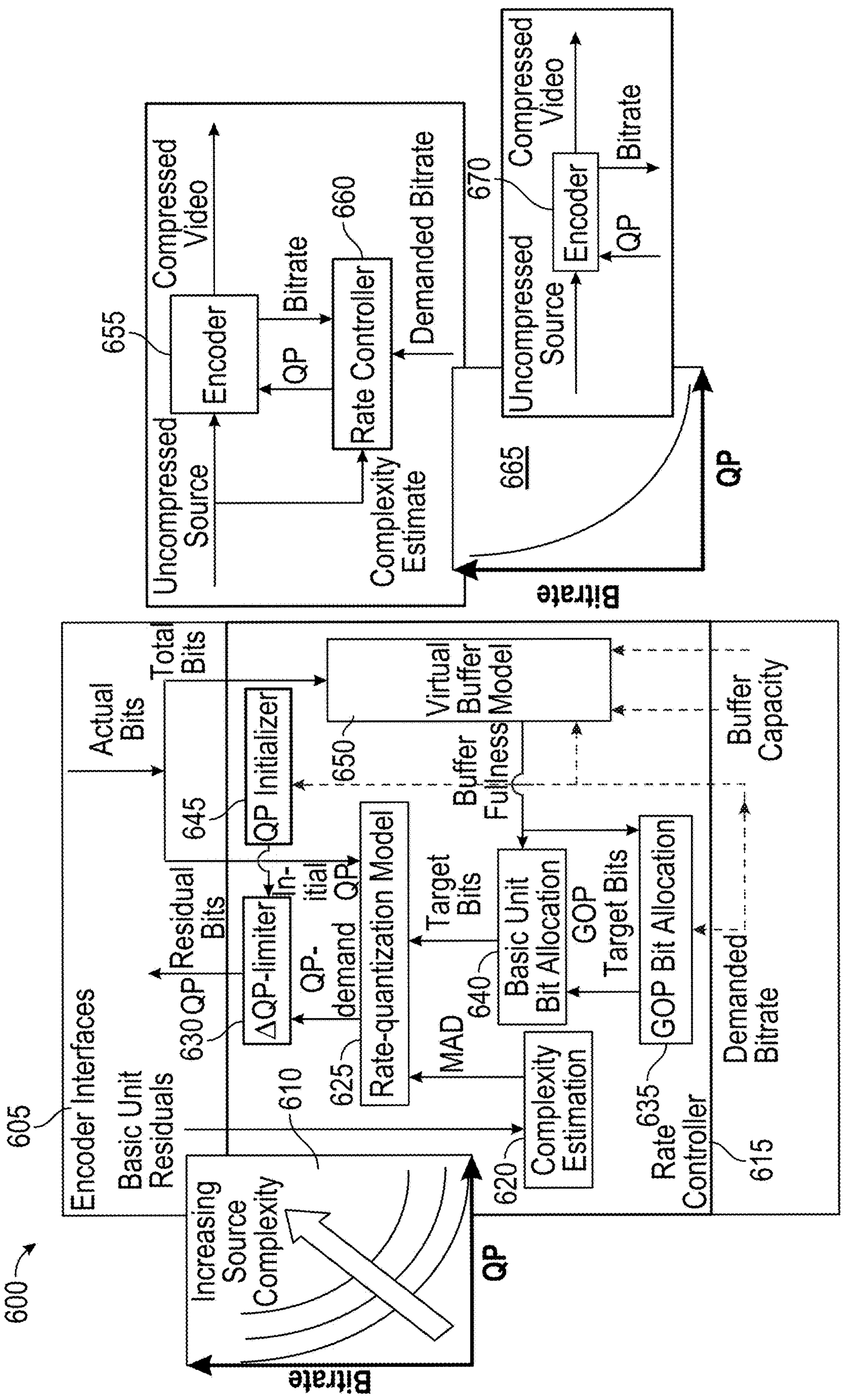
FIG. 6 depicts an architecture of a rate controller within the video encoder of FIG. 5, in accordance with some embodiments of the disclosure.
Figure 8:
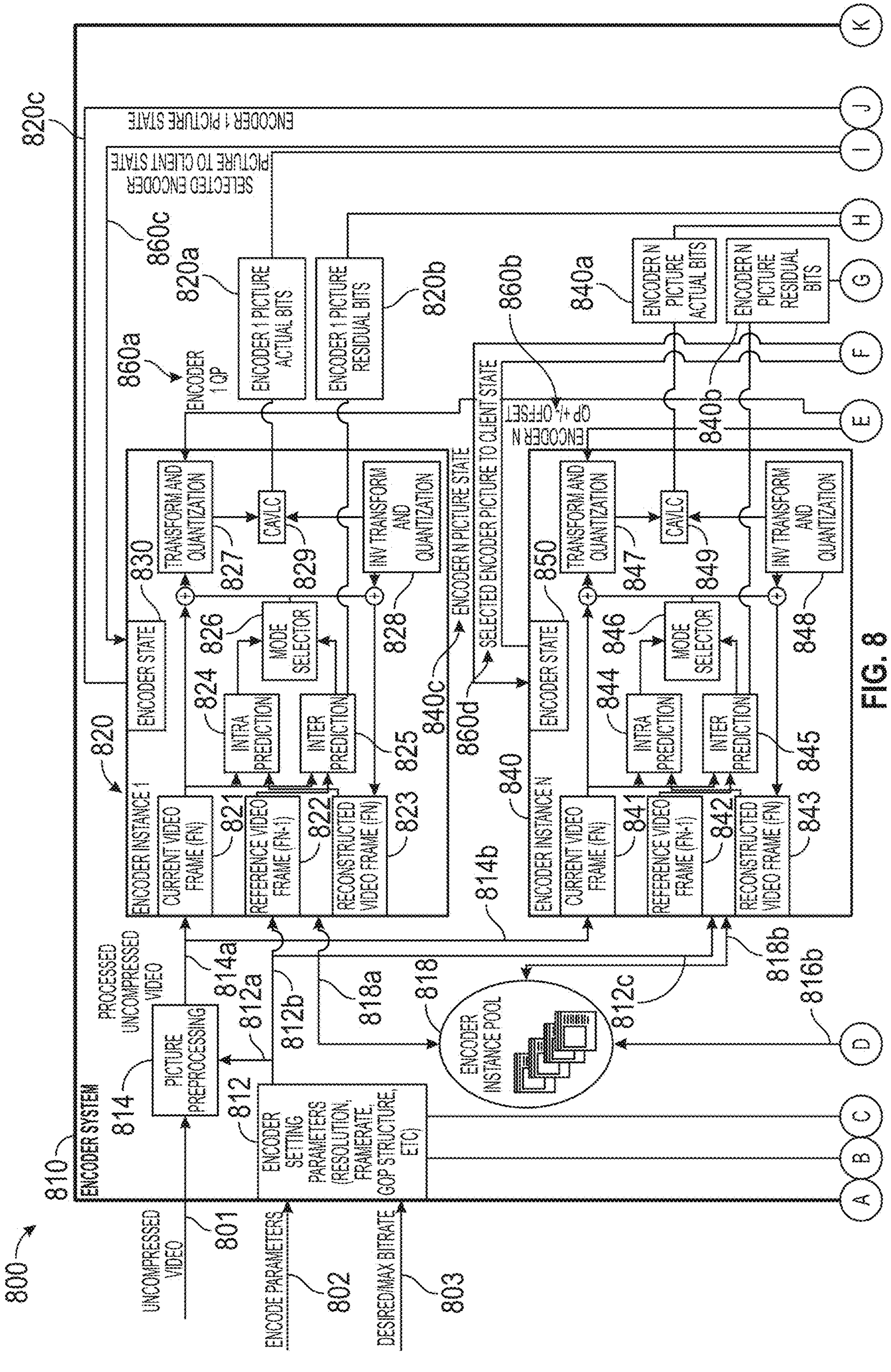
FIG. 8 depicts an encoder system with a single rate controller, in accordance with some embodiments of the disclosure.
Figure 8:
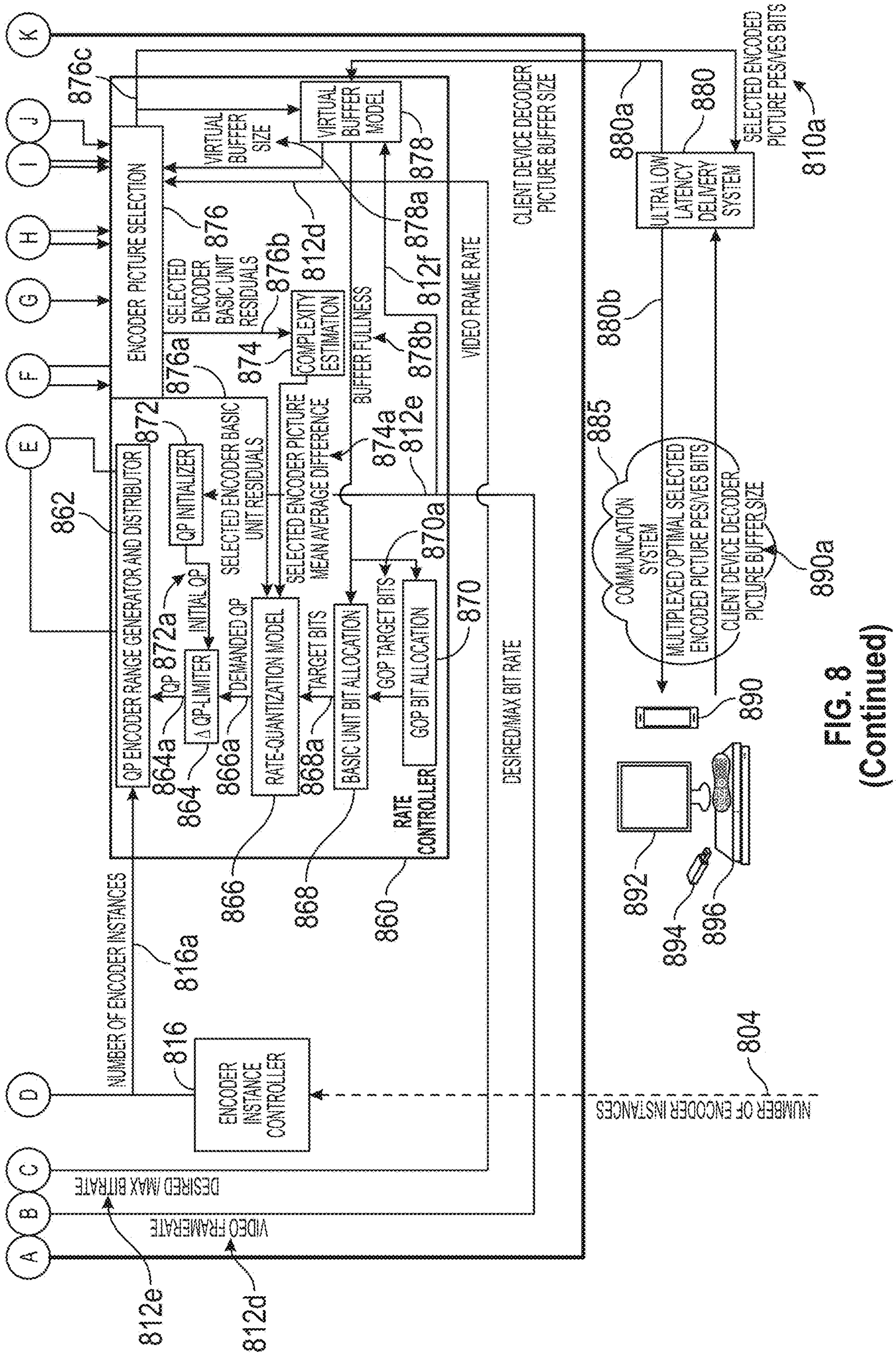
Figure 9:
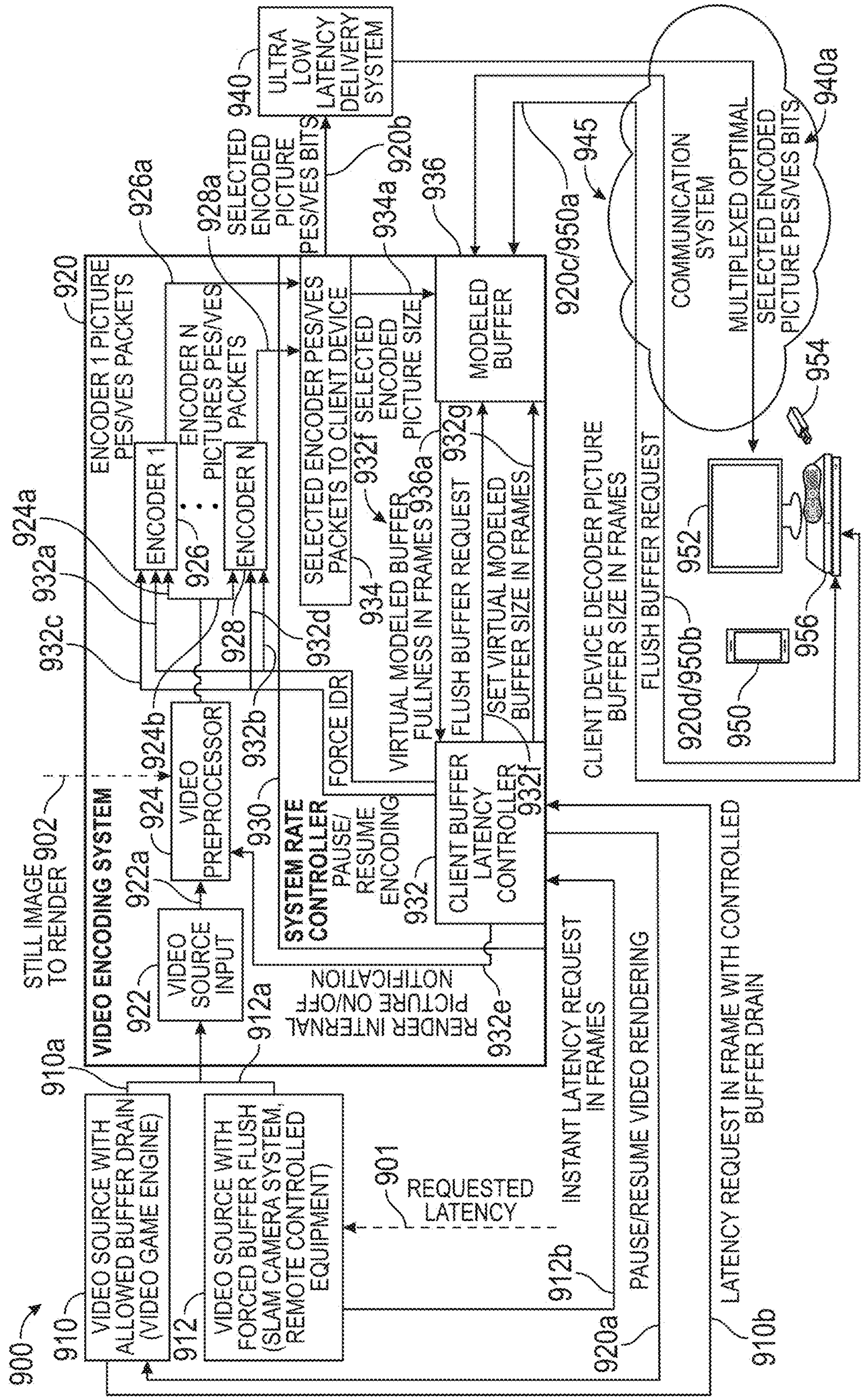
FIG. 9 depicts a system for increasing and/or decreasing a video decoder buffer size with an encoder system with a single rate controller, in accordance with some embodiments of the disclosure.

Additionally, FIGS. 5 and 6 focus on the architecture of a video encoder and rate controller, while FIGS. 7-9 describe high-level system architectures for ultra-low-latency video encoding and delivery. FIGS. 13-17 detail deep learning models and processes for predicting encoder instances and optimizing encoding parameters. Additionally, FIGS. 13-17 integrate deep learning models, such as VAEs and autoencoders, for predicting the number of encoder instances and QP values. FIG. 5 details specific components of a video encoder, such as the intra prediction module and inter prediction module, while FIG. 6 elaborates on the rate controller's architecture. FIGS. 7-9 include additional components like delivery systems and client devices. FIGS. 13-17 focus on the training and testing phases of deep learning models for video encoding.

In some embodiments, one or more parts of these processes and systems are interchangeable or combinable. One or more of the rate controllers described in FIGS. 6-9 can be integrated with the deep learning models in FIGS. 13-17 to enhance bitrate control based on predicted complexity. The encoder instances and pools described in FIGS. 7-9, 14, and 15 can be combined with the prediction models in FIGS. 13, 16, and 17 to dynamically adjust the number of active encoders based on real-time video complexity. The complexity estimation modules in FIGS. 6-9 and 15-17 can be used interchangeably to provide accurate complexity scores for adjusting encoding parameters. Additionally, the use of conditional parameters in FIGS. 13-17 can be applied to the systems in FIGS. 5-9 to optimize encoding settings based on specific conditions.

As shown in FIGS. 10-12, pseudocodes 1000, 1100, and 1200 represent examples of coding instructions used to dynamically adjust encoding parameters such as bitrate and QP values in the systems described in FIGS. 5-9. Pseudocode 1000 sets the bitrate for multiple encoder instances by calculating the quantization step size based on the number of encoder instances for the bitrate and assigning appropriate bitrates to each encoder instance. This ensures that the encoded video fits within the capped or maximum bitrate, optimizing video quality and transmission efficiency. Pseudocode 1100 sets the QP values for multiple encoder instances, ensuring that the QP values are distributed appropriately based on the number of encoder instances to manage video quality and compression. The pseudocode 1000 and 1100 can be used to set the bitrate and QP values for these encoder instances, ensuring that the one of more of encoded video bitstreams meet the desired quality and bitrate requirements. Pseudocode 1200 sets the bitrate for multiple encoder instances using a different calculation method, ensuring that the encoded video fits within the capped or maximum bitrate.

The deep learning models described, for example, in FIGS. 13-17, predict the number of encoder instances and QP values based on video complexity and other conditional parameters. For example, a machine learning (ML) system sets QP values based on training and considering previous encoded frames or pictures. The ML system also increases or decreases the number of encoders as determined by a second aspect of the ML system. Also, for example, in the system described in FIG. 15, the pretrained VAE (Model A) predicts the number of encoder instances based on the complexity of the residual frames or pictures, and the pretrained QP distribution prediction model (Model B) predicts the QP values for each encoder instance.

For the systems and models described in FIGS. 5-9 and 13-17, the video encoding process can be dynamically adjusted to control varying video complexities, maintain desirable video quality, and optimize transmission efficiency. This integration allows for a more efficient and adaptive video encoding process, ensuring high-quality video delivery with minimal, i.e., ultra-low, latency.

According to some embodiments, FIG. 5 depicts an architecture of a video encoder 500 (e.g., 655, 670) for the system 600 of FIG. 6, in accordance with some embodiments of the disclosure. FIG. 6 depicts an architecture of a rate controller 600 within the video encoder 500 of FIG. 5, in accordance with some embodiments of the disclosure.

In some embodiments, the encoder 500 encodes a video at a set QP. The QP is an index that controls an amount of compression for each macroblock in a frame in an encoder. Larger values of QP mean higher quantization, more compression, and lower quality, while smaller values mean the opposite. For AVC and HEVC, the QP values range, for example, from 0 to 51, and any value above 51 is clamped to 51. Also, for example, VVC increases the QP values from 0 to 63. When an encoder is set to encode at a fixed QP value, the size of each picture can vary widely based on the motion-compensated difference from one picture to the next. The same goes for the size of the slices or tiles.

In some embodiments, the encoder 500 includes at least one of a current video frame (f(n)) 510, a reference video frame (f(n-1)) 520, a reconstructed video frame (f(n)) 530, an intra prediction module 540, an inter prediction module 550, a mode selector 560, a transformation and quantization module 570, an inverse transformation and quantization module 580, a CAVLC module 590 that outputs an encoded stream, combinations of the same, or the like. For example, a video encoding process with the encoder 500 starts with the current video frame (f(n)) 510 and the reference video frame (f(n-1)) 520. The current video frame 510 is the one being encoded, while the reference video frame 520 is typically a previously encoded frame. The intra prediction module 540 and the inter prediction module 550 work together to predict the current frame based on the reference frame. Intra prediction works within the same frame, predicting parts of the image based on other parts within the same frame. Inter prediction, on the other hand, predicts the current frame based on data from the reference frame. The mode selector 560 then decides whether to use intra or inter prediction for each block of pixels in the frame, based on, for example, which method provides the best compression. The selected prediction is then subtracted from the original frame to create a residual frame, which is passed to the transformation and quantization module 570. This module transforms the residual frame into the frequency domain and quantizes it, reducing the precision of the data to save space. The quantized data is then passed to the inverse transformation and quantization module 580, which reverses the previous step, creating a reconstructed video frame (f(n)) 530. This frame 530 is used as the reference frame for the next frame to be encoded. Finally, the quantized data is encoded into a bitstream by, e.g., the CAVLC module 590. The module 590 uses variable-length codes, which assign shorter codes to more common patterns of data, further compressing the video. The output is an encoded stream that can be efficiently transmitted or stored. The process associated with the encoder 500 provides high-quality video at low bit rates.

To control the bitrate or encode to a fixed constant bitrate or a capped variable bitrate, the encoding system has a component called a rate controller. The rate controller is configured to balance the bitrate and quality of the compressed video. The rate controller dynamically adjusts encoding parameters based on complexity estimation, bit allocation models, and buffer status to achieve efficient and consistent video compression.

An architecture for a rate controller in a video encoding system is provided. For example, as shown on the right side of the FIG. 6, a video encoder (e.g., 655, 670) is shown. This is an encoder as depicted in FIG. 5 (e.g., encoder 500). An exemplary embodiment of the architecture is detailed below. The encoder receives the uncompressed source video. The encoder receives a QP from the rate controller. The rate controller also receives a complexity estimate calculated based on the source video. The rate controller receives a demanded bitrate or max capped bitrate received from a user's user interface (UI) setting or through an API setting from a system such as SCREAM. The rate controller controls the bitrate within the requested demanded bitrate. The output of the compressed video will average out to be in line with the demanded bitrate. This comes with a major challenge as mentioned herein. This can be explained in looking at the left side (detailed) architecture of the rate controller.

In some embodiments, a rate controller includes at least one of an encoder interface, a rate-quantization model, a complexity estimator, a ΔQP-limiter, a virtual buffer model, a QP initializer, a GOP bit allocator, a basic unit bit allocator, combinations of the same, or the like. For example, one or more encoder interfaces are provided. Also, for example, the encoder interface includes inputs and/or outputs such as basic unit residuals, residual bits, and total bits. Further, for example, the ΔQP-limiter outputs a target QP to the encoder, which is dynamically changing to keep the encoder within the demanded bitrate within the timeframe of the buffer model.

For example, a rate-quantization model is provided. Also, for example, the rate-quantization model defines a relationship between QP, actual bitrate, and a surrogate for encoding complexity. However, in some embodiments, the bits and complexity terms are associated only with the residuals. Further, for example, the QP influences the detail of information carried in the transformed residuals. In addition, for example, QP has no direct effect on the bitrates associated with overhead, prediction data, or motion vectors. Moreover, for example, a MAD of the prediction error is used. Furthermore, for example, the rate-quantization model takes an algebraic form such as equation (1), as follows:

$$\text{ResidualBits}=C1*MAD/QP+C2*MAD/QP\hat{}2 \quad (1)$$

where C1 and C2 are constants.

Additionally, for example, the rate-quantization model takes a simpler form (e.g., with C2=0). Still further, for example, the rate-quantization model takes a more complicated form involving exponentials or other basis curves for fitting. Even further, for example, the rate-quantization model is solved for a demanded QP when a target value of ResidualBits is supplied by bit allocation.

For example, complexity estimation is provided. Also, for example, a metric is provided reflecting encoding complexity associated with residuals. Further, for example, a MAD of a prediction error is provided to reflect encoding complexity associated with residuals. In addition, for example, the MAD of the prediction error may be provided in accordance with equation (2), as follows:

$$MAD=\Sigma_{i,j}|\text{residual}(i,j)|=\Sigma_{i,j}|\text{source}(i,j)-\text{prediction}(i,j)| \quad (2)$$

where the sum of the absolute differences is calculated between the source values and the predicted values over all pixels ((i,j)). The residual is the difference between the source and the prediction at each pixel.

The MAD is an inverse measure of an accuracy of a predictor and (in the case of inter-prediction) the temporal similarity of adjacent pictures.

Moreover, for example, the MAD is estimated after encoding the current picture. Furthermore, for example, estimating the MAD after encoding the current picture requires encoding the picture again after the QP is selected. It is noted that such encoding of the picture again after the QP is selected is, without embodiments disclosed herein, a burden for a computationally intensive standard like H.264, H.265, or H.266 at high framerates and resolutions. Instead, in accordance with embodiments disclosed herein, for example, a complexity surrogate varies gradually from picture to picture. Additionally, for example, the complexity surrogate is estimated based upon data extracted from the encoder for previous pictures. Still further, for example, utilizing other approaches, estimating the complexity surrogate based upon the data extracted from the encoder for the previous pictures may, without utilizing one or more of the embodiments disclosed herein, fail at a scene change.

For example, a ΔQP-limiter is provided. Also, for example, a closed loop control system is damped to guarantee stability and to minimize perceptible variations in quality. Further, for example, for difficult sequences having rapid changes in complexity, QP-demand may oscillate noticeably. In order to control such difficult sequences having rapid changes in complexity, for example, a rate limiter is provided, which limits changes in QP to no more than, e.g., ±2 units between pictures.

For example, a virtual buffer model is provided. Also, for example, a compliant decoder is equipped with a buffer to smooth out variations in the rate and arrival time of incoming data. Further, for example, the corresponding encoder produces a bitstream that satisfies constraints of the decoder, so a virtual buffer model is used to simulate the fullness of the real decoder buffer. In addition, for example, the change in fullness of the virtual buffer is the difference between the total bits encoded into the stream, less a constant removal rate assumed to equal the bandwidth (or demanded bitrate). Moreover, for example, the buffer fullness is bounded by zero from below and by the buffer capacity from above. Furthermore, for example, the user device specifies appropriate values for buffer capacity and initial buffer fullness, consistent with the decoder levels supported.

For example, a QP initializer is provided. Also, for example, QP is initialized upon start of a video sequence. Further, for example, an initial value is input manually. In addition, for example, an initial QP value is estimated from demanded bits per pixel, e.g., in accordance with equation (3).

$$\text{DemandedBitsPerPixel}=\text{DemandedBitrate}/(\text{FrameRate}*\text{height}*\text{width}) \quad (3)$$

For example, GOP bit allocation is provided. Also, for example, GOP bit allocation is based upon the demanded bit rate and the current fullness of the virtual buffer. Further, for example, a target bit rate for the entire GOP is determined, and QPs for the GOP's I-picture and first P-picture are also determined. In addition, for example, the GOP target is fed into the next block for detailed bit allocation to pictures.

For example, basic unit bit allocation is provided. Also, for example, the "basic unit" is a basis for H.264 rate control recommendations. Further, for example, scalable rate control is pursued to different levels of granularity, such as picture, slice, macroblock row or any contiguous set of macroblocks. That level is referred to as a basic unit at which rate control is resolved, and for which distinct values of QP are calculated. If the basic unit is smaller than a picture, then this block (e.g., in FIG. 6) actually breaks out into two layers: one for the picture itself and another for the basic unit. FIG. 6 is limited to the case where the picture itself is the basic unit.

For H.264, for example, the emphasis is on computing QP for each stored picture (usually a P-picture). It is noted that the H.264 standard allows B-pictures to be used as reference pictures; however, such usage is not expected to be common. Also, for example, the QPs for non-stored pictures (e.g., B-pictures) are then interpolated (e.g., and offset) from QP values for their neighboring P-pictures. First, for example, considering the MAD of the picture, a target level for the buffer fullness is determined. Then, for example, using the buffer target level, the target bits for the picture are calculated in a computationally efficient manner. Also, it is noted that B-pictures introduce additional latency. In ultra-low-latency cases, the encoder would probably not be configured for B-pictures; however, the system would still work with the added latency of the B-pictures.

In some embodiments, a rate controller 600 is provided, as shown in FIG. 6, which, for example, adjusts the QP value dynamically based on the encoded pictures and their sizes. It does this using a virtual buffer model 650 that maintains the average bitrate within scope of the set bitrate. The encoder may be set to encode at a constant bitrate or a capped virtual bitrate. In either case, the bitrate should not exceed the set bitrate. This bitrate averages out over time based on the virtual buffer model 650. The buffer models for video encoders are typically not adjustable and are fixed within the encoder. As noted herein, in some approaches, there were frames that were very large in size and many frames that were smaller in size. This variance in frames is a prime example of how the rate controller cannot make QP adjustments in time to adjust each frame size to be within the size of the encoded bitrate and will average out to the target bitrate over the course of time as modeled in the virtual buffer model 650 within the encoder's rate controller 600.

The previous description of the encoder's rate controller 600 is distinguished from the rate controller in, e.g., a real-time transport protocol (RTP) delivery system, e.g., the rate controller of the video encoding rate control and repair 660. The rate controller in the RTP delivery system controls the bitrate based on the priority queue to the encoder. This rate controller is different from the encoder's rate controller and is external to the encoder. The RTP delivery system makes API calls to change the encoder's target bitrate based on the priority queue size.

In some embodiments, the controller 600 includes at least one of an encoder interface 605, a rate controller module 615, a complexity estimation unit 620, a rate-quantization model 625, a ΔQP-limiter 630, a GOP bit allocation unit 635, a basic unit bit allocation unit 640, a QP initializer 645, a virtual buffer model 650, combinations of the same, or the like. Increasing source complexity refers to QP versus bitrate, where bitrate decreases as QP increases, and vice-versa, i.e., see also the QP-to-bitrate curves 610, 665. One or more portions of the controller 600 may be operatively connected with at least one of an encoder 655 and a rate controller 660, or an encoder 670.

The controller 600 includes several modules that work together to manage the quality and bitrate of the encoded video. The encoder interface 605 serves as the communication link between the controller 615 and an encoder (e.g., 655). The encoder interface 605 receives information about the video from the encoder and sends back the decisions made by the rate controller 615. The rate controller module 615 manages the overall bitrate of the video. It uses information from the complexity estimation unit 620, which measures the complexity of the video and outputs, e.g., the MAD, and the rate-quantization model 625, which models the relationship between the QP and the bitrate and outputs, e.g., QP-demand. The ΔQP-limiter 630 ensures that the QP does not change too rapidly from frame to frame and outputs, e.g., QP. The GOP bit allocation unit 635 and the basic unit bit allocation unit 640 work together to allocate bits to different parts of the video. The GOP unit 635 allocates bits to GOPs. For example, the GOP unit 635 receives a demanded bitrate and outputs GOP target bits. The basic unit 640 allocates bits within each picture. For example, the basic unit 640 receives the GOP target bits from the GOP unit 635 and buffer fullness from the virtual buffer model 650 and outputs target bits. The QP initializer 645 receives the demanded bitrate and sets the initial QP for each picture based on the target bitrate and the estimated complexity. The virtual buffer model 650 receives a buffer capacity and keeps track of the buffer fullness and adjusts the QP to prevent the buffer from overflowing or underflowing. The controller 600 is designed to control increasing source complexity 610, where the bitrate decreases as the QP increases. This is managed by the rate controller module 615 and the rate-quantization model 625, which adjust the QP to maintain a constant bitrate despite the increasing complexity. The controller 600 may be operatively connected with at least one of an encoder 655, which receives the uncompressed source and QP and outputs a bitrate and compressed video, and a rate controller 660 when a complexity estimate is provided to the rate controller 660 based on the uncompressed source. Once the bitrate is set, the controller 600, which is connected to an encoder 670, receives the uncompressed source and QP and outputs a bitrate and compressed video. That is, the controller 600 controls the encoding process and manages the bitrate of the video. The process for controller 600 provides high-quality video at a controlled bitrate.

In some approaches, very large pictures and dropped video packets are controlled and/or pictures that arrive too late for a viewable (e.g., timely, smooth) display are repaired. To encode the video into slices or tiles, and when a very large picture occurs or for repair of late picture arrival or dropped packets, an I-frame is generated in place of the large P-frame and delivered to client devices over the next few frame slots. Also, for example, to encode the video into slices or tiles, slicing may be performed in AVC, High Efficiency Video Coding (HEVC), or Versatile Video Coding (VVC), and tiling may be performed in HEVC and VVC. These approaches include generating an I-frame at scene change detection points, along with slicing or tiling to break the delivery of the large frame into several frame time slots, delivering a subset of the picture's slices or tiles over the course of several frame slots.

In an approach, systems and methods are provided for optimizing scene change detection and I-frame generation for improving video compression in cloud gaming and other interactive experiences. The approach highlights the challenges of quick scene changes and the requirement for low latency. The approach includes a rate controller that adjusts the quantization parameter and bitrate based on network conditions. The approach also provides frame partitioning, preventive encoding, and interactive signaling between encoder and decoder. In another approach, frame repair is achieved using slicing or tiling for dropped packets that result in a corrupt frame and late frame arrival. Both approaches include slicing and tiling to send a very large frame in slices or tiles, performing the repair over the next several frame slots, thus reducing the requirement for a very large frame to be sent (e.g., to the client device) in time when there is virtually no buffer on the client device.

For extreme and/or ultra-low-latency encoding use cases like cloud gaming, remote vehicle control, and cloud-based SLAM, an encoding system is provided, video is encoded, and the video is transported (e.g., to a client device) running with no buffer. As described herein, in accordance with some approaches, previously provided rate controller designs do a very poor job of keeping the encoded picture sizes within the required size for extremely low buffer models in a live one-pass encoding solution. For example, even in a two-pass encoding solution, which may introduce latency on scene changes or for complex video, the second pass may still not provide optimum results and may miscalculate the next QP prediction, resulting in a frame of poor quality due to picking a QP value that is too high, or worse, estimating a next QP value that is too low, resulting in a frame that is still too large, necessitating other measures to repair the stream for it to be delivered and decoded in time.

In some embodiments, a rate controller is provided in an encoding system that is configured to instantiate and/or take down frame synchronized parallel encoders allowing the rate controller to provide a range of initial QP values that will be used to send a targeted QP value to each encoder. For example, the number of encoders may be directly related to the complexity and/or amount of motion from frame to frame over a look-back period. Further, for example, the initial QP values given to each encoder are based on the complexity estimation system and the virtual buffer model size. In addition, for example, the rate controller calculates the size of each encoded frame and chooses which frame to deliver (e.g., to the client device). Moreover, for example, the rate controller and/or the encoding system allows a highest-quality picture to be delivered (e.g., to the client device) within the available bandwidth to deliver content to the client device in a set amount of time. Furthermore, for example, a buffer model size for the rate controller is controlled through an API allowing an external system to adjust the virtual buffer model based on changing latency requirements.

In some embodiments, as shown in FIG. 7, an example high level architecture (or system) 700 is provided for an ultra-low-latency rate control system with a rate controller per encoder. For example, the architecture (or system) 700 includes at least one of an encoder system 710, an (e.g., ultra-low-latency) delivery system 740, a client device (e.g., mobile phone or smartphone 750, display device 752 (e.g., a smart TV), dongle 754 (e.g., TiVo Stream 4K), set-top box or media streaming device 756 (e.g., TiVo SmartBox), or the like), combinations of the same, or the like. Also, for example, the ultra-low-latency delivery system 740 is connectable with the client device (e.g., 750, 752, 754, 756, or the like) via communication system 745 (e.g., internet, wireless network, or the like). Further, for example, the encoder system 710 includes at least one of an encoder setting parameters module 712, a first encoder 714, a first rate controller 716, an n-th encoder 720, an n-th rate controller 722, a system rate controller 726, an encoder instance pool 728, an encoded picture selector 730, combinations of the same, or the like.

For example, the encoder system 710 is configured to receive at least one of encoding setting parameters 701, a number of encoders 702, a client device decoder buffer size 740*a* (e.g., from the ultra-low-latency delivery system 740), a demanded capped bitrate request 740*b* (e.g., from the ultra-low-latency delivery system 740, e.g., via the communication system 745), combinations of the same, or the like. Also, for example, after processing, the encoder system 710 is configured to transmit (e.g., packetized elementary stream (PES) or video elementary stream (VES) bits for) an optimal selected encoded picture 710*a* (e.g., to the ultra-low-latency delivery system 740, e.g., via the communication system 745).

For example, the system 700 runs a single encoder instance (e.g., first encoder 714) for the client device (e.g., 750, 752, 754, 756, or the like) running with a larger buffer where extreme low latency is not required. When increasing the framerate and decreasing the buffer size, more encoders (e.g., n-th encoder 720) may be required to handle situations where the encoder's rate controller (e.g., first rate controller encoder 716) cannot adjust to the proper QP fast enough, resulting in a very large encoded picture that cannot be delivered to the client device (e.g., 750, 752, 754, 756, or the like) in time. This will cause compounding problems for the encoder having to include a recovery and/or repair system for dropped packets and/or frames or late arrival frames. Building on earlier work (by the present inventors and their colleagues), optimizations are provided for recovery for late frames or dropped packets through multiple slices or tiles per picture and Low Latency, Low Loss, Scalable (L4S) optimizations in the delivery of large pictures, slices or tiles. The architecture 700 prevents the late frame arrival and/or alleviates the requirement for a late frame arrival repair.

In the architecture 700, a desired bit rate is given to a system rate controller 726 of an encoder system 710. This may, for example, be through a user interface (UI) setting or dynamically updated through an API used by a low-latency delivery system like SCREAM or WebRTC.

A number of encoders 702 in the architecture 700 is set, for example, through an API or a user interface. For example, a cloud game engine may provide control over one or more additional encoder requests based on a known complexity and desired latency within the game system of upcoming gameplay utilizing the API.

When the number of encoder instances is given to the encoding system 710, that number of encoder instances will, for example, be instantiated when the initial encoding begins. Based on the number of encoder instances, a desired bit rate range will, for example, be calculated based on the resolution and framerate. As an example, in an Adaptive Bitrate (ABR) encoder, a 4K 60 Hz range of bitrates for H.264 is 10-40 Mbps. Other recommendations are provided. For example, YouTube recommends 53-68 Mbps, and Vimeo recommends 30-60 Mbps.

A bottom may be defined for a given resolution and framerate within the system. This bottom may be much lower than the ranges given such as an absolute system defined bottom for 4K 60 Hz set at 5 Mbps. The distribution may be calculated between the absolute bottom of 5 Mbps and the desired rate based on the number of instantiated encoders.

If, for example, the number of instantiated encoders is n=1, the desired bitrate is sent to a rate controller 716 of the encoder 714. If, for example, the number of encoder instances is n=2, the system may assign a first encoder, e.g., encoder 714, with the desired bitrate as the cap, and a second encoder, e.g., encoder 720, may be set at the lowest bitrate for the resolution, framerate and codec. In this example, for H.264, the bitrate of the first encoder 714 will be set to the desired bitrate, and the bitrate of the second encoder 720 will be set at the absolute minimum.

In the example of two encoders, this approach alleviates a problem of transporting and/or delivering an extremely large picture if the desired bitrate is, e.g., 30 Mbps. However, selecting a picture from 5 Mbps encoding might be a poor choice in terms of video quality for that specific picture and the ones immediately following it. This is solved, for example, by adding additional encoder instances.

For example, a third encoder instance may be added and that encoder instance may be assigned a bitrate of, for example, 17.5 Mbps, which is a median between the desired and the absolute minimum for the resolution, framerate and codec. In this case, the picture from the 17.5 Mbps encoder may fit into the bandwidth allocation and time required to transmit the picture to the client device (e.g., 750, 752, 754, 756, or the like).

Each encoder (e.g., 714, 720) will, for example, send an encoder state (e.g., 714*b*, 720*b*) along with the encoded picture (e.g., 714*a*, 720*a*) to an encoded picture selector 730 of the encoder system 710. Within the encoded picture selector 730 of the encoder system 710, a calculation is made, for example, based on the size of the picture, the framerate, the modeled buffer and the allocated bandwidth. The calculation is, for example, as follows for each picture generated by each encoder instance. The bitrate steps may, for example, be calculated in accordance with pseudocode 1000 as shown in FIG. 10.

That is, for example, as set forth in the pseudocode 1000, if there is only one encoder instance, the bitrate is set to the capped bitrate. For multiple encoder instances, the step size for the bitrate is calculated by dividing the difference between the capped bitrate and the minimum bitrate by the number of encoder instances minus one. The first encoder is initialized with the minimum bitrate. For each subsequent encoder, the bitrate is incremented by the calculated step size and set accordingly. After the loop, the last encoder's bitrate is set to the capped bitrate. Additionally, the required bitrate for a picture is calculated by multiplying the picture size in bytes by 8, dividing by the inverse of the framerate, and then dividing by the buffer model level.

For example, for the pseudocode 1000 of FIG. 10, 600 KB in 16.67 ms will require a spike in bandwidth requirement of (600000×8)/(1/60)=287,942,412 bits per second if the buffer on the client device (e.g., 750, 752, 754, 756, or the like) is set for one frame or essentially no buffer. If the buffer is three frames and it is full, 95,980,804 bits per second are required to deliver the frame to the client device (e.g., 750, 752, 754, 756, or the like) for that encoder's encoded picture, provided the buffer was previously full.

For example, for the pseudocode 1000 of FIG. 10, bufferModel_Level is the number of pictures modeled that is in a buffer of the client device (e.g., 750, 752, 754, 756, or the like). If the client device (e.g., 750, 752, 754, 756, or the like) has a buffer model of n=3 and the buffer is full, there are n=3 playout pictures in the buffer before it is drained so the current picture can take up to n=3 time slots of picture playout time before the buffer is drained, and the packets will not arrive in time. In the example above, the selection of the picture to deliver is the picture that is the closest to the capped bitrate given to the encoder without exceeding the cap. The more encoder instances that were instantiated, the more options across the bitrate range the system 700 will have to choose from, which allows the system 700 to choose the best possible picture that will fit into the capped and/or max bitrate.

In order to achieve the best possible picture that will fit into the capped and/or max bitrate, for example, each encoder instance (e.g., 714, 720) sends its encoded picture state (e.g., 714*b*, 720*b*) to the encoded picture selector 730 for each encoded picture. The (e.g., PES or VES) packets—e.g., the packets of the selected picture to be sent to a multiplexer (not shown) and on to the client device (e.g., 750, 752, 754, 756, or the like)-will be selected, for example, using the method stated above. For the selected picture, the encoder state (e.g., 730*a*, 730*c*, e.g., of the encoder of the client device) will be sent to each of the encoder instances (e.g., 714, 720), which will allow the next encoded picture to be encoded to the decoder specification allowing the next picture from any of the encoder instances (e.g., 714, 720) to be selected based on the capped and/or max bitrate calculation and sent to the client device (e.g., 750, 752, 754, 756, or the like) without breaking (i.e., exceeding a capacity of) a decoder of the client device (e.g., 750, 752, 754, 756, or the like). For example, (e.g., PES or VES) bits of a selected picture (e.g., 730*b*, 730*d*) to be sent to the client device (e.g., 750, 752, 754, 756, or the like) are sent to the rate controller (e.g., 716, 722) for each of the encoder instances (e.g., 714, 720). This will allow each rate controller (e.g., 716, 722) of each encoder (e.g., 714, 720) to adjust a buffer model (e.g., 718, 724) of each controller (e.g., 716, 722) to match the client device (e.g., 750, 752, 754, 756, or the like) and adjust (e.g., picture) QPs (e.g., at 716*a*, 722*a*) going forward to be optimized based on the latest state (e.g., 730*a*, 730*b*) of a decoder picture buffer (not shown) of the client device (e.g., 750, 752, 754, 756, or the like).

Additional encoders (e.g., encoder . . . (not shown), n-th encoder 720, and so on) may, for example, be instantiated from an encoder instance pool 728 through a UI or an API call, provided there are available encoders in the encoder instance pool 728 during an encoder session. (Note: as used herein, an ellipsis, e.g., . . . , denotes that any suitable integer number (e.g., of encode instances) from 0 to n may be provided.) The ability for an encoder state to be transferred to the encoder (e.g., 714, 720) from the encoded picture selector 730 allows the newly instantiated encoder to come online and begin encoding pictures without requiring a GOP boundary, which is achieved, for example, from the received encoder state (e.g., 730*a*, 730*b*) from the previous picture that was delivered to the client device (e.g., 750, 752, 754, 756, or the like). Anytime an encoder is added or removed, the method defined in the pseudocode 1000 will be run again and the encoder bitrate distribution will be sent to each instantiated encoder. Also, for example, the ability for the encoder state to be transferred advantageously allows for the other non-selected encoders to encode the next picture in a state that can be decoded using the previous selected picture.

All the encoders (e.g., 714, 720) may, for example, share a common decoded picture buffer (DPB) (not shown) where reference pictures for predictive coding are stored and/or updated. For example, in this context, "updated" refers to adding and/or removing reference pictures to and/or from the DPB. This can eliminate the requirement for each encoder (e.g., 714, 720) to decode the bitstream of a selected picture at the time of populating the state. The decoded picture data is, for example, available from the encoder (e.g., 714, 720) that created the selected picture. For example, a decoder (not shown) is provided within each encoder (e.g., 714, 720), and the decoded or reconstructed picture is available for intra prediction within the frame. At the time of a state update, the decoded data of the selected picture can be added to the common DPB, e.g., through adjusting the pointers of memory access.

Additional details regarding the architecture (system) 700 are provided. For example, the encoder setting parameters module 712 of the encoder system 710 is configured to receive encoder setting parameters 701 (e.g., at least one of resolution, framerate, GOP structure, or the like). Also, for example, the encoder setting parameters module 712 is configured to communicate (e.g., transfer, exchange, transmit, or the like, e.g., at 712*a*, 712*b*) the encoder setting parameters to the first encoder 714 and to the n-th encoder 720 (e.g., if instantiated). Further, for example, the first encoder 714 is configured to communicate (e.g., at 714*a*), e.g., PES or VES, bits of an encoded picture from the first encoder 714 to the encoded picture selector 730. In addition, for example, the first encoder 714 is configured to communicate (e.g., at 714*b*), a state of the encoded picture from the first encoder 714 to the encoded picture selector 730. Moreover, for example, the n-th encoder 720 is configured to communicate (e.g., at 720*a*), (e.g., PES or VES) bits of an encoded picture from the n-th encoder 720 to the encoded picture selector 730. Furthermore, for example, the n-th encoder 720 is configured to communicate (e.g., at 720*b*), a state of the encoded picture from the n-th encoder 720 to the encoded picture selector 730.

For example, the system rate controller 726 of the encoder system 710 is configured to receive at least one of encoder setting parameters 702, a client device decoder buffer size 740*a* (e.g., from the ultra-low-latency delivery system 740), a demanded capped bitrate request 740*b* (e.g., from the ultra-low-latency delivery system 740, e.g., via the communication system 745), combinations of the same, or the like. Also, for example, the system rate controller 726 is configured to communicate information (e.g., at 726*d*, 728*a*) with the encoder instance pool 728. Further, for example, the system rate controller 726 is configured to communicate a demanded bitrate cap request (e.g., in bps, e.g., at 726*a*) to the first rate controller 716. In addition, for example, the system rate controller 726 is configured to communicate a client device buffer size (e.g., at 726*b*, 726*c*) to a buffer model 718 of the first rate controller 716 and to a buffer model 724 of the n-th rate controller 722, respectively. Moreover, for example, the system rate controller 726 is configured to communicate a demanded bitrate cap (e.g., requested bps-offset n, e.g., at 726*d*) to the buffer model 724 of the n-th rate controller 722. Furthermore, for example, the system rate controller 726 is configured to communicate a client device buffer size (e.g., at 726*e*) to the encoded picture selector 730.

For example, the first rate controller 716 is configured to receive at least one of the demanded bitrate cap request 726*a*, the client device buffer size 726*b*, (e.g., bits of) an optimal selected encoded picture 730*b* (e.g., from the encoded picture selector 730), combinations of the same, or the like. Also, for example, the first rate controller 716 is configured to communicate a picture QP (e.g., at 716*a*) to the first encoder 714. The n-th rate controller 722 may be similarly configured, as shown in FIG. 7.

For example, the encoded picture selector 730 is configured to receive at least one of (e.g., PES or VES) bits 714*a* of an encoded picture from the first encoder 714, a state 714*b* of the picture from the first encoder 714, (e.g., PES or VES) bits 720*a* of an encoded picture from the n-th encoder 720, a state 720*b* of the picture from the n-th encoder 720, a client device buffer size 726*e* from the system rate controller 726 (e.g., via a buffer model 732 of the encoded picture selector 730), combinations of the same, or the like. Also, for example, the encoded picture selector 730 is configured to communicate at least one of a state 730*a* of a selected encoder picture with respect to the client encoder (e.g., to the first encoder 714), bits 730*b* of an optimal selected encoded picture (e.g., to the buffer model 718 of the first rate controller 716), a state 730*c* of a selected encoder picture with respect to the client encoder (e.g., to the n-th encoder 720), bits 730*d* of an optimal selected encoded picture (e.g., to the buffer model 724 of the n-th rate controller 722), (e.g., PES or VES) bits 730*e* of an optimal selected encoded picture (e.g., to the buffer model 732 of the encoded picture selector 730), combinations of the same, or the like. Further, for example, the encoded picture selector 730 is configured to transmit the (e.g., PES or VES) bits 730*e* of the optimal selected encoded picture to the (e.g., ultra-low-latency) delivery system 740.

For example, the ultra-low-latency delivery system 740 is configured to receive at least one of an optimal selected encoded picture 710*a* (e.g., from the encoded picture selector 730 of encoder system 710, e.g., via the communication system 745), a buffer size 750*a* of a decoder of the client device (e.g., 750, 752, 754, 756, or the like, e.g., via the communication system 745), combinations of the same, or the like. Also, for example, the ultra-low-latency delivery system 740 is configured to transmit (e.g., PES or VES) bits 740*c* of a multiplexed, optimal, selected, encoded picture (e.g., via the communication system 745) to (e.g., a demultiplexer and/or decoder of) the client device (e.g., 750, 752, 754, 756, or the like).

For example, the client device (e.g., 750, 752, 754, 756, or the like) is configured to receive the bits 740*c* of the multiplexed, optimal, selected, encoded picture (e.g., from the ultra-low-latency delivery system 740, e.g., via the communication system 745). Also, for example, the client device (e.g., 750, 752, 754, 756, or the like) is configured to transmit the buffer size 750*a* of the decoder of the client device (e.g., to the ultra-low-latency delivery system 740, e.g., via the communication system 745).

In some embodiments, as shown in FIG. 8, an alternate system 800 is provided for achieving a similar result as in the system 700 defined in FIG. 7. For example, the system 800 includes at least one of encoder system 810, ultra-low-latency delivery system 880, client device (e.g., mobile phone or smartphone 890, display device 892 (e.g., a smart TV), dongle 894 (e.g., TiVo Stream 4K), set-top box or media streaming device 896 (e.g., TiVo SmartBox), or the like), combinations of the same, or the like. Also, for example, the ultra-low-latency delivery system 880 is connectable with the client device (e.g., 890, 892, 894, 896, or the like) via communication system 885 (e.g., internet, wireless network, or the like). Further, for example, the encoder system 810 includes at least one of an encoder setting parameters module 812, a picture preprocessing module 814, an encoder instance controller 816, an encoder instance pool 818, a first encoder instance 820, an n-th encoder instance 840, a rate controller 860, combinations of the same, or the like. In addition, for example, the first encoder instance 820 includes at least one of a current video frame (f(n)) 821, a reference video frame (f(n-1)) 822, a reconstructed video frame (f(n)) 823, an intra prediction module 824, an inter prediction module 825, a mode selector 826, a transformation and quantization module 827, an inverse transformation and quantization module 828, a CAVLC module 829 that outputs an encoded stream, an encoder state module 830, combinations of the same, or the like. Furthermore, for example, the functions of each of the parts 821-829 may correspond with similarly named parts 510-590 of the video encoder 500 of FIG. 5, respectively. Additionally, for example, the n-th encoder instance 840 includes at least one of a current video frame (f(n)) 841, a reference video frame (f(n-1)) 842, a reconstructed video frame (f(n)) 843, an intra prediction module 844, an inter prediction module 845, a mode selector 846, a transformation and quantization module 847, an inverse transformation and quantization module 848, a CAVLC module 849 that outputs an encoded stream, an encoder state module 850, combinations of the same, or the like. Still further, for example, the functions of each of the parts 841-849 may correspond with similarly named parts 510-590 of the video encoder 500 of FIG. 5, respectively, described herein. Even further, for example, the rate controller 860 includes at least one of a complexity estimation unit 874, a rate-quantization model 866, a ΔQP-limiter 864, a GOP bit allocation unit 870, a basic unit bit allocation unit 868, a QP initializer 872, a virtual buffer model 878, a QP encoder range generator and distributor 862, an encoded picture selection function 876, combinations of the same, or the like. Yet further, for example, the functions of each of the parts 874, 866, 864, 870, 868, 872, and 878 of the rate controller 860 may correspond with similarly named parts 620-650 of the rate controller 615 of FIG. 6, respectively, described herein.

For example, in the system 800, a single rate controller 860 is provided for one or more encoder instances (e.g., 820, 840). Also, for example, the rate controllers (e.g., 716, 722) in the encoder system 710 as defined in FIG. 7 or any other (e.g., single decoder) rate controller (e.g., 615) may be similar to the rate controller 860. Further, for example, the rate controller 860 receives a demanded and/or capped (or desired and/or maximum) bitrate 803 from a UI. In addition, for example, the rate controller 860 receives a bitrate set by an API call from a delivery system like SCREAM or WebRTC. Moreover, for example, as in FIG. 7, the encoder system 810 sets a number of encoder instances 804 to be instantiated at a start of an encoding session through, e.g., an API call to the encoder instance controller 816. Furthermore, for example, if the number of encoder instances is available, when a session of the encoder system 810 starts, the requested number (e.g., n) of encoder instances (e.g., 1-*n*) are started.

For example, the QP initializer 872 of the rate controller 860 sets an initial QP 872*a* based on a set desired and/or max bitrate 812*d*. Depending on the QP value set and the number of encoder instances, multiple QPs may be set from the max value (e.g., worst quality=51) to the initial QP value 872*a* given to the ΔQP-limiter 864. It is noted that, in some embodiments, for example, with VVC, a codec may have a different QP range. The ΔQP-limiter 864 sends the QP value 864*a* to a QP encoder range generator and distributor 862. If, for example, there is only one encoder instance, the QP value 864*a* received from the ΔQP-limiter 864 will be sent to the encoder instance. If, for example, there are two encoder instances, a minimum QP value for the codec the rate controller is controlling, e.g., a minimum QP value of, e.g., 51 will be sent to one encoder instance (e.g., the first encoder instance 820) and the QP value 864*a* received from the ΔQP-limiter 864 will be sent to the other encoder instance (e.g., the n-th encoder instance 840). While either of these examples may not result in an optimal or desired user experience, these examples provide an absolute worst case backup if the encoder with the desired QP produces an encoded picture that is too large to deliver to the client device (e.g., 890, 892, 894, 896, or the like) in time. That said, there is a very high probability that an alternate encoded picture will be small enough to deliver to the client device (e.g., 890, 892, 894, 896, or the like) in time.

If, for example, there is a single encoder, a single initial QP value will be set as if the rate controller 860 is controlling a single encoder. In the case of two or more encoders, depending on the number of encoders, the QP value per encoder may be set using, for example, pseudocode 1100 of FIG. 11.

That is, for example, as set forth in the pseudocode 1100, if there is only one encoder instance, set the QP value for Encoder 1 to QP. If there are multiple encoder instances, check if the current calculated QP is greater than the maximum QP minus the number of instantiated encoders. If it is, adjust the current calculated QP to be the maximum QP minus the number of instantiated encoders. Next, calculate the encoder QP step by dividing the difference between the maximum QP and the current calculated incoming QP by the number of encoder instances minus one. Set the variable n to the number of instantiated encoders and initialize the encoder QP to the maximum QP. Assign this QP value to the last encoder and decrement n by one. Then, while n is greater than one, decrease the encoder QP by the calculated step and assign this new QP value to the current encoder. Continue this process until n is one. Finally, set the QP value of the first encoder to the current calculated QP. The pseudocode 1100 works for two encoders, as previously described.

For example, the method defined in the pseudocode 1100 is run for every encoded picture since this QP is per picture and may change on a per picture basis. As each encoder encodes the picture, the encoder's actual picture bits (e.g., at 820*a*, 840*a*) (or (e.g., PES or VES) packet(s)) are delivered to the encoded picture selection function 876 of the rate controller 860. Each encoder also sends the encoder's bitstream (e.g., at 820*b*, 840*b*), encoder state (e.g., from 830), and picture state (e.g., at 820*c*, 840*c*) to the encoded picture selection function 876 of the rate controller 860 for each encoded picture. The encoded picture selection function 876 also receives the video framerate from the incoming encoder parameters (e.g., at 802). As provided with the pseudocode 1000, the required bitrate may, for example, be calculated in accordance with equation (4).

$$\text{requiredBitrateForPicture}=((\text{pictureSizeInBytes}\times 8)/(1/\text{framerate}))/\text{bufferModel\_Level} \quad (4)$$

For example, for each incoming picture, which includes (e.g., PES or VES) packet bits from each encoder instance, a comparison is made of the (e.g., PES or VES) packet bit size to the requiredBitrateForPicture. Also, for example, the encoded picture is selected based on a size of the picture that is closest to the requiredBitrateForPicture without going over the requiredBitrateForPicture.

For example, the selected (e.g., PES or VES) packet(s) for the picture will be multiplexed and sent to the ultra-low-latency delivery system 880 and delivered to the client device (e.g., 890, 892, 894, 896, or the like). Also, for example, a state of the encoder for the selected encoder's picture to deliver to the client device (e.g., 890, 892, 894, 896, or the like) is transferred back to each encoder instance (e.g., at 860*c*, 860*d*). Further, for example, by transferring the encoder's state for the selected encoder's picture to deliver (e.g., to the client device) back to each encoder instance, all the encoder instances to encode the next picture are provided in a state that will not break (i.e., exceed a capacity of) the decoder of the client device (e.g., 890, 892, 894, 896, or the like). In addition, for example, by transferring the encoder's state for the selected encoder's picture to deliver (e.g., to the client device) back to each encoder instance, generation of an IDR picture is not required. It is noted, as provided by, for example, the system 800, the avoidance of a requirement for generation of an IDR picture represents a difference from and improvement over a live ABR encoder. In contrast, a live ABR encoding system encodes frame aligned encodings, which will be packaged into segment encodings. With such live ABR encoding, a client device can only change the request of bitrates at a segment boundary and cannot change the request of bitrates within a segment boundary unless multiple closed GOPs are included within the segment. Then, all frames up until the next GOP would fail to decode.

In the case where there are resource constraints, where, for example, a number of encoder instances may be limited, another bitrate or QP assignment method is provided instead of evenly spacing the step calculation, as provided with the system 700 and the system 800. In the system 700, for example, inverse logarithmic spacing is utilized to calculate bitrate steps assigned for each encoder instance, so that more granular values are achieved in higher values (closer to a desired bit rate) and a wider range for lower values. Similarly, for example, logarithmic spacing is utilized in the system 800 to calculate QP steps with more granularity in lower values (closer to a low QP for a desired quality) and a wider range for higher values. As shown in FIG. 12, pseudocode 1200 is provided for a bit rate step calculation (e.g., for the system 700) using inverse logarithmic spacing if there is a hard limit for number of allowed encoder instances.

That is, for example, as set forth in the pseudocode 1200, if there is only one allowed encoder instance, set the bitrate for Encoder 1 to the capped bitrate. If there are more than one allowed encoder instances, calculate the base value by raising the ratio of the minimum bitrate to the capped bitrate to the power of one divided by the number of allowed encoder instances minus one. Initialize n to 1 and set the encoder bitrate to the capped bitrate. Assign this bitrate to Encoder 1. Then, while n is less than or equal to the number of encoder instances minus one, increment n by one. Calculate the encoder bitrate step by multiplying the capped bitrate by the base raised to the power of the number of allowed encoder instances minus one minus n. Subtract this step from the capped bitrate to get the new encoder bitrate and assign this bitrate to the current encoder. Continue this process until all encoder instances have been assigned a bitrate.

Additional details regarding the architecture (system) 800 are provided. For example, the system 800 is configured to receive at least one of uncompressed video 801, encoding parameters 802, a desired and/or max bitrate 803, a number of encoder instances 804, a client device decoder picture buffer size 880*a*, combinations of the same, or the like. Also, for example, after processing, the system 800 is configured to transmit (e.g., PES or VES) bits of a selected encoded picture 810*a* (e.g., to the ultra-low-latency delivery system 880, e.g., via the communication system 885).

For example, the encoder setting parameters module 812 is configured to receive at least one of the encoding parameters 802 (e.g., at least one of resolution, framerate, GOP structure, or the like), the desired and/or max bitrate 803, combinations of the same, or the like. Also, for example, the encoder setting parameters module 812 is configured to communicate at least one of the encoder setting parameters, e.g., to at least one of the picture preprocessing module 814 (e.g., at 812*a*), the first encoder instance 820 (e.g., at 812*b*), to the n-th encoder instance 840 (e.g., at 812*c*, e.g., if instantiated), combinations of the same, or the like. Further, for example, the encoder setting parameters module 812 is configured to communicate a video framerate (e.g., at 812*d*), e.g., to the encoded picture selection function 876 of the rate controller 860. In addition, for example, the encoder setting parameters module 812 is configured to communicate a desired and/or max bitrate, e.g., to at least one of the QP initializer 872 of the rate controller 860 (e.g., at 812*e*), the virtual buffer model 878 of the rate controller 860 (e.g., at 812*f*), combinations of the same, or the like.

For example, the picture preprocessing module 814 is configured to receive at least one of uncompressed video 801, encoder setting parameters 812*a* (e.g., from the encoder setting parameters module 812), combinations of the same, or the like. The picture preprocessing module 814 is configured to communicate processed uncompressed video, e.g., to at least one of the first encoder instance 820 (e.g., at 814*a*), to the n-th encoder instance 840 (e.g., at 814*b*, e.g., if instantiated), combinations of the same, or the like.

For example, the encoder instance controller 816 is configured to receive the number of encoder instances 804. Also, for example, the encoder instance controller 816 is configured to communicate the number of encoder instances to at least one of the QP encoder range generator and distributor 862 of the rate controller 860 (e.g., at 816*a*), the encoder instance pool 818 (e.g., at 816*b*), combinations of the same, or the like.

For example, the encoder instance pool 818 is configured in a manner similar to that of the encoder instance pool 728 of the system 700, described above. Also, for example, the encoder instance pool 818 is configured to receive the number of encoder instances (e.g., at 816*b*). Further, for example, the encoder instance pool 818 is configured to communicate with at least one of the first encoder instance 820 (e.g., at 818*a*), the n-th encoder instance 840 (e.g., at 818*b*, e.g., if instantiated), combinations of the same, or the like.

For example, the first encoder instance 820 (which may be a sole encoder instance or one of a plurality, as described herein) is configured to receive at least one of the encoder setting parameters 812*b* (e.g., from the encoder setting parameters module 812), the processed uncompressed video 814*a* (e.g., from the picture preprocessing module 814), a QP value (e.g., at 860*a*, e.g., from the QP encoder range generator and distributor 862 of the rate controller 860), the encoder's state for the selected encoder's picture to deliver to the client device 860*c* (e.g., from the encoded picture selection function 876), combinations of the same, or the like. Also, for example, the QP value 860*a* is received at the transformation and quantization module 827. Further, for example, the 860*c* encoder's state for the selected encoder's picture to deliver to the client device 860*c* is received at the encoder state module 830. In addition, for example, the first encoder instance 820 is configured to communicate at least one of actual bits of a picture 820*a* (e.g., from the CALVC module 829 to, e.g., the encoded picture selection function 876), residual bits of a picture 820*b* (e.g., from the inter prediction module 825 to, e.g., the encoded picture selection function 876), a picture state 820*c* (e.g., from the encoder state module 830 to, e.g., the encoded picture selection function 876), combinations of the same, or the like.

For example, the n-th encoder instance 840 functions similarly to that described herein with respect to the first encoder instance 820. One difference between the instances relates, for example, to the QP value, which includes an (e.g., +/−) offset (e.g., at 860*b*) when received, e.g., by the transformation and quantization module 847, e.g., from the QP encoder range generator and distributor 862.

For example, the rate controller 860 is configured to receive at least one of a video framerate 812*d* (e.g., at the encoded picture selection function 876), a desired/max bitrate 812*e* (e.g., at the QP initializer 872), a desired/max bitrate 812*f* (e.g., at the virtual buffer model 878), a number of encoder instances 816 (e.g., at the QP encoder range generator and distributor 862), actual bits of a picture 820*a*, (e.g., at the encoded picture selection function 876), residual bits of a picture 820*b* (e.g., at the encoded picture selection function 876), a picture state 820*c* (e.g., at the encoded picture selection function 876), actual bits of a picture 840*a*, (e.g., at the encoded picture selection function 876), residual bits of a picture 840*b* (e.g., at the encoded picture selection function 876), a picture state 840*c* (e.g., at the encoded picture selection function 876), combinations of the same, or the like. Also, for example, the rate controller 860 is configured to communicate at least one of a QP 860*a* (e.g., to the first encoder instance 820), a QP value including an (e.g., +/−) offset (e.g., at 860*b*, e.g., to the n-th encoder instance 840), the encoder's state for the selected encoder's picture to deliver to the client device 860*c*, the encoder's state for the selected encoder's picture to deliver to the client device 860*d*, (e.g., PES or VES) bits of a selected encoded picture 810*a* (e.g., to the ultra-low-latency delivery system 880, e.g., via the communication system 885), combinations of the same, or the like. Further, for example, the encoded picture selection function 876 is configured to communicate at least one of selected encoder basic unit residuals 876*a* (e.g., to the rate-quantization model 866), selected encoder basic unit residuals 876*b* (e.g., to the complexity estimation unit 874), (e.g., PES or VES) bits of a selected encoded picture 876*c* (e.g., to the virtual buffer model 878), the selected encoded picture 810*a* (e.g., to the ultra-low-latency delivery system 880, e.g., via the communication system 885), combinations of the same, or the like. In addition, for example, the complexity estimation unit 874 is configured to communicate a selected encoder picture mean average difference 874*a* (e.g., to the rate-quantization model 866). Moreover, for example, the virtual buffer model 878 is configured to communicate a size 878*a* of the virtual buffer model to the encoded picture selection function 876. Furthermore, for example, the virtual buffer model 878 is configured to communicate a buffer fullness 878*b* to at least one of the basic unit bit allocation unit 868, the GOP bit allocation unit 870, combinations of the same, or the like.

For example, the ultra-low-latency delivery system 880 is configured to receive the selected encoded picture 810*a* (e.g., from the rate controller 860 of the encoder system 810, e.g., via the communication system 885). Also, for example, the ultra-low-latency delivery system 880 is configured to receive a picture buffer size of a decoder of a client device (e.g., at 890*a*) from a client device (e.g., 890, 892, 894, 896, or the like), e.g., via the communication system 885. Further, for example, the ultra-low-latency delivery system 880 is configured to transmit the client device decoder picture buffer size 880*a* (e.g., to the virtual buffer model 878, e.g., via the communication system 885). In addition, for example, the ultra-low-latency delivery system 880 is configured to transmit (e.g., PES or VES) bits of a multiplexed, optimal, selected, encoded picture (e.g., at 880*b*) to a client device (e.g., 890, 892, 894, 896, or the like), e.g., via the communication system 885.

For example, the client device (e.g., 890, 892, 894, 896, or the like) is configured to receive the multiplexed, optimal, selected, encoded picture 880*b* (e.g., from the ultra-low-latency delivery system 880, e.g., via the communication system 885). Also, for example, the client device (e.g., 890, 892, 894, 896, or the like) is configured to transmit the picture buffer size of the decoder of the client device 890*b* (e.g., to the ultra-low-latency delivery system 880, e.g., via the communication system 885).

In some embodiments, there may be cases where, for example, ultra-low latency is only required in portions of a video streaming session, and, in other cases, where ultra-low latency may be required. For these cases, for example, a system is provided that receives feedback from another system, which reports (e.g., to the client device) or server a desired maximum latency. Based on this determination, the client may adjust its buffered encoded pictures to be higher or lower. In this case, the dynamic buffer and desired latency may result in more or fewer encoder instances that will be required. This is another case where the number of encoders may be required to dynamically increase or decrease based on the size of the required buffer size. It is noted that when changing a buffer size, there will be a challenge of how the buffer is increased or decreased in size. For example, a buffer may be increased or decreased in size by increasing the buffer size on the client device. However, in many cases, the encoded pictures will be smaller in size than what is required to deliver those pictures (e.g., to the client device). This will be true when the difference between one picture and the next is not so large. The encoded pictures will arrive (e.g., to the client device) more quickly than what is required based on the framerate of the video. This may be accelerated by the rate controller picture selection system selecting pictures that are significantly lower than the calculated bitrate threshold for the video framerate until the increased buffer is full. Once the buffer is full, the number of encoder instances may be reduced all the way down to a single encoder.

In some embodiments, as shown in FIG. 9, an example of an architecture (system) 900 is provided with an external system (e.g., 910, 912, or the like) making a request for a latency to a video encoding system 920. For example, the system 900 includes at least one of a video source with allowed buffer drain 910 (e.g., a video game engine, or the like), a video source with forced buffer flush 912 (e.g., a SLAM camera system, remote controlled equipment, or the like), the video encoding system 920, an ultra-low-latency delivery system 940, a client device (e.g., mobile phone or smartphone 950, display device 952 (e.g., a smart TV), dongle 954 (e.g., TiVo Stream 4K), set-top box or media streaming device 956 (e.g., TiVo SmartBox), or the like), combinations of the same, or the like. Also, for example, the video encoding system 920 includes at least one of a video source input 922, a video preprocessor 924, a first encoder 926, an n-th encoder 928, a system rate controller 930, combinations of the same, or the like. Further, for example, the system rate controller 930 includes at least one of a client buffer latency controller 932, a module 934 for transmitting selected encoder bits (e.g., PES or VES packets) to the client device (e.g., 950, 952, 954, 956, or the like), a modeled buffer 936, combinations of the same, or the like.

For example, the video source with allowed buffer drain 910 is configured to receive a request to pause and/or resume video rendering 920*a* (e.g., from the client buffer latency controller 932). Also, for example, the video source with allowed buffer drain 910 is configured to transmit at least one of information 910*a* (e.g., a video stream, e.g., to the video source input 922), a latency request 910*b* (e.g., in frames with controlled buffer drain, e.g., to the client buffer latency controller 932), combinations of the same, or the like.

For example, the video source with forced buffer flush 912 is configured to receive a requested latency 901. Also, for example, the video source with forced buffer flush 912 is configured to transmit at least one of information 912*a* (e.g., a video stream, e.g., to the video source input 922), an instant latency request 912*b* (e.g., in frames, e.g., to the client buffer latency controller 932), combinations of the same, or the like.

For example, the video encoding system 920 is configured to receive at least one of a still image to render 902, the information 910*a* (e.g., from the video source with allowed buffer drain 910), the information 912*a* (e.g., from the video source with forced buffer flush 912), the latency request 910*b* (e.g., from the video source with allowed buffer drain 910), the instant latency request 912*b* (e.g., from video source with forced buffer flush 912), a client device decoder picture buffer size (e.g., in frames) 950*a* (e.g., from the client device (e.g., 950, 952, 954, 956, or the like), e.g., via the communication system 945 (e.g., internet, wireless network, or the like)), a flush buffer request/response 950*b* (e.g., from the client device (e.g., 950, 952, 954, 956, or the like), e.g., via the communication system 945), combinations of the same, or the like. Also, for example, the video encoding system 920 is configured to transmit at least one of the request to pause and/or resume video rendering 920*a* (e.g., from the client buffer latency controller 932 of the video encoding system 920, e.g., to the video source with allowed buffer drain 910), information 920*b* (e.g., selected encoded picture (e.g., PES or VES) bits, e.g., from the module 934 (for transmitting selected encoder bits) of the video encoding system 920, e.g., to the ultra-low-latency delivery system 940), a client device decoder picture buffer size (e.g., in frames) 920*c* (e.g., from the modeled buffer 936 of the video encoding system 920, e.g., to the client device, e.g., via the communication system 945), a flush buffer request/response 920*d* (e.g., from the modeled buffer 936 of the video encoding system 920, e.g., to the client device, e.g., via the communication system 945), combinations of the same, or the like.

For example, the video source input 922 is configured to receive at least one of the information 910*a* (e.g., from the video source with allowed buffer drain 910), the information 912*a* (e.g., from the video source with forced buffer flush 912), combinations of the same, or the like. Also, for example, the video source input 922 is configured to communicate video source information 922*a* to the video preprocessor 924.

For example, the video preprocessor 924 is configured to receive at least one of the still image to render 902, the video source information 922*a* (e.g., from the video source input 922), a render internal picture on/off notification 932*e* (e.g., from the client latency controller 932 of the system rate controller 930), combinations of the same, or the like. Also, for example, the video preprocessor 924 is configured to communicate at least one of a preprocessed image 924*a* (e.g., to the first encoder 926), a preprocessed image 924*b* (e.g., if instantiated, to the n-th encoder 928), combinations of the same, or the like.

For example, the first encoder 926 is configured to receive at least one of the preprocessed image 924*a*, (e.g., from the video preprocessor 924), a force IDR 932*a* (e.g., from the client buffer latency controller 932 of the system rate controller 930), pause/resume encoding 932*c* (e.g., from the client buffer latency controller 932 of the system rate controller 930), combinations of the same, or the like. Also, for example, the first encoder 926 is configured to communicate bits 926*a* (e.g., PES or VES packets, e.g., to the module 934 (for transmitting selected encoder bits) of the system rate controller 930).

When instantiated, for example, the n-th encoder 928 may be similarly configured. That is, for example, the n-th encoder 928 is configured to receive at least one of the preprocessed image 924*b*, (e.g., from the video preprocessor 924), a force IDR 932*b* (e.g., from the client buffer latency controller 932 of the system rate controller 930), pause/resume encoding 932*d* (e.g., from the client buffer latency controller 932 of the system rate controller 930), combinations of the same, or the like. Also, for example, the n-th encoder 928 is configured to communicate bits 928*a* (e.g., PES or VES packets, e.g., to the module 934 (for transmitting selected encoder bits) of the system rate controller 930).

For example, the system rate controller 930 is configured to receive at least one of the latency request 910*b* (e.g., at the client buffer latency controller 932, e.g., from the video source 910), the information 912*b* (e.g., at the client buffer latency controller 932, e.g., from the video source 912), the bits 926*a* (e.g., at the module 934, e.g., from the first encoder 926), the bits 928*a* (e.g., at the module 934, e.g., if instantiated, from the n-th encoder), the client device decoder picture buffer size (e.g., in frames) 950*a* (e.g., at the modeled buffer 936, e.g., from the client device, e.g., via the communication system 945), the flush buffer request/response 950*b* (e.g., at the modeled buffer 936, e.g., from the client device, e.g., via the communication system 945), combinations of the same, or the like. Also, for example, the system rate controller 930 is configured to communicate at least one of the force IDR 932*a* (e.g., to the first encoder 926), the force IDR 932*b* (e.g., if instantiated, to the n-th encoder 928), the pause/resume encoding 932*c* (e.g., to the first encoder 926), the pause/resume encoding 932*d* (e.g., if instantiated, to the n-th decoder 928), the render internal picture on/off notification 932*e* (e.g., to the video preprocessor 924), the pause-resume video rendering 920*a* (e.g., to the video source 910), the bits 920*b* (e.g., to the ultra-low-latency delivery system 940), combinations of the same, or the like.

For example, the client buffer latency controller 932 of the system rate controller 930 is configured to receive at least one of the latency request 910*b* (e.g., at the client buffer latency controller 932, e.g., from the video source 910), the information 912*b* (e.g., at the client buffer latency controller 932, e.g., from the video source 912), an indicator of virtual modeled buffer fullness 936*a* (e.g., in frames, e.g., from the modeled buffer 936), combinations of the same, or the like. Also, for example, the client buffer latency controller 932 of the system rate controller 930 is configured to communicate at least one of the force IDR 932*a* (e.g., to the first encoder 926), the force IDR 932*b* (e.g., if instantiated, to the n-th encoder 928), the pause/resume encoding 932*c* (e.g., to the first encoder 926), the pause/resume encoding 932*d* (e.g., if instantiated, to the n-th decoder 928), the render internal picture on/off notification 932*e* (e.g., to the video preprocessor 924), the pause-resume video rendering 920*a* (e.g., to the video source 910), the bits 920*b* (e.g., to the ultra-low-latency delivery system 940), a flush buffer request 932*f* (e.g., to the modeled buffer 936), an indicator to set a virtual modeled buffer size 932*g* (e.g., in frames, e.g., to the modeled buffer 936), combinations of the same, or the like.

For example, the module 934 for transmitting selected encoder bits (e.g., PES or VES packets) to the client device (e.g., 950, 952, 954, 956, or the like) is configured to receive at least one of the bits 926*a* (e.g., from the first encoder 926), the bits 928*a* (e.g., if instantiated, from the n-th encoder), combinations of the same, or the like. Also, for example, the module 934 is configured to communicate at least one of a selected encoded picture size 934*a* (e.g., to the modeled buffer 936), the information 920*b* (e.g., selected encoded picture (e.g., PES or VES) bits, e.g., to the ultra-low-latency delivery system 940), combinations of the same, or the like.

For example, the modeled buffer 936 is configured to receive selected encoded picture size 934*a* (e.g., from the module 934), the flush buffer request 932*f* (e.g., from the client buffer latency controller 932), the indicator to set the virtual modeled buffer size 932*g* (e.g., from the client buffer latency controller 932), the client device decoder picture buffer size 950*a* (e.g., from the client device, e.g., via the communication system 945), the flush buffer request/response 950*b* (e.g., from the client, e.g., via the communication system 945), combinations of the same, or the like. Also, for example, the modeled buffer 936 is configured to communicate at least one of the indicator of virtual modeled buffer fullness 936*a* (e.g., to the client buffer latency controller 932), the client device decoder picture buffer size 920*c* (e.g., to the client device, e.g., via the communication system 945), the flush buffer request/response 920*d* (e.g., to the client device, e.g., via the communication system 945), combinations of the same, or the like.

For example, the ultra-low-latency delivery system 940 is configured to receive the information 920*b* (e.g., from the module 934 of the system rate controller 930 of the video encoding system 920, e.g., via the communication system 945). Also, for example, the ultra-low-latency delivery system 940 is configured to transmit multiplexed, optimal, selected, encoded picture (e.g., PES or VES) bits 940*a* (e.g., to the client device, e.g., via the communication system 945).

For example, the client device (e.g., 950, 952, 954, 956, or the like) is configured to receive at least one of the multiplexed, optimal, selected, encoded picture (e.g., PES or VES) bits 940*a* (e.g., from the ultra-low-latency delivery system 940, e.g., via the communication system 945), the client device decoder picture buffer size 920*c* (e.g., from the modeled buffer 936 of the system rate controller 930 of the video encoding system 920, e.g., via the communication system 945), the flush buffer request/response 920*d* (e.g., from the modeled buffer 936 of the system rate controller 930 of the video encoding system 920, e.g., via the communication system 945), combinations of the same, or the like. Also, for example, the client device (e.g., 950, 952, 954, 956, or the like) is configured to transmit at least one of the client device decoder picture buffer (DPB) size 950*a* (e.g., to the modeled buffer 936 of the system rate controller 930 of the video encoding system 920, e.g., via the communication system 945), the flush buffer request/response 950*b* (e.g., to the modeled buffer 936 of the system rate controller 930 of the video encoding system 920, e.g., via the communication system 945), combinations of the same, or the like. Further, for example, a coded picture buffer (CPB) size is provided for buffer modeling. The CPB represents the buffered bitstream, which is provided for estimating at least one of the latency, decoding, playback state, or the like in video streaming. In addition, for example, the DPB shows decoded pictures, which are used in referencing and eventually are transmitted to the display.

There are, for example, two modes when requesting the latency change. For example, Mode 1 refers to an external system like a video game engine (e.g., at the video source 910). In this case, a latency request is made to the client buffer latency controller 932 with controlled buffer drain (e.g., at the video source 910). When the request is made, the client buffer latency controller 932 will make a request to change the modeled buffer 936 to support the required latency. Based on a size of the modeled buffer 936, if the modeled buffer 936 is required to decrease in size, the client buffer latency controller 932 will make a request (e.g., at 920*a*) for the video source 910 to pause sending video to the video encoding system 920 to allow the client's buffer to drain while playing the buffered video. It is assumed in this case this will be a transition from a higher latency portion of the session like a game cutscene where a single encoder (e.g., a single instance of an encoder, e.g., the first encoder 926 without additional instances of encoders) can deliver the pictures due to the much larger buffer to actual game play for, e.g., a first-person shooter (FPS) game. The video encoding will also be paused during the buffer drain and will resume the encoding on the first frame rendered by the video source (e.g., 910) when the video playout is resumed. Once the buffer has drained to the required level as reported by the modeled buffer 936, the client buffer latency controller 932 will start the multiple encoder instances (e.g., the first encoder 926 to the n-th encoder 928), send a request (e.g., at 920*a*) to the video source (e.g., 910) to resume playout and/or rendering video. At the same time, the client buffer latency controller 932 will request all instantiated encoders (e.g., the first encoder 926 to the n-th encoder 928) to resume video encoding. At the same time, all instantiated encoders (e.g., the first encoder 926 to the n-th encoder 928) will receive the encoder state (not shown in FIG. 9, but similar to that shown in FIGS. 7 and 8) from an encoder that was previously rendering video in the larger buffer state.

If there is a requirement to increase the buffer from its current size due to a lower latency requirement, which may only require one encoder (e.g., a single instance of an encoder, e.g., the first encoder 926 without additional instances of encoders), the buffer will be required to fill to a full state after its increase in size request. The client buffer latency controller 932 will receive the buffer fullness in frames of the new modeled buffer 936 size. In this case for the buffer fill, the video source (e.g., 910) could render black frames or some still image with a busy cursor for a number of pictures for the required duration to allow the buffer to become completely filled with encoded pictures. Once the buffer is completely filled, the video source (e.g., 910) may resume playout of the rendered content. An alternate solution is the video preprocessor (e.g., 924) of the encoder may receive a request to render internal pictures during buffer fill while the video source (e.g., 910) is paused. In this case, a single color, like all black pixels, may be rendered. An alternate solution is the preprocessor (e.g., 924) may receive an image to render for the buffer fill. This could even be a still image (e.g., 902) advertisement that would be sent from an advertisement system. Encoders deemed not required for the requested latency will be requested to pause encoding. Once the larger buffer is full, the client buffer latency controller 932 will issue a request for the video source (e.g., 910) to resume playout. All encoder instances that are required for the requested latency will receive a resume encoding request.

For example, Mode 2 is an example of a video source (e.g., 912) from camera systems for ultra-low-latency remote vehicle control or a video feed for a cloud based SLAM system. In this case, when an ultra-low-latency switch is made decreasing the size of the picture buffer, it is undesirable to drain the larger buffer. An example prompting this type of request would be the requirement to track fast moving objects. Another reason may be an object is within a certain threshold distance away from a remote controlled vehicle or a robot implementing the cloud based SLAM system. In the example system of FIG. 9, the requested latency would be made by the system 900 determining situations like those just mentioned into the video source (e.g., 912) with forced buffer flush. When the rendering system receives a request for a latency, which is lower than the requested latency, the video source (e.g., 912) with forced buffer flush will make an instant latency request in frames (e.g., at 912*b*) to the client buffer latency controller 932 for a requested buffered picture latency. The client buffer latency controller 932 will make a request to flush the modeled buffer 936 (e.g., at 932*f*). The modeled buffer 936 will be reset to the new buffer size. At the same time, the number of encoder instances (e.g., the first encoder 926 to the n-th encoder 928) will be brought online to support the required latency. The client device (e.g., 950, 952, 954, 956, or the like) will also receive the flush buffer and buffer resize request (e.g., at 920*c*, 920*d*). Once the required encoders (e.g., the first encoder 926 to the n-th encoder 928) are online, the client buffer latency controller 932 will issue a force IDR request (e.g., at 932*a*, 932*b*) to all encoders (e.g., the first encoder 926 to the n-th encoder 928). This will allow the next picture to be decoded by the client device (e.g., 950, 952, 954, 956, or the like) with no requirement from the pictures that were flushed from the client's buffer.

In the case of increasing the buffer size on the client device (e.g., 950, 952, 954, 956, or the like) when operating in Mode 2, a simple request to the modeled buffer 936 can be made for the size increase. Once the request is made, the increase in buffer size is made to the client device (e.g., 950, 952, 954, 956, or the like). The client device (e.g., 950, 952, 954, 956, or the like) will then begin buffering pictures until the buffer is full. Once the buffer is full, the client device (e.g., 950, 952, 954, 956, or the like) will resume playout of the incoming video.

In some embodiments, a deep learning framework for a single rate controller and multiple encoders in ultra-low-latency encoding is provided. For example, in addition to one of the frameworks utilizing dynamically implemented multiple encoders (see, e.g., system 700 of FIG. 7, system 800 of FIG. 8, or system 900 of FIG. 8), a deep learning-based computer vision (CV) model (see, e.g., FIGS. 13-17) is provided to determine an optimal number of encoder instances based on a complexity of frames to be encoded. Also, for example, the model determines a QP range required for each encoder. Further, for example, the QP range required for each encoder drives a rate controller in terms of QP values across each of the instantiated encoders.

Encoding of ultra-low-latency videos requires minimal encoding time and a minimum buffer size. These requirements are crucial for applications like live streaming and cloud gaming, where delays are not desired. Usually, single GOPs are present in a low-latency application, which has an I-frames and P-frames (IP) GOP structure. That is, there is only one I-frame sent across during the beginning of the session and the rest of the frames are P-frames. When there is a scene change, the prediction accuracy for P-frames will drop and thus residual frames will contain a lot of information, causing bitrate increase. In some approaches, rate control mechanisms manage bitrate and quality. Such methods are based on an architecture of an encoding system with a single rate controller, which provides a maximum bitrate and desired QP to a single encoder to output compressed video. As noted in detail herein, ultra-low latency is provided in a system with, for example, multiple encoders and a single rate controller (again, see, e.g., system 700 of FIG. 7, system 800 of FIG. 8, or system 900 of FIG. 8). For these systems, additional encoders are instantiated from an encoder pool through, for example, a UI or an API call. If a greater or a lesser number of encoders are specified than required, computational resources may be wasted or a system may be underutilized. As provided herein, one or more deep learning models predict an optimal number of encoder instances for systems having multiple encoder instances (e.g., systems 700, 800, 900). Each encoder is provided a QP from, for example, a single rate controller. Also, for example, a QP is predicted by a system, possibly enabled by deep learning.

In some embodiments, one or more deep learning-based models are provided for multi-encoder systems. For example, the deep learning-based models predict an optimal number of encoder instances and an optimal QP distribution among the optimal number of encoders.

In some embodiments, a hybrid model is provided to predict the number of encoder instances of multi-encoder systems. A residual frame of a current time stamp is processed by an unsupervised conditional neural network, which also accepts conditional parameters like encoder settings, video genre, or the like. A latent space of the network provides an estimate of complexity of encoding a frame and another supervised model predicts the number of encoder instances based on the learned latent representations.

In some embodiments, a model is provided to predict an optimal distribution of QPs among a number of encoders. For example, the model is trained based on a supervised approach, which accepts a predicted number of encoder instances and an initial QP as input and outputs QP values for each encoder.

In an embodiment, a system incorporates long-term video prediction to output a predicted frame and thereby a residual frame is provided. This system includes two modules for video prediction and residual latent learning. A multi-stage learning system is provided for jointly training these two modules. During video transmission, these models are fine-tuned and used separately for real-time inference.

In some embodiments, a video prediction module is provided. For example, a deep learning-based long-term prediction model predicts P-frames in a GOP and the predicted frames are cached in a buffer. The decision to choose or skip an encoder instance controller is based on the MSE of the predicted frames. Also, for example, the buffer will be only reset in case the MSE of the current predicted frame is greater than a threshold. The system can skip encoder instance decision if the MSE is less than a threshold and continue with previously encoded frame settings. This caching and long-term prediction will help the system to reduce computational overhead.

In some embodiments, cloud-rendered content, e.g., for cloud gaming, are provided at ultra-low latency. For example, packet loss is optimized in extreme low-latency scenarios. Also, for example, deep learning optimizes resource usage for extreme low-latency scenarios. Further, for example, a single rate controller (or a rate controller per encoder) is provided to control multiple encoders to achieve an ultra-low-latency capped bit rate using machine and/or deep learning to determine an optimal number of encoders and a QP distribution among these encoders. In addition, for example, the rate controller and encoders are provided as a web service or as part of an API call. Moreover, for example, a subscription to an ultra-low-latency encoding service is provided.

As described in detail herein, FIG. 8 provides a system 800 for multiple encoder instances with a single rate controller. For example, deep learning estimation is provided for at least one of the encoder instance controller 816 of the encoder system 810, the current video frame (f(n)) 821 of the first encoder instance 820, the reference video frame (f(n-1)) 822 of the first encoder instance 820, the reconstructed video frame (f(n)) 823 of the first encoder instance 820, the QP encoder range generator and distributor 862 of the rate controller 860, the encoded picture selection module 876 of the rate controller 860, combinations of the same, or the like.

In some embodiments, two deep learning models are provided. For example, Model A predicts a number of encoder instances. Also, for example, Model B predicts a QP distribution for the predicted encoder instances.

In some embodiments, dataset generation is provided. For example, a training dataset for one or more models is generated by passing uncompressed videos through the system 800 of FIG. 8. Also, for example, 52 encoders are instantiated in this phase to facilitate encoding with QP from 0 to 51 in the case of AVC. Further, for example, in the case of VVC, 64 encoders (e.g., 0-63) are provided to facilitate encoding with QP from 0 to 63, respectively. In addition, for example, the QP of the selected picture for each frame in a video is evaluated. Moreover, for example, based on the range of QPs' distribution, the ground truth value is calculated for the number of encoders required for each frame. Furthermore, for example, with the system 800 of FIG. 8 the calculated number of encoder instances is used to obtain selected QPs for each frame. Additionally, for example, initially, uniform spacing for QPs distribution among the encoders is provided. Still further, for example, based on the selected QPs' distribution in a video, estimates are made regarding how QPs are distributed among a set of encoders. Even further, for example, the ground-truth of the number of encoders is approximated. Yet further, for example, a best QP distribution among multiple encoders for each frame is provided.

In some embodiments, an encoder instances prediction model (Model A) is provided. For example, a hybrid learning approach is provided for estimating an optimal number of encoders. Also, for example, an unsupervised model extracts features of input residual frames. Further, for example, a supervised model learns the number of encoders based on the learned latent representations.

Figure 13:
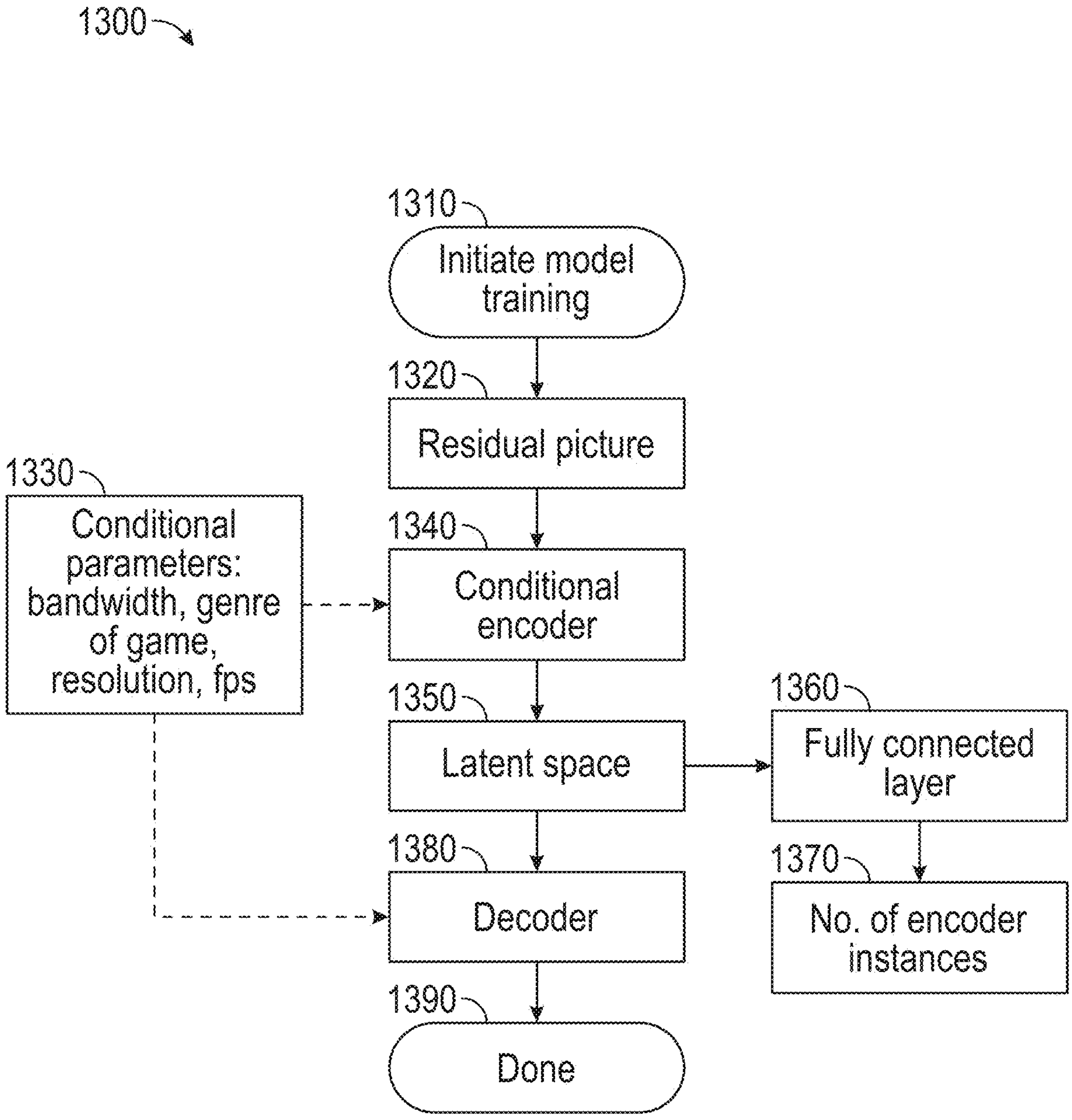
FIG. 13 is a flowchart of a training phase of an encoder instances prediction model, in accordance with some embodiments of the disclosure.

FIG. 13 is a flowchart of a training phase of an encoder instances prediction model, in accordance with some embodiments of the disclosure. For example, as shown in FIG. 13, a process 1300 for training an encoder instances prediction model includes at least one of an initiate model training step 1310, a residual pictures step 1320, a conditional parameters (e.g., bandwidth, genre of a game, resolution, frames per second, or the like) step 1330, a conditional encoder step 1340, a latent space step 1350, a fully connected layer step 1360, a number of encoder instances step 1370, a decoder step 1380, and a completion (done) step 1390. For example, CVAEs are employed for efficient latent space learning, incorporating conditional parameters to guide the encoder and decoder. Also, for example, the training involves a combined loss function that includes reconstruction loss and KL-Divergence loss to regularize the latent space. Additionally, a prediction loss function measures how well the model's predictions match actual values, ensuring accurate encoder instance predictions.

For example, the initiate model training step 1310 includes setting up a model training environment. The initiate model training step 1310 includes loading the dataset, initializing model parameters, and configuring the training process. Also, for example, the residual pictures step 1320 includes processing of residual pictures. Residual pictures refer to differences between consecutive pictures in a sequence. Residual pictures are used to capture motion and identify changes over time, thus reducing redundancy and freeing up processing for significant changes. Further, for example, the conditional parameters step 1330 includes setting conditional parameters such as bandwidth, genre of a game, resolution, and pictures per second. The conditional parameters configure the model to specific conditions and requirements, ensuring optimal performance under varying scenarios. In addition, for example, in the conditional encoder step 1340, input data is processed based on the conditional parameters set in the previous step 1330. In the conditional encoder step 1340, the data is encoded into a format suitable for further processing. Moreover, for example, in the latent space step 1350, the encoded data is mapped into a latent space. Latent space is a lower-dimensional representation of the data that captures its selected features. Furthermore, for example, in the fully connected layer step 1360, a fully connected layer, also known as a dense layer, processes the data from the latent space. The fully connected layer applies a series of transformations to the data, enabling the model to learn complex patterns and relationships. Additionally, for example, the number of encoder instances step 1370 includes determining the number of encoder instances to be used. Still further, for example, the decoder step 1380 reconstructs the data from the latent space representation. In the decoder step 1380, the lower-dimensional data is transformed back into its original form or a desired output format. Even further, for example, the completion step 1390 includes finalizing the model training, saving the trained model, and preparing the trained model for deployment or further evaluation.

For example, the required number of encoder instances (e.g., at 1370) are estimated for each video picture. Also, for example, the estimated required number of encoder instances for each video picture is based on complexity. Further, for example, each residual picture (e.g., a predicted residue prior to encoding) is given as input to the Model A (e.g., at 1320). In addition, for example, the Model A outputs the required number of encoder instances (e.g., at 1370).

In some embodiments, residual latent learning using a conditional neural network is provided (e.g., at 1350). Residual pictures (e.g., a difference between predicted and actual pictures) are fed to the conditional deep neural network, which is trained to reconstruct the residual picture. The latent space and/or entropy of this conditional neural network is learned. The latent space and/or entropy of this conditional neural network is used to estimate the complexity of the picture.

For example, architectures like CVAE are provided for efficient latent space learning. Also, for example, at least one of CNNs for spatial feature extraction, RNNs, or 3D convolutions are included for temporal dependencies. Further, for example, conditional parameters such as genre of the video game, frame rate, resolution, bandwidth, buffer size, or the like are fed to the network to guide the encoder and decoder of a VAE to generate reconstructions that are specific to given conditions (e.g., at 1330). Moreover, the model reduces the uncertainty of latent space and thereby improves the quality of the learned representation by incorporating the conditional parameters.

For example, a combined loss function for CVAE, which includes reconstruction loss (e.g., computes how well the model can reconstruct the input data) and K1-divergence loss (e.g., regularizes latent space by ensuring the encoded latent space distribution is close to normal distribution) is provided to train the VAE. Also, for example, CVAE loss may be expressed in accordance with equation (5).

$$\text{CVAE Loss} = \text{Reconstruction loss} + KL\text{-Divergence loss} \quad (5)$$

For example, a prediction of a number of encoders is provided (e.g., at 1370). Also, for example, an additional fully connected layer is constructed from latent space of CVAE to predict the number of encoder instances (e.g., at 1360). Further, for example, prediction loss of MSE is provided to measure how well the model's prediction matches the actual target values. In addition, for example, the prediction loss is provided in accordance with equation (6).

$$\text{Prediction Loss} = MSE\ (\text{predicted, actual}) \quad (6)$$

For example, a total loss function for training is provided. Also, for example, the total loss function for training is provided in accordance with equation (7), as follows:

$$\text{Total loss} = \text{CVAE loss} + \lambda * \text{Predicted loss} \quad (7)$$

where λ is a hyperparameter to regularize the CVAE and predicted losses.

In some embodiments, a QP distribution prediction based on an estimated number of encoders (Model B) is provided. For example, a training phase for the Model B is provided. Also, for example, a regression task involves a supervised learning model which accepts at least one of: a) number of encoders, b) initial QP (for the very first picture) or demanded QP, or c) the selected QP (and optionally the resultant QP from actual encoding) of the past pictures as input features. Further, for example, based on input features, the supervised learning model predicts the best QP distributions. In addition, for example, the model architecture includes a fully connected or Feed Forward Neural Network to learn complex representations from input features.

For example, a neural network architecture of a multilayer perceptron (MLP) is provided. Also, for example, inputs are provided having a consistent size. Further, for example, padding ensures that all input samples are of the same length, allowing the model to process them in a batch. Padding is incorporated to control a variable number of encoder instances. In addition, for example, the number of neurons in the input layer can be fixed with a maximum number of encoders (e.g., 52 for AVC, or 63 for VVC, or the like) and a feature vector to incorporate initial and/or demanded QP and the selected QP of the past pictures. Moreover, for example, the number of previously encoded pictures whose statistics are included in the input are fixed for the MLP, with an application of padding that is described below. This serves as a sliding window of variables that are fed to the neural model. For inputs with fewer encoder instances or at the very beginning of encoding the first pictures, input data is padded with zeros. Each of the neurons in the output layer corresponds to the QP for each instantiated encoder and the neurons with 0 correspond to the padded inputs or non-instantiated encoders. Further, for example, MSE loss between the predicted and actual distribution of QPs is optimized through this model and is combined with masked loss function to ignore the padded values and focus only on the valid data points.

In some embodiments, in the training process 1300 for an encoder instances prediction model, the model predicts the number of encoder instances required as described above. Also, for example, the model undergoes multiple iterations of training, with feedback, e.g., from the loss function continuously refining the model parameters to reduce prediction error and enhance accuracy. Further, for example, the feedback path involves adjusting the conditional parameters, such as bandwidth and resolution, based on the model's performance. In addition, for example, if certain conditions lead to higher prediction errors, the model is fine-tuned to better control the process 1300 in such conditions. Moreover, for example, throughout the training process 1300, the model's performance is validated using a separate dataset, e.g., to prevent overfitting and ensure that the model generalizes well to new data.

Figure 14:
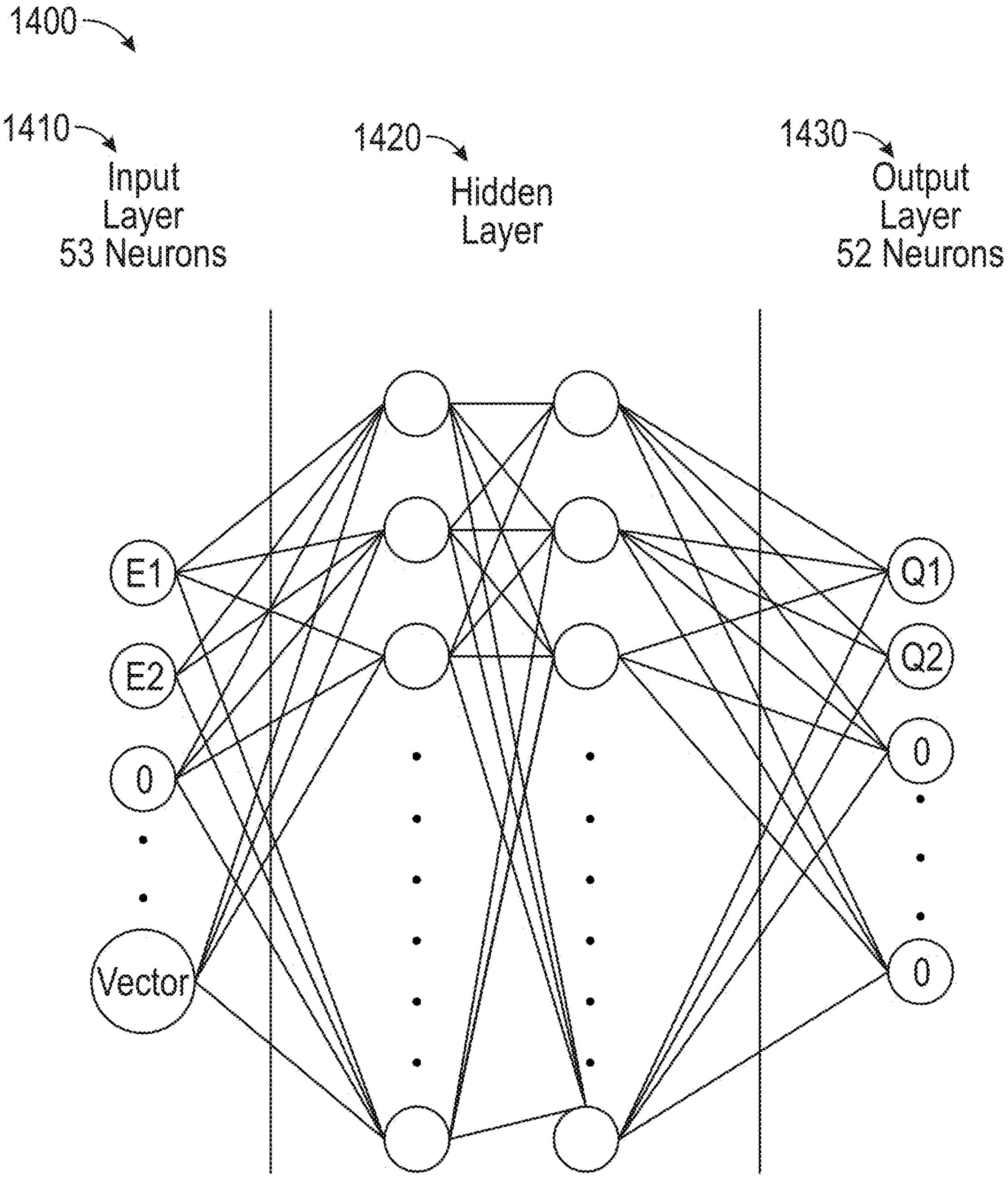
FIG. 14 depicts a model architecture with two encoder instances during a training phase of the model, in accordance with some embodiments of the disclosure.

FIG. 14 depicts a model architecture 1400 with two encoder instances during a training phase of the model, in accordance with some embodiments of the disclosure. For example, the model includes an input layer 1410 (e.g., 53 neurons), one or more (e.g., two, as shown) hidden layers 1420, and an output layer 1430 (e.g., 52 neurons). In this example, neurons labeled "0" indicate padded values. Also, for example, a deep learning model having the model architecture 1400 is configured to predict optimal encoding parameters based on real-time network conditions and video chunk characteristics. The rate controller dynamically adjusts these parameters to maintain video quality and minimize latency (e.g., ultra-low latency), instantiating and coordinating one or more encoders that process different video streams.

Figure 15:
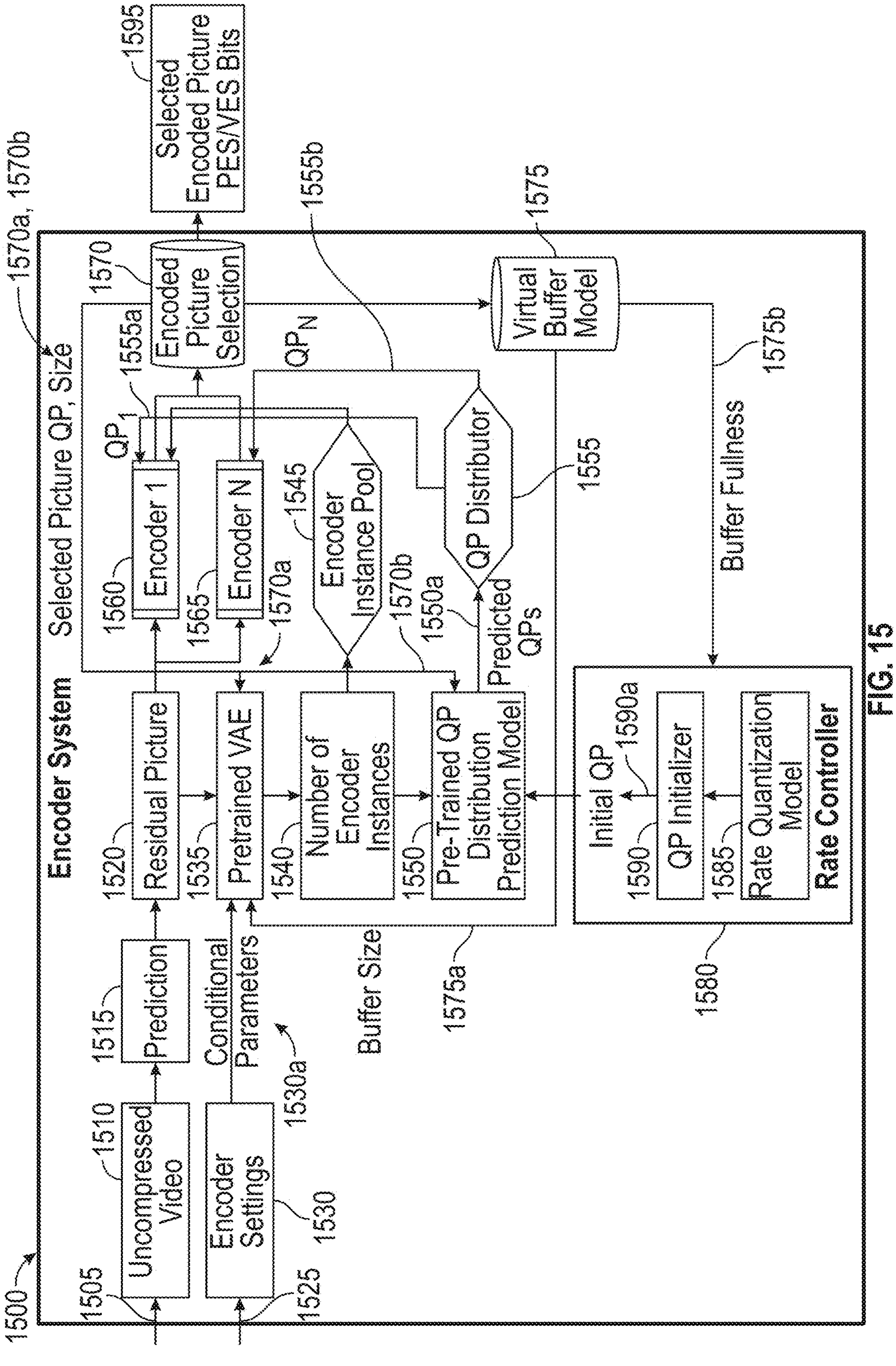
FIG. 15 depicts a multiple encoder system with a single rate controller and a deep learning framework, in accordance with some embodiments of the disclosure.

FIG. 15 depicts a multiple encoder system 1500 with a single rate controller 1580 and a deep learning framework, in accordance with some embodiments of the disclosure. For example, the encoder system 1500 includes at least one of a pretrained VAE 1535, an encoder instance pool 1545, a pretrained QP distribution prediction model 1550, a QP distributor 1555, a first encoder 1560, an n-th encoder 1565, an encoded picture selection module 1570, a virtual buffer model 1575, a rate controller 1580, combinations of the same, or the like. Also, for example, the rate controller 1580 includes at least one of a rate quantization model 1585, a QP initializer, combinations of the same, or the like.

For example, a testing phase of Models A and B is provided. Also, for example, during testing, the encoder system 1500 processes uncompressed video pictures 1510 into selected encoded picture PES or VES bits 1595 to be sent (e.g., to a client device). Further, for example, a residual picture 1520 is fed to a pretrained VAE 1535 (e.g., Model A) and a number of encoder instances 1540 is predicted. In addition, for example, a pretrained QP distribution prediction model 1550 (e.g., Model B) takes in the predicted number of encoders 1540 and predicts QPs 1550*a* for each encoder. Moreover, for example, both models A and B are fine-tuned and incrementally learned based on feedback from an encoded picture selection module 1570 and other conditional parameters like buffer fullness 1575*b*, frame rate, or the like.

For example, the encoder system 1500 is configured to receive uncompressed video 1510 from a video source (e.g., a game engine). Also, for example, the pretrained VAE 1535 is configured to receive the uncompressed video 1510, a prediction 1515, and a residual picture 1520. Further, for example, the encoder system 1500 is configured to receive encoder settings 1530 from source 1525 and conditional parameters (e.g., bandwidth, genre of a game, resolution, frames per second, or the like) 1530*a*. In addition, for example, the pretrained VAE 1535 is configured to receive the conditional parameters 1530*a*. Moreover, for example, the pretrained VAE 1535 is configured to communicate a number of encoder instances 1540 to a pretrained QP distribution prediction model 1550. Furthermore, for example, number of encoder instances 1540 may be stored in an encoder instance pool 1545. Additionally, for example, the encoder instance pool 1545 is configured to instantiate a number of encoders from 1 to n including, for example, the first encoder 1560, either alone or in combination with an additional one or more encoders up to the n-th encoder 1565.

For example, the rate controller 1580 is configured to communicate an initial QP 1590*a* (e.g., from the rate quantization model 1585 and the QP initializer 1590 of the rate controller 1580) to the pretrained QP distribution prediction model 1550. Also, for example, the pretrained QP distribution prediction model 1550 is configured to communicate one or more predicted QPs 1550*a* to a QP distributor 1555. Further, for example, the QP distributor 1555 is configured to communicate a QP to each of the instantiated one or more encoders, e.g., $QP_1$ 1555*a* to the first encoder 1560, and $QP_N$ 1555*b* to the n-th encoder 1565.

For example, each of the instantiated one or more encoders, e.g., the first encoder 1560 and the n-th encoder 1565, is configured to receive at least one of the uncompressed video 1510, the prediction 1515, the residual picture 1520, the $QP_1$ 1555*a*, the $QP_N$ 1555*b*, combinations of the same, or the like. Also, for example, each of the instantiated one or more encoders, e.g., the first encoder 1560 and the n-th encoder 1565, is configured to encode and communicate an encoded picture to the encoded picture selection module 1570. Further, for example, the encoded picture selection module 1570 is configured to communicate or transmit data, e.g., selected, encoded picture (e.g., PES or VES) bits 1595. In addition, for example, the encoded picture selection module 1570 is configured to communicate selected picture QP and size 1570*a*, 1570*b* to the pretrained VAE 1535 and the pretrained QP distribution prediction model 1550, respectively. Moreover, for example, the encoded picture selection module 1570 is configured to store one or more selections (e.g., the selected, encoded picture (e.g., PES or VES) bits 1595) to a virtual buffer model 1575. Furthermore, for example, the virtual buffer model 1575 is configured to communicate buffer size 1575*a* to the pretrained VAE 1535, which may be part of the conditional parameters 1530*a*. Additionally, for example, the virtual buffer model 1575 is configured to communicate buffer fullness 1575*b* to the rate controller 1580. Still further, for example, the rate controller 1580 is configured to receive the buffer fullness 1575*b* and adjust the initial QP 1590*a* accordingly.

In one embodiment, a deep learning-based long-term prediction module is added to Model A (e.g., process 1300 of FIG. 13), along with a residual latent learning module. For example, a multi-stage learning (and/or training) system jointly trains at least one of the deep learning-based long-term prediction module, Model A, residual latent learning module, combinations of the same, or the like. Also, for example, one or more machine learning models are fine-tuned and used for real-time inference during video transmission.

In some embodiments, a training phase is provided. For example, after down sampling a current picture, the deep learning-based long-term prediction module generates N future pictures, based on past pictures. Also, for example, the deep learning-based long-term prediction module is provided with an architecture, such as a conditionally reversible architecture (such as CrevNet), or a simple video prediction architecture (such as SimVP), which are computationally efficient models for long-term prediction, or a distribution extrapolation diffusion model architecture (such as diffusion-based ExtDM), which has high runtime speed. Further, for example, the training of the deep learning-based long-term prediction module is based on the MSE loss between the predicted and actual pictures.

In some embodiments, a testing and/or inference phase is provided. For example, during inference, P-frames in a GOP are predicted and cached in a buffer. Also, for example, at each time stamp, a decision to choose or skip instantiating one or more encoder instances (e.g., via a controller) is based on the MSE of the predicted frames. Further, for example, the buffer is reset when the MSE of the current predicted frame is greater than a threshold. In addition, for example, an encoding system skips a decision to choose or skip instantiating one or more encoder instances if the MSE is less than a first threshold, and the encoding system continues with a same number of encoder instances and utilizes a QP range distribution that was used for the previously encoded frame. Moreover, for example, caching and/or (e.g., long-term) prediction reduces computational overhead.

For example, if the MSE exceeds the threshold, the predicted frame passes through a complexity estimation module. Also, for example, a buffer discards frames predicted for the future timestamps, and a long-term prediction module is invoked again to generate new future frames. Further, for example, if the MSE drops below a second threshold (e.g., smaller than the first threshold), the predicted frame passes through the complexity estimation module. In this case, the long-term prediction module is invoked again to generate new future frames so that the estimated number of encoders may be reduced due to the less complex residue frame.

Figure 16:
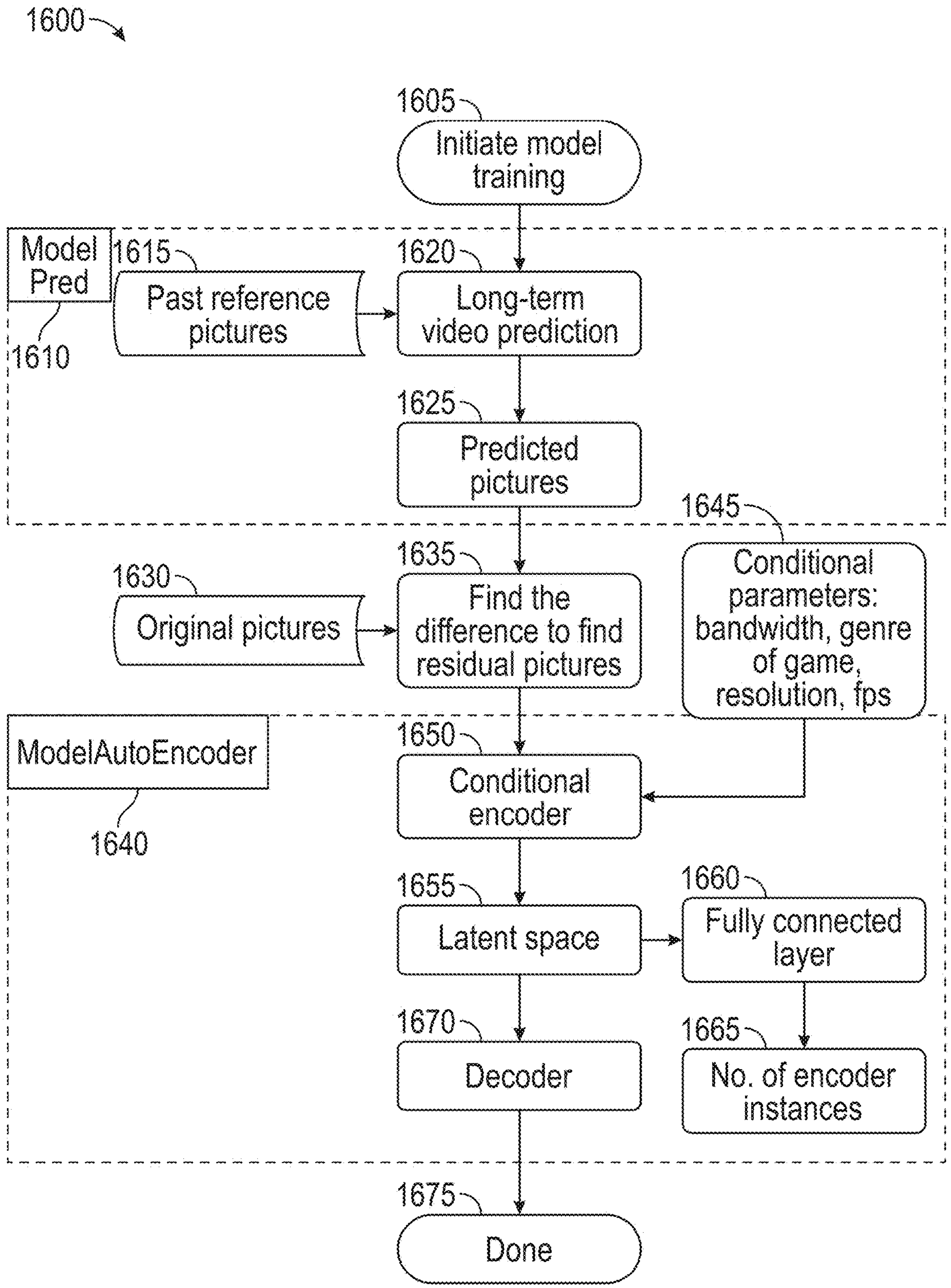
FIG. 16 is a flowchart of a training phase of a long-term prediction module, in accordance with some embodiments of the disclosure.

FIG. 16 is a flowchart of a training phase of a long-term prediction module, in accordance with some embodiments of the disclosure. For example, as shown in FIG. 16, a process 1600 for training a long-term prediction module includes a prediction model (ModelPred) 1610 and an auto encoder model (ModelAutoEncoder) 1640. Also, for example, the prediction model 1610 includes at least one of an initiate model training step 1605, a receive past reference pictures step 1615, a long-term video prediction step 1620, a generate predicted pictures step 1625, combinations of the same, or the like. Further, for example, the process 1600 includes at least one of a receive original pictures step 1630, a find the difference to find residual pictures step 1635, combinations of the same, or the like. In addition, for example, the auto encoder model 1640 includes at least one of a receive conditional parameters (e.g., bandwidth, genre of a game, resolution, pictures per second, or the like) step 1645, a condition encoder step 1650, a latent space step 1655, a fully connected layer step 1660, a generate a number of encoder instances step 1665, a decoder step 1670, a completion (done) step 1675, combinations of the same, or the like.

For example, the initiate model training step 1605 includes setting up a model training environment. The initiate model training step 1605 includes loading the dataset, initializing model parameters, and configuring the training process. Also, for example, the receive past reference pictures step 1615 includes processing past reference pictures to provide context for long-term predictions. These pictures are used to capture temporal dependencies and improve the accuracy of predictions. Further, for example, the long-term video prediction step 1620 includes generating predictions for future pictures based on the past reference pictures. Additionally, for example, the generate predicted pictures step 1625 includes creating predicted pictures that represent the anticipated future states of the video.

Moreover, for example, the receive original pictures step 1630 includes obtaining the original video pictures for comparison with predicted pictures. This step ensures that the model's predictions can be evaluated against actual video content. Furthermore, for example, the find the difference to find residual pictures step 1635 includes calculating the differences between the original and predicted pictures to identify residual pictures. These residual pictures highlight discrepancies and are used to refine the model's predictions.

In addition, for example, the receive conditional parameters step 1645 includes setting conditional parameters such as bandwidth, genre of a game, resolution, and frames per second. These parameters configure the model to specific conditions and requirements, ensuring optimal performance under varying scenarios. In the condition encoder step 1650, input data is processed based on the conditional parameters set in the previous step 1645. The data is encoded into a format suitable for further processing. In the latent space step 1655, the encoded data is mapped into a latent space, a lower-dimensional representation of the data that captures selected features. In the fully connected layer step 1660, a fully connected layer processes the data from the latent space, applying a series of transformations to enable the model to learn complex patterns and relationships. The generate a number of encoder instances step 1665 includes determining the number of encoder instances to be used. Finally, the decoder step 1670 reconstructs the data from the latent space representation, transforming it back into its original form or a desired output format. The completion step 1675 includes finalizing the model training, saving the trained model, and preparing it for deployment or further evaluation.

Figure 17:
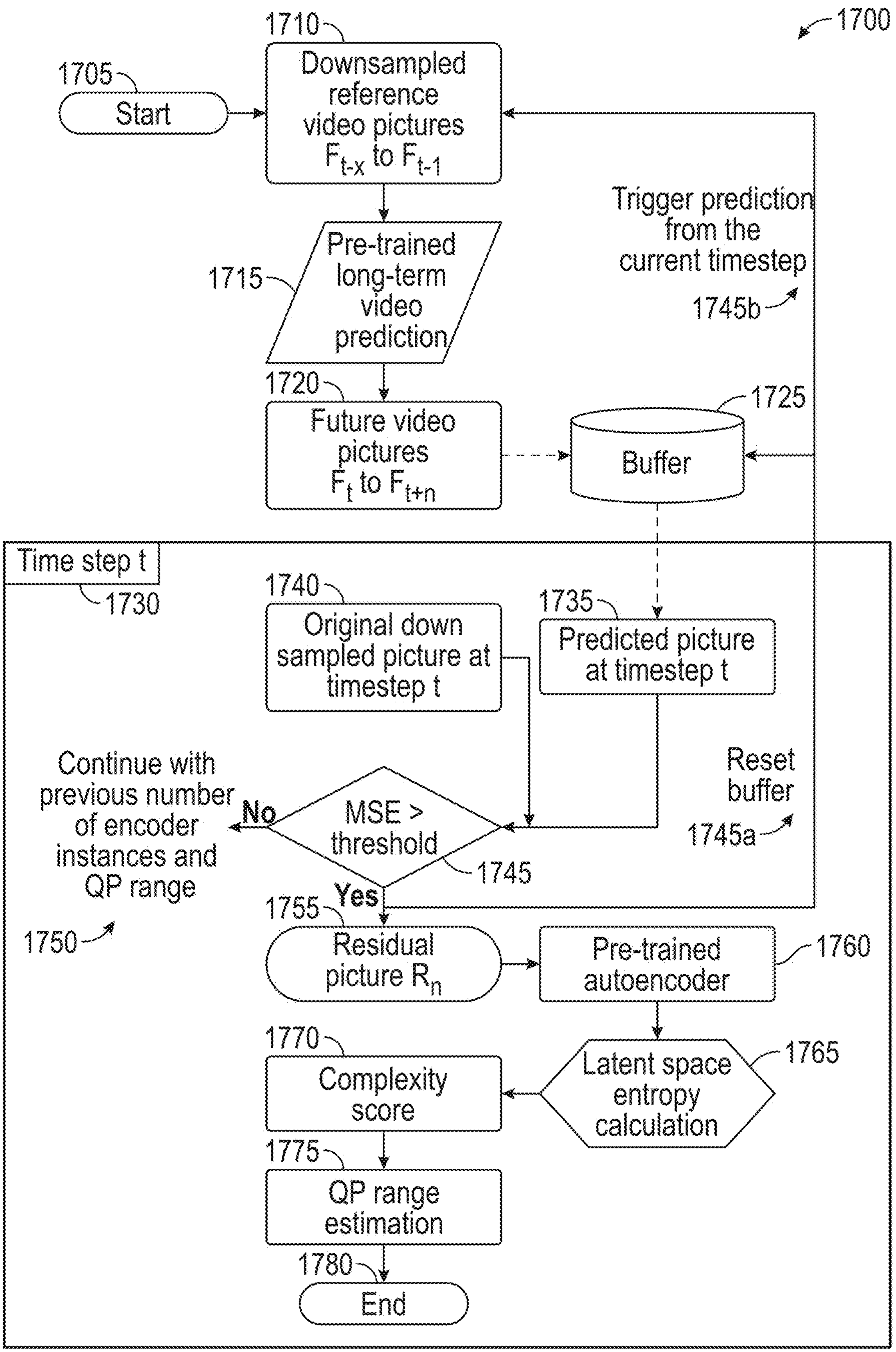
FIG. 17 is a flowchart of a testing phase of the long-term prediction module, in accordance with some embodiments of the disclosure.

FIG. 17 is a flowchart of a testing phase of a long-term prediction module, in accordance with some embodiments of the disclosure. For example, as shown in FIG. 17, a process 1700 for testing a long-term prediction module includes at least one of a start step 1705, a receive downsampled reference video pictures (F(t−x) to F(t−1)) step 1710, a pretrained long-term video prediction step 1715, a future video pictures (F(t) to F(t+n)) step 1720, a buffer storage step 1725, combinations of the same, or the like. Also, for example, the process 1700 includes a time stamp (t) 1730, which includes at least one of a predicted picture at time stamp (t) 1735, a receive original downsampled picture at timestep (t) step 1740, a determination of whether an MSE is greater than (or equal to) a threshold step 1745, a continue with a previous number of encoders instances and QP range step 1750, a residual picture (R(n)) step 1755, a pretrained autoencoder step 1760, a latent space entropy calculation step 1765, a complexity score step 1770, a QP range estimation step 1775, an end step 1780, combinations of the same, or the like.

For example, the start step 1705 includes initializing the testing environment. The start step 1705 involves setting up configurations and loading the pretrained models. Also, for example, the receive downsampled reference video pictures step 1710 includes obtaining downsampled reference pictures from previous time stamps (F(t−x) to F(t−1)). These pictures provide context for the prediction model. Further, for example, the pretrained long-term video prediction step 1715 includes using a pretrained model to predict future video pictures (F(t) to F(t+n)). This step utilizes the model's learned temporal patterns to forecast future pictures. Additionally, for example, the future video pictures step 1720 includes generating predicted future pictures based on the model's predictions. These pictures are stored in a buffer (at step 1725) for further processing.

Moreover, for example, the time stamp (t) 1730 includes managing the current time stamp in the testing process. This step ensures synchronization between predicted and actual pictures. Furthermore, for example, the predicted picture at time stamp (t) 1735 includes generating a predicted picture for the current time stamp (t). This picture is compared with the actual picture to evaluate prediction accuracy. Additionally, for example, the receive original downsampled picture at timestep (t) step 1740 includes obtaining the actual downsampled picture for the current time stamp (t). This picture is used to calculate the MSE between predicted and actual pictures.

In addition, for example, the determination of whether an MSE is greater than (or equal to) a threshold step 1745 includes evaluating the prediction accuracy. If, at the determining step 1745, the MSE is within acceptable limits (1745="Yes"), the process 1700 continues with the current number of encoder instances and QP range. Otherwise, adjustments are made. The continue with a previous number of encoders instances and QP range step 1750 includes maintaining the current configuration if, at the determining step 1745, the MSE is not acceptable, e.g., not greater than (or equal to) the threshold (1745="No"). The residual picture (R(n)) step 1755 includes calculating the residual picture, which represents the difference between the predicted and actual pictures. This picture is used to refine future predictions. Also, if, at the determining step 1745, the MSE is within acceptable limits (1745="Yes"), the process 1700 includes resetting 1745*a* the buffer (at 1725). Further, if, at the determining step 1745, the MSE is within acceptable limits (1745="Yes"), the process 1700 includes triggering 1745*b* prediction from a current timestep, and the process 1700 proceeds to step 1710 for the next picture.

Furthermore, for example, the pretrained autoencoder step 1760 includes using a pretrained autoencoder to process the residual picture. The latent space entropy calculation step 1765 includes calculating the entropy of the latent space representation of the residual picture. This step helps in assessing the complexity of the picture. The complexity score step 1770 includes generating a complexity score based on the latent space entropy. This score is used to adjust the QP range for future predictions. The QP range estimation step 1775 includes estimating the QP range based on the complexity score. Finally, the end step 1780 includes finalizing the testing process, saving the results, and preparing for further evaluation or deployment.

In another embodiment, a quality check module (e.g., a pretrained AI model, which can be fine-tuned in real-time) is provided to decide a best picture to be communicated (e.g., transmitted or sent) in the encoded picture selection module 876 of FIG. 8.

Figure 18:
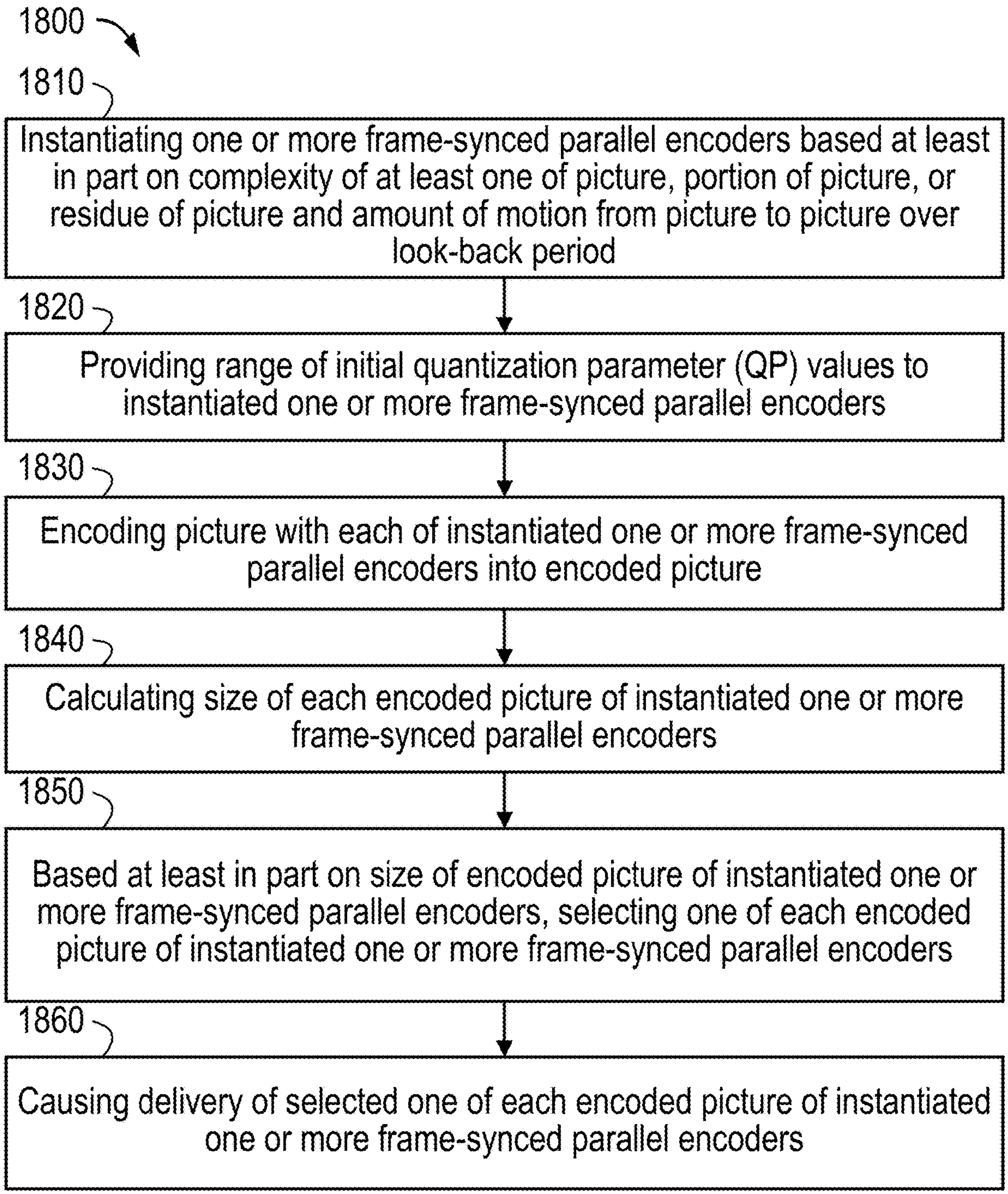
FIG. 18 is a flowchart of an example process for controlling video encoding in an encoding system for delivering content, in accordance with some embodiments of the disclosure.

FIG. 18 is a flowchart of an example process for controlling video encoding in an encoding system for delivering content (e.g., to a client device), in accordance with some embodiments of the disclosure. In some embodiments, a method 1800 for controlling video encoding in an encoding system (e.g., 150, 710, 810, 920, 1500, or the like) for delivering content to a client device (e.g., 190, 750, 752, 754, 756, 890, 892, 894, 896, 950, 952, 954, 956, or the like) comprises at least one of steps 1810-1860, combinations of the same, or the like. For example, one or more frame-synced parallel encoders (e.g., 714 . . . 720; 820 . . . 840; 926 . . . 928; 1560 . . . 1565) are instantiated (e.g., at 1810) based at least in part on the complexity of a picture, a portion of the picture, or a residue of the picture, and the amount of motion from picture to picture over a look-back period. Additionally, a range of initial QP values (e.g., at 716*a*, 722*a*; 860*a*, 860*b*; 1555*a*, 1555*b*) is provided (e.g., at 1820) to the instantiated frame-synced parallel encoders. Further, each picture is encoded (e.g., at 1830) by the instantiated frame-synced parallel encoders into an encoded picture (e.g., at 714*a*, 720*a*; 820*a*, 840*a*; 926*a*, 926*b*; 1555*a*/1555*b* to 1570). Moreover, the size of each encoded picture is calculated (e.g., at 1840). Based at least in part on the size of each encoded picture, one encoded picture is selected (e.g., at 1850). Furthermore, the selected encoded picture is delivered (e.g., at 1860) to the client device (e.g., at 710*a*, 810*a*, 920*b*, 1595).

The methods and systems also include selecting which encoded picture to deliver (e.g., to the client device) based at least in part on the highest available picture quality and the lowest available latency of the picture encoding or a derivative of the speed of delivery of the picture.

Initial QP values are determined based at least in part on a complexity estimation system (e.g., 874) and the size (e.g., 878*a*) of a virtual buffer model (e.g., 718, 724, 732, 878). Additionally, the size of the virtual buffer model is controlled through an API and adjusted based at least in part on changing latency requirements. The API is configured with predefined latency thresholds, and the size of the virtual buffer model is controlled based on these thresholds.

The size of the virtual buffer model is dynamically adjusted based on real-time feedback from the client device (e.g., 740*b*, 750*a*, 880*a*, 890*a*, 950*a*, 950*b*). The number of instantiated frame-synced parallel encoders is directly proportional to the determined complexity and the amount of motion from picture to picture.

The methods and systems further include monitoring encoding performance and adjusting the initial QP values to optimize encoding performance. A rate controller in the encoding system prioritizes pictures for delivery (e.g., to the client device) to maintain the highest possible picture quality at the lowest available latency. The rate controller also predicts and controls future encoding requirements based on historical data of picture sizes. Additionally, the rate controller switches between different encoding profiles based on the complexity and the amount of motion from picture to picture.

Figure 19:
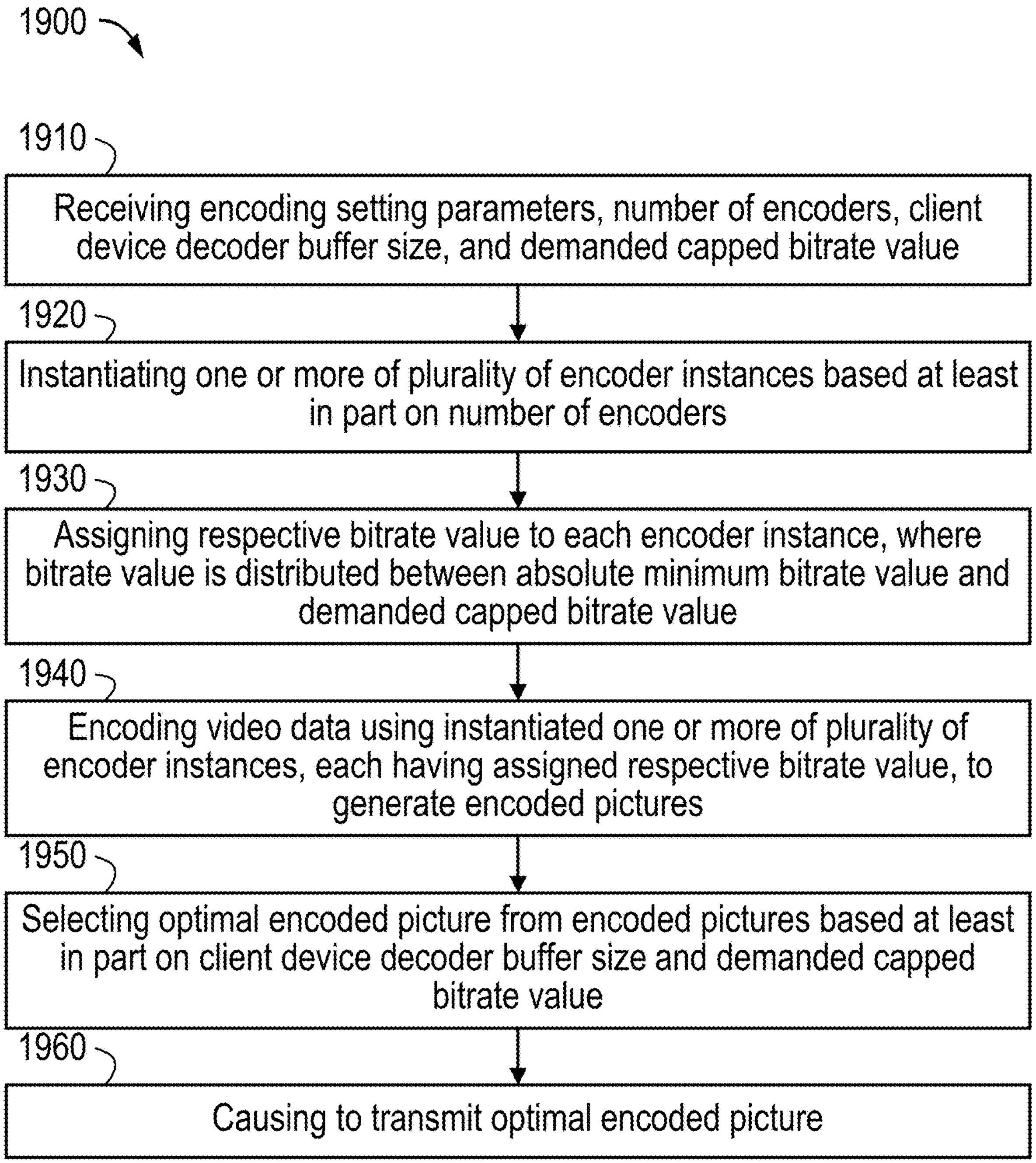
FIG. 19 is a flowchart of an example process for ultra-low-latency encoding and delivering video data, in accordance with some embodiments of the disclosure.

FIG. 19 is a flowchart of an example process for encoding and delivering video data with ultra-low latency, in accordance with some embodiments of the disclosure. In some embodiments, a method 1900 for encoding and delivering video data to a client device (e.g., 750, 752, 754, 756, or the like) with ultra-low latency comprises at least one of steps 1910-1960, combinations of the same, or the like. For example, encoding setting parameters (e.g., 701), a number of encoders (e.g., 702), a client device decoder buffer size (e.g., 740*a*), and a demanded capped bitrate value (e.g., 740*b*) are received (e.g., at 1910). Additionally, one or more of a plurality of encoder instances (e.g., 714 . . . 720) are instantiated (e.g., at 1920) based at least in part on the number of encoders. Further, a respective bitrate value (e.g., 726*a*, 726*d*) is assigned (e.g., at 1930) to each encoder instance, where the bitrate value is distributed between an absolute minimum bitrate value and the demanded capped bitrate value. Moreover, video data is encoded (e.g., at 1940) using the instantiated encoder instances, each having the assigned respective bitrate value, to generate encoded pictures (e.g., at 714*a*, 720*a*). Furthermore, an optimal encoded picture (e.g., at 710*a*) is selected (e.g., at 730, at 1950) from the encoded pictures based at least in part on the client device decoder buffer size and the demanded capped bitrate value. Additionally, the optimal encoded picture is transmitted (e.g., at 710*a*, at 1960) (e.g., to the client device).

The encoding setting parameters may include resolution, framerate, and GOP structure. Further, the number of encoder instances can be dynamically updated through an API or user interface. The bitrate value assigned to each encoder instance is calculated by dividing the difference between the demanded capped bitrate value and the absolute minimum bitrate value by the number of encoder instances minus one. Additionally, the state of each encoded picture from each encoder instance is sent to an encoded picture selector (e.g., 730).

The optimal encoded picture is selected based at least in part on the size of the picture, framerate, buffer model (e.g., 732), or allocated bandwidth. Further, the buffer model and picture QP values (e.g., 716*a*, 722*a*) of each encoder instance are adjusted based at least in part on the state of a coded picture buffer of the client device (e.g., at 730*a*, 730*c*).). An ultra-low-latency delivery system (e.g., 740) transmits the optimal encoded picture (e.g., at 740*c*) via the internet (e.g., 745). Also, additional encoder instances can be instantiated from an encoder instance pool (e.g., 728) during an encoder session. The decoded pictures are stored and/or updated in a common decoded picture buffer shared by the encoder instances.

Figure 20:
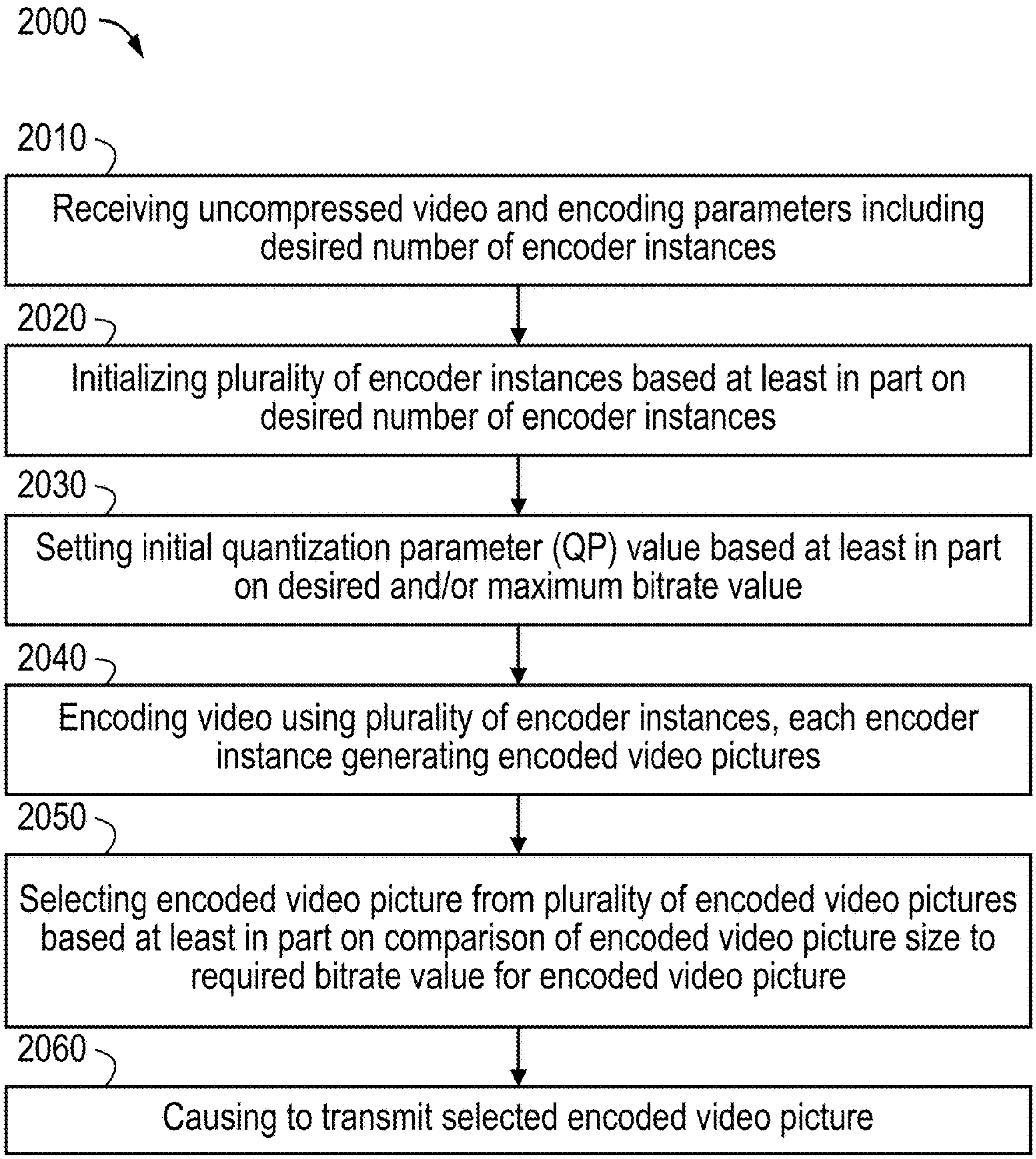
FIG. 20 is a flowchart of an example process for encoding video for delivery using an encoder system, in accordance with some embodiments of the disclosure.

FIG. 20 is a flowchart of an example process for encoding video for delivery using an encoder system, in accordance with some embodiments of the disclosure. In some embodiments, a method 2000 for encoding video for delivery to a client device (e.g., 890, 892, 894, 896, or the like) using an encoder system (e.g., 810) comprises at least one of steps 2010-2060, combinations of the same, or the like. For example, uncompressed video (e.g., at 801) and encoding parameters (e.g., at 802) including a desired number of encoder instances (e.g., at 804) are received (e.g., at 2010). Additionally, a plurality of encoder instances (e.g., 820 . . . 840) is initialized (e.g., at 2020) based at least in part on the desired number of encoder instances. Further, an initial QP value (e.g., 872*a*) is set (e.g., at 2030) based at least in part on a desired and/or maximum bitrate value (e.g., at 803, 812*e*). Moreover, the video is encoded (e.g., at 2040) using the plurality of encoder instances, with each encoder instance generating encoded video pictures (e.g., at 820*a*, 840*a*). Furthermore, an encoded video picture (e.g., at 810*a*) is selected (e.g., at 2050) from the plurality of encoded video pictures based at least in part on a comparison of the encoded video picture size to a required bitrate value (e.g., 803, or video framerate 812*d*) for the video picture. Additionally, the selected encoded video picture is transmitted (e.g., at 810*a*, 880*b*; at 2060) (e.g., to the client device).

The methods and systems also comprise receiving a picture buffer size of a decoder of the client device (e.g., at 880*a*) and adjusting the encoding based at least in part on the picture buffer size (e.g., at rate controller 860). The initial QP value is set by a QP initializer (e.g., 872) and adjusted by a ΔQP-limiter (e.g., 864). The plurality of encoder instances comprises a first encoder instance (e.g., 820) and an n-th encoder instance (e.g., 840), each configured to receive a QP value with an offset (e.g., at 860*b*). Further, the uncompressed video is preprocessed before the encoding (e.g., at 814).

The selection of the encoded video picture is performed by an encoded picture selection function (e.g., at 876) based at least in part on the size of the encoded video picture being closest to the required bitrate value without exceeding the required bitrate value. Additionally, a state of the encoder for the selected encoded video picture is transmitted (e.g., at 860*c*, 860*d*) back to each encoder instance to maintain synchronization. An ultra-low-latency delivery system (e.g., 880) is configured to set a capped bitrate value based at least in part on an estimated amount of bandwidth. The number of encoder instances is dynamically adjusted based at least in part on feedback regarding the desired maximum latency. The encoding parameters may include resolution, framerate, and GOP structure (e.g., at 812).

Figure 21:
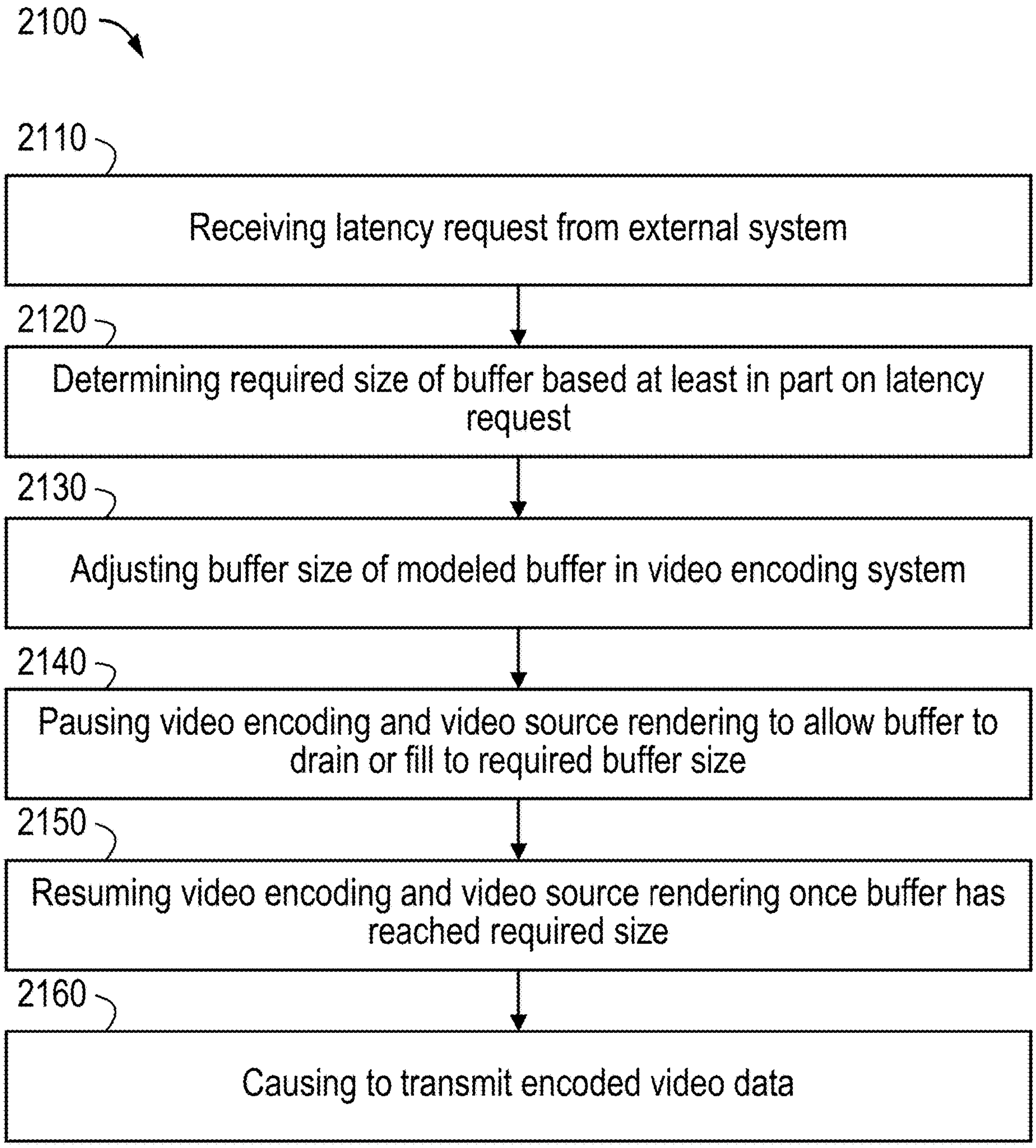
FIG. 21 is a flowchart of an example process for controlling video encoding latency in a video encoding system for delivering content, in accordance with some embodiments of the disclosure.

FIG. 21 is a flowchart of an example process for controlling video encoding latency in a video encoding system for delivering content, in accordance with some embodiments of the disclosure. In some embodiments, a method 2100 for controlling video encoding latency in a video encoding system (e.g., 920) for delivering content to a client device (e.g., 950, 952, 954, 956, or the like) comprises at least one of steps 2110-2160, combinations of the same, or the like.

For example, a latency request is received (e.g., at 2110) from an external system (e.g., at 901). Additionally, a required size of a buffer (e.g., of a video source, e.g., at 910) is determined (e.g., at 2120) based at least in part on the latency request. Further, a buffer size (e.g., at 932*g*) of a modeled buffer (e.g., 936) in the video encoding system is adjusted (e.g., at 2130). Moreover, video encoding and video source rendering are paused (e.g., at 920*a*, 932*c*, 932*d*, 2140) to allow the buffer to drain or fill to the required buffer size. Furthermore, video encoding and video source rendering are resumed (e.g., at 920*a*, 932*c*, 932*d*, 2150) once the buffer has reached the required size. Additionally, encoded video data (e.g., 940*b*) is transmitted (e.g., at 2160) (e.g., to the client device).

The latency request may be received from a video game engine (e.g., at 910) as the external system. Also, the latency request may be received from a SLAM camera system (e.g., at 912) as the external system. Further, a request to pause and/or resume video rendering (e.g., 920*a*) is transmitted to a video source (e.g., 910). Moreover, a flush buffer request (e.g., 932*f*) is transmitted to the modeled buffer.

The video encoding system may comprise multiple encoders (e.g., 926 . . . 926), and additional encoders are instantiated based at least in part on the latency request. Further, a deep learning model (e.g., at 1370) is used to predict an optimal number of encoder instances based at least in part on the complexity of a picture to be encoded, a portion of the picture, or a residue of the picture. Additionally, a deep learning model (e.g., see, the descriptions of FIGS. 13-17) is used to determine a QP range (e.g., at 1550) for each encoder.

The adjustment of the buffer size may comprise rendering black frames or a still image to fill the buffer. Further, a force IDR request is transmitted to all encoders to decode the next picture without dependency on flushed pictures.

Figure 22:
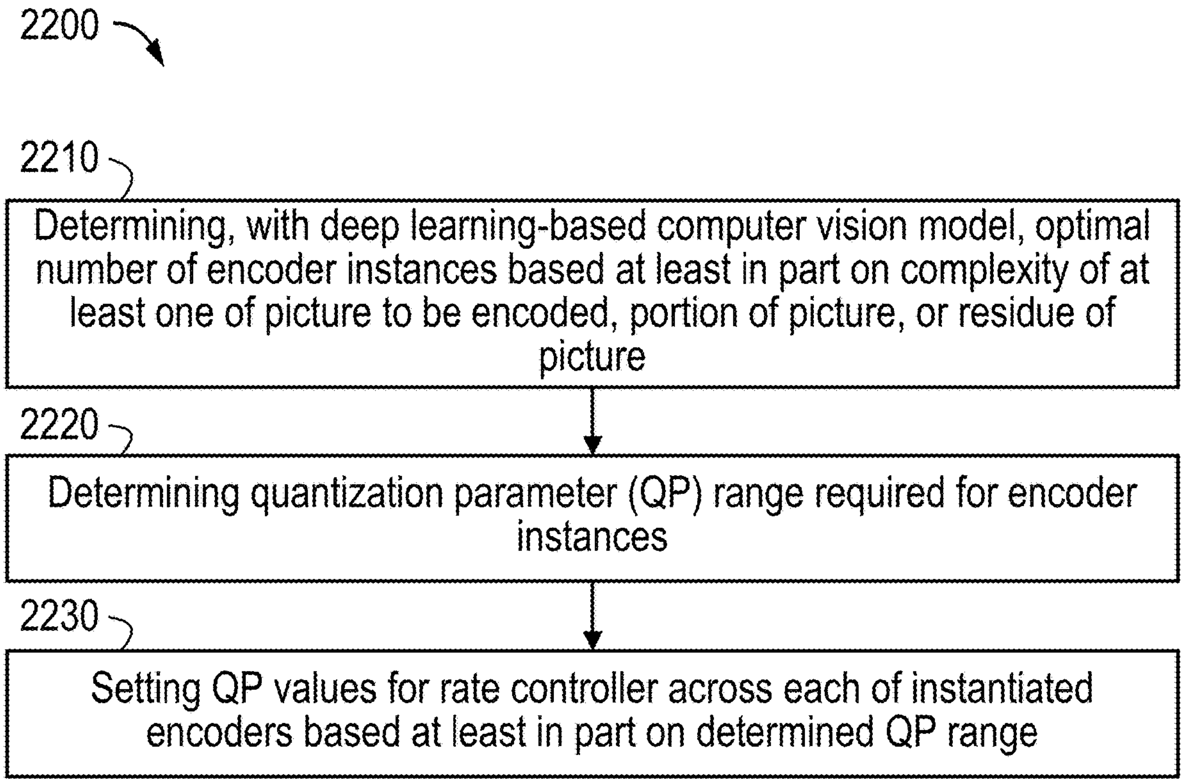
FIG. 22 is a flowchart of an example process for optimizing video encoding in a multi-encoder system, in accordance with some embodiments of the disclosure.

FIG. 22 is a flowchart of an example process for optimizing video encoding in a multi-encoder system, in accordance with some embodiments of the disclosure. In some embodiments, a method 2200 for optimizing video encoding in a multi-encoder system (e.g., 150, 710, 810, 920, 1500, or the like) comprises at least one of steps 2210-2230, combinations of the same, or the like. For example, a deep learning-based computer vision model determines (e.g., at 2210) an optimal number of encoder instances (e.g., 1370) based at least in part on the complexity of a picture to be encoded, a portion of the picture, or a residue of the picture. Additionally, a QP range (e.g., at 716*a*, 722*a*; 860*a*, 860*b*; 1555*a*, 1555*b*) required for the encoder instances is determined (e.g., at 2220). Further, QP values for a rate controller (e.g., 716 . . . 722, 860, 930, 1580) are set (e.g., at 2230) across each of the instantiated encoders based at least in part on the determined QP range.

The deep learning-based computer vision model may comprise a hybrid model configured to predict the optimal number of encoder instances by processing a residual picture (e.g., 1320, 1520, at 1635, 1755) of a current timestamp using an unsupervised conditional neural network. The unsupervised conditional neural network is configured to accept conditional parameters (e.g., 1330, 1530*a*, 1645) comprising encoder settings and video genre, and provide an estimate of the complexity in a latent space (e.g., 1350, 1655). A supervised model predicts the optimal number of encoder instances based at least in part on the learned latent representations from the unsupervised conditional neural network.

The deep learning-based computer vision model is configured to predict an optimal distribution of QPs (e.g., at 1555*a*, 1555*b*, 1775) among the encoder instances. The model is trained using a supervised model that accepts a predicted number of encoder instances (e.g., 1540, 1665) and an initial QP as input features. The supervised model outputs the QP value for each encoder instance.

Methods and systems also include a system for long-term video prediction (e.g., 1620, 1715) to output predicted pictures and residual pictures. The system for long-term video prediction comprises a video prediction module and a residual latent learning module. The video prediction module comprises a deep learning-based long-term prediction model configured to predict (e.g., P–) pictures (e.g., in a GOP) and cache the predicted (e.g., P–) pictures (e.g., 1625, 1735) in a buffer (e.g., at 1725).

A decision to choose or skip an encoder instance is based at least in part on an MSE of the predicted P-pictures (e.g., at 1745). The buffer (e.g., 1725) is reset (e.g., 1745*a*) if the MSE of a current predicted picture exceeds a threshold (e.g., 1745="Yes").

Figure 23:
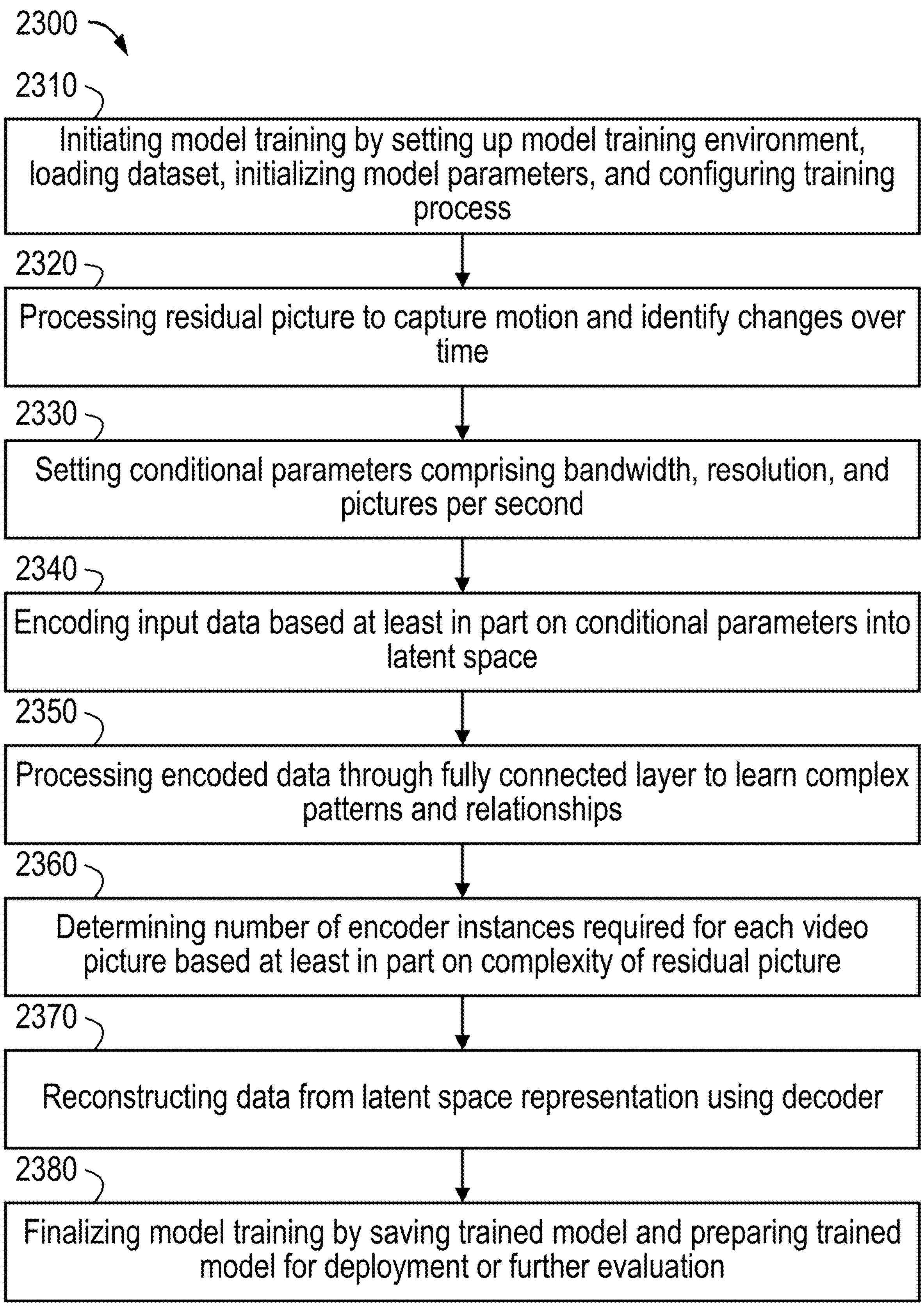
FIG. 23 is a flowchart of an example process for training an encoder instances prediction model, in accordance with some embodiments of the disclosure.

FIG. 23 is a flowchart of an example process for training an encoder instances prediction model, in accordance with some embodiments of the disclosure. In some embodiments, a method 2300 for training an encoder instances prediction model comprises at least one of steps 2310-2380, combinations of the same, or the like. For example, model training is initiated (e.g., at 1310, 2310) by setting up a model training environment, loading a dataset, initializing model parameters, and configuring a training process. Additionally, a residual picture is processed (e.g., at 1320, 2320) to capture motion and identify changes over time. Further, conditional parameters comprising bandwidth, resolution, and frames per second are set (e.g., at 1330, 2330). Moreover, input data is encoded (e.g., at 1340, 2340) based at least in part on the conditional parameters into a latent space (e.g., 1350). Furthermore, the encoded data is processed (e.g., at 2350) through a fully connected layer (e.g., 1360) to learn complex patterns and relationships. Additionally, a number of encoder instances (e.g., 1370) required for each video picture is determined (e.g., at 2360) based at least in part on the complexity of the residual picture. The data is then reconstructed (e.g., at 2370) from the latent space representation using a decoder (e.g., 1380). Finally, the model training is finalized (e.g., at 1390, 2380) by saving the trained model and preparing the trained model for deployment or further evaluation.

The residual picture is a difference between consecutive pictures in a sequence. The conditional parameters configure the model to specific conditions and requirements to ensure optimal performance under varying scenarios. The latent space is a lower-dimensional representation of the data that captures selected features of the data. The fully connected layer applies a series of transformations to the data from the latent space. The number of encoder instances is estimated based at least in part on the complexity of each video picture, or a portion of each video picture. The decoder transforms lower-dimensional data back into the original form or a desired output format.

Methods and systems also comprise training the model using a combined loss function that comprises reconstruction loss and Kullback-Leibler (KL)-Divergence loss. The reconstruction loss measures the ability of the model to reconstruct the input data. The KL-Divergence loss regularizes the latent space by ensuring the encoded latent space distribution is close to a normal distribution.

Figure 24:
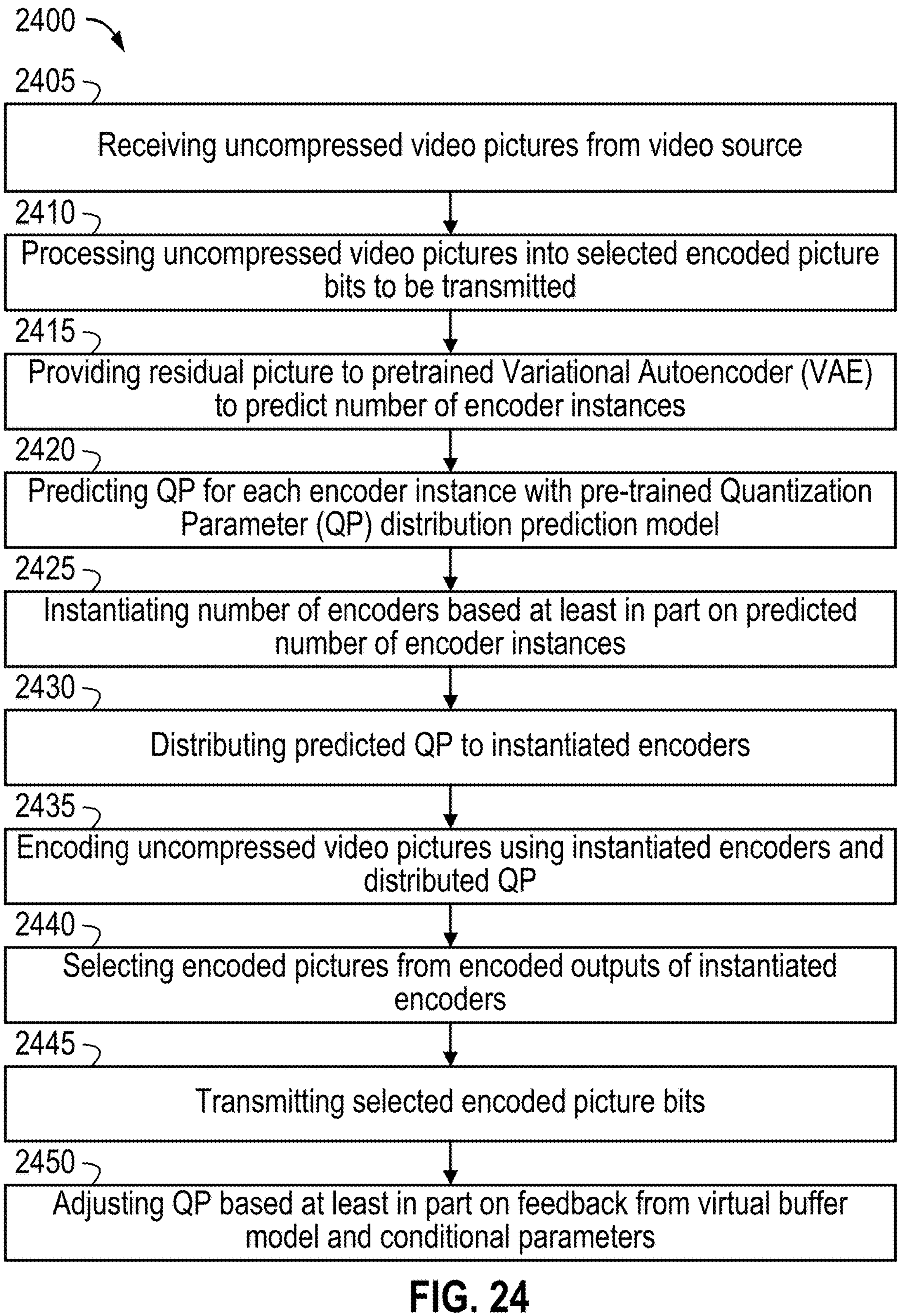
FIG. 24 is a flowchart of an example process for encoding video using a multiple encoder system, in accordance with some embodiments of the disclosure.

FIG. 24 is a flowchart of an example process for encoding video using a multiple encoder system, in accordance with some embodiments of the disclosure. In some embodiments, a method 2400 for encoding video using a multiple encoder system (e.g., 1500) comprises at least one of steps 2405-2450, combinations of the same, or the like. For example, uncompressed video pictures are received (e.g., at 1505, 2405) from a video source. Additionally, the uncompressed video pictures are processed (e.g., at 2410) into selected encoded picture bits to be sent (e.g., to a client device). Further, a residual picture is fed (e.g., at 2415) to a pretrained VAE (e.g., at 1535) to predict a number of encoder instances (e.g., 1540). Moreover, a pretrained QP distribution prediction model (e.g., 1550) is used (e.g., at 2420) to predict QP (e.g., 1550*a*) for each encoder instance. Furthermore, a number of encoders (e.g., 1560 . . . 1565) are instantiated (e.g., at 2425) based at least in part on the predicted number of encoder instances. Additionally, the predicted QPs are distributed (e.g., at 2430) to the instantiated encoders (e.g., at 1555*a*, 1555*b*). The uncompressed video pictures are then encoded (e.g., at 2435) using the instantiated encoders and the distributed QPs (e.g., between 1560 . . . 1565 and 1570). Encoded pictures are selected (e.g., at 1570, 2440) from the encoded outputs of the instantiated encoders. The selected encoded picture bits (e.g., 1595) are transmitted (e.g., at 2445) (e.g., to the client device). The QPs are adjusted (e.g., at 2450) based at least in part on feedback from a virtual buffer model (e.g., 1575) and conditional parameters.

The video source may be a game engine. The pretrained VAE receives conditional parameters comprising bandwidth, genre of a game of the game engine, resolution, and frames per second. The pretrained QP distribution prediction model is fine-tuned based at least in part on feedback from an encoded picture selection module. The virtual buffer model communicates buffer size (e.g., 1575*a*) and buffer fullness (e.g., 1575*b*) to the pretrained VAE and a rate controller (e.g., 1580) of the multiple encoder system. The rate controller adjusts an initial QP (e.g., 1590*a*) based at least in part on the buffer fullness.

Methods and systems also comprise generating future pictures at a deep learning-based long-term prediction module based at least in part on past pictures. The deep learning-based long-term prediction module may comprise a conditionally reversible architecture, a simple video prediction architecture, or a distribution extrapolation diffusion model architecture. The deep learning-based long-term prediction module is trained based at least in part on an MSE loss between predicted and actual pictures. A decision to instantiate encoder instances is based at least in part on the MSE of the predicted pictures.

Figure 25:
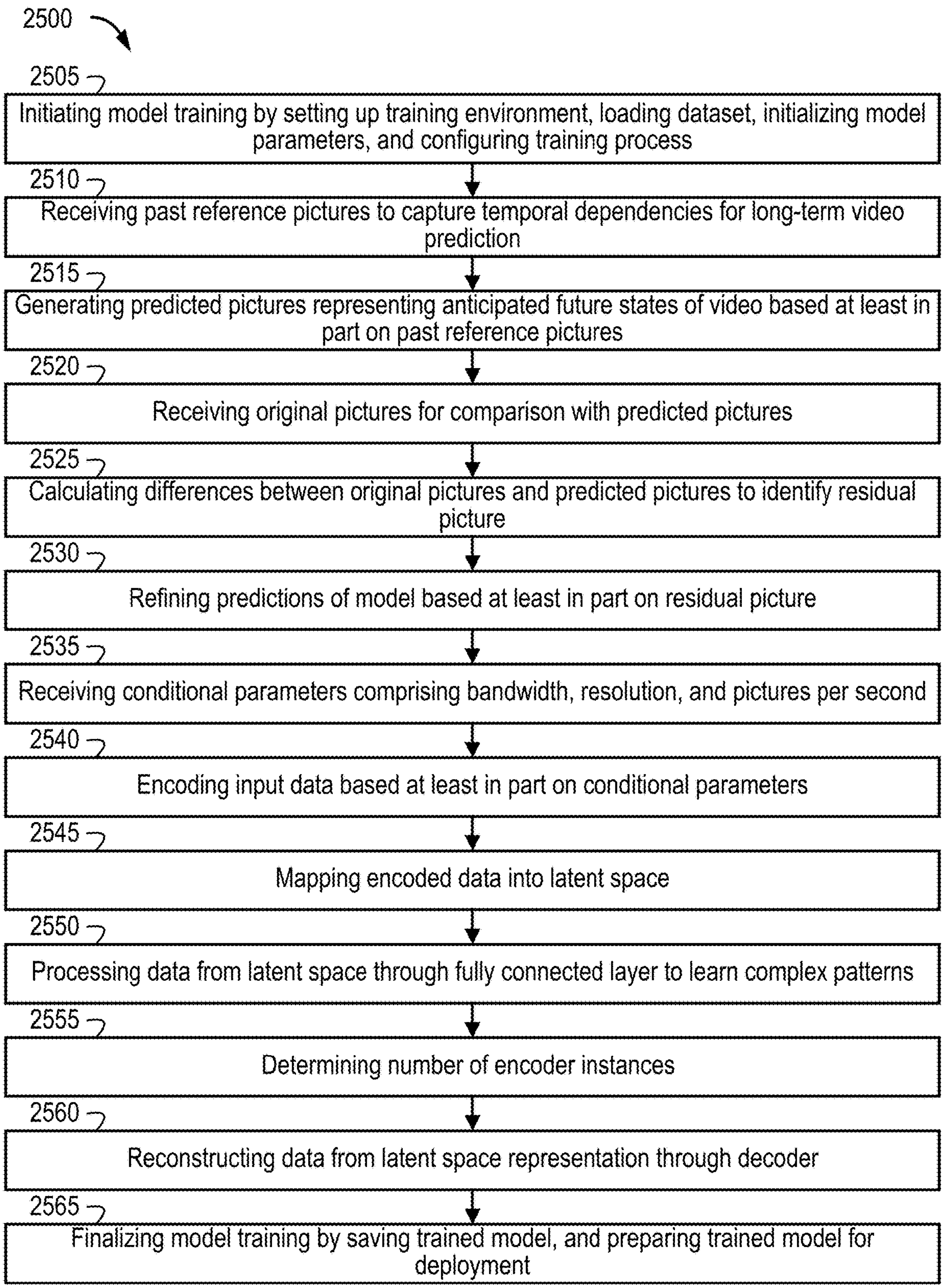
FIG. 25 is a flowchart of an example process for training a long-term prediction module, in accordance with some embodiments of the disclosure.

FIG. 25 is a flowchart of an example process for training a long-term prediction module, in accordance with some embodiments of the disclosure. In some embodiments, a method 2500 for training a long-term prediction module comprises at least one of steps 2505-2565, combinations of the same, or the like. For example, model training is initiated (e.g., at 1605, 2505) by setting up a training environment, loading a dataset, initializing model parameters, and configuring the training process. Additionally, past reference pictures (e.g., 1615) are received (e.g., at 2510) to capture temporal dependencies for long-term video prediction (e.g., 1620). Further, predicted pictures (e.g., 1625) representing anticipated future states of the video are generated (e.g., at 2515) based at least in part on the past reference pictures. Moreover, original pictures (e.g., 1630) are received (e.g., at 2520) for comparison with the predicted pictures. Furthermore, differences between the original pictures and the predicted pictures are calculated (e.g., at 1635, 2525) to identify residual pictures. Additionally, predictions of the model are refined (e.g., at 2530) based at least in part on the residual picture. Conditional parameters (e.g., 1645) comprising bandwidth, resolution, and pictures per second are received (e.g., at 2535). Input data is encoded (e.g., at 1650, 2540) based at least in part on the conditional parameters. The encoded data is mapped (e.g., at 2545) into a latent space (e.g., 1655). The data from the latent space is processed (e.g., at 2550) through a fully connected layer (e.g., 1660) to learn complex patterns. A number of encoder instances (e.g., 1665) is determined (e.g., at 2555). The data is reconstructed (e.g., at 2560) from the latent space representation through a decoder (e.g., 1670). Finally, the model training is finalized (e.g., at 1675, 2565) by saving the trained model and preparing the trained model for deployment.

The initiating model training further comprises configuring hyperparameters for the prediction model. The receiving past reference pictures comprises preprocessing the pictures to enhance temporal feature extraction. The generating predicted pictures comprises a recurrent neural network (RNN). The receiving original pictures comprises synchronizing the original pictures with the predicted pictures for accurate comparison. The calculating differences comprises an MSE metric to quantify residual pictures. The refining the prediction of the model comprises iterative training to minimize the residual pictures. The conditional parameters are normalized before the encoding. The mapping into a latent space uses a VAE for dimensionality reduction. The reconstructing data comprises applying a DCNN for data reconstruction.

Figure 26:
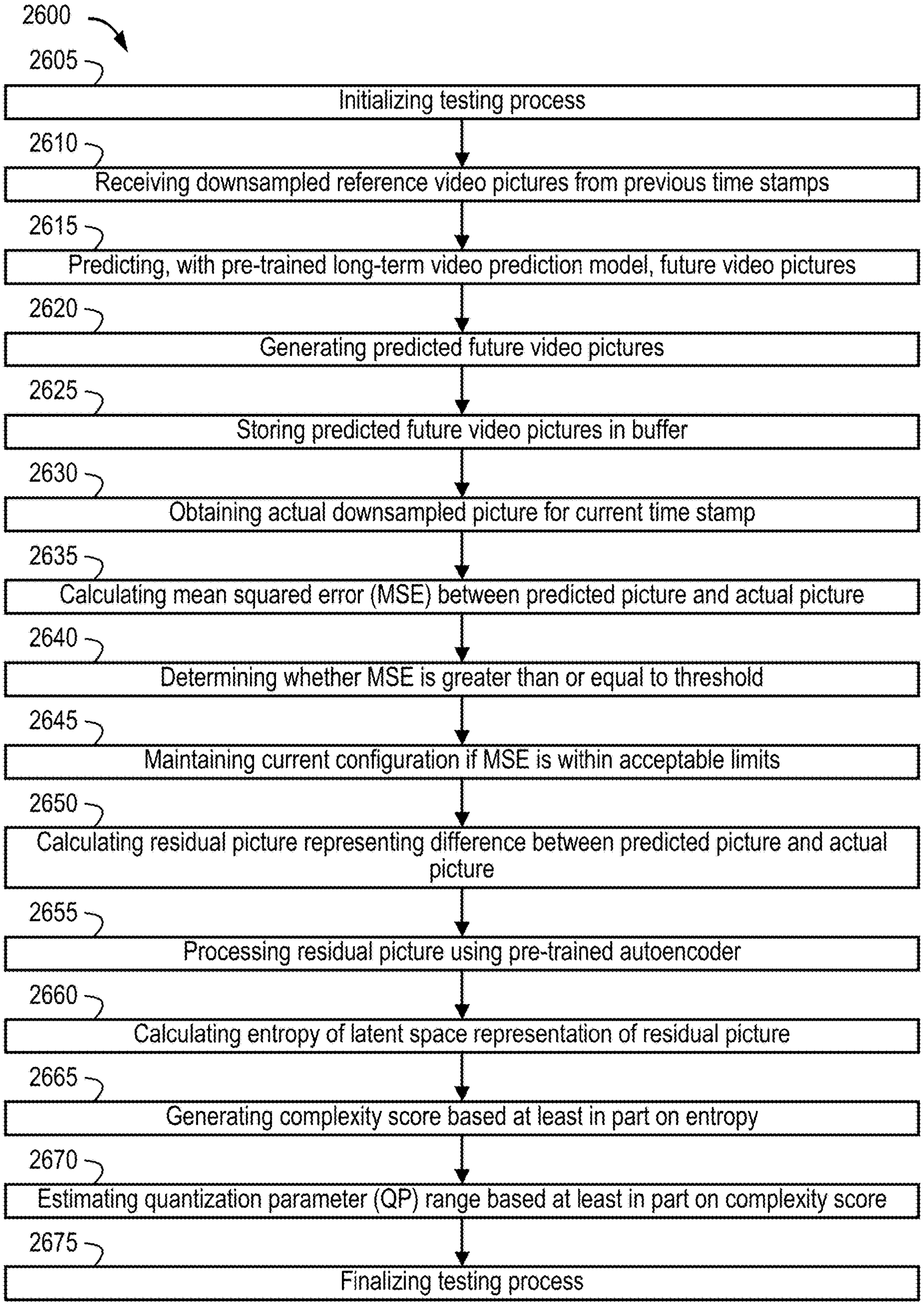
FIG. 26 is a flowchart of an example process for testing a long-term prediction module, in accordance with some embodiments of the disclosure.

FIG. 26 is a flowchart of an example process for testing a long-term prediction module, in accordance with some embodiments of the disclosure. In some embodiments, a method 2600 for testing a long-term prediction module comprises at least one of steps 2605-2675, combinations of the same, or the like. For example, a testing environment is initialized (e.g., at 1705, 2605). Additionally, downsampled reference video pictures (e.g., 1710) from previous timestamps are received (e.g., at 2610). Further, future video pictures (e.g., 1720) are predicted (e.g., at 2615) using a pretrained long-term video prediction model (e.g., 1715). Moreover, predicted future video pictures are generated (e.g., at 2620). Furthermore, the predicted future video pictures are stored (e.g., at 2625) in a buffer (e.g., 1725). Additionally, an actual downsampled picture (e.g., 1740) for a current timestamp is obtained (e.g., at 2630). An MSE between the predicted picture (e.g., 1735) and the actual picture is calculated (e.g., at 2635). Whether the MSE is greater than or equal to a threshold (e.g., 1745) is determined (e.g., at 2640). The current configuration is maintained (e.g., at 2645) if the MSE is within acceptable limits (e.g., at 1745). A residual picture (e.g., 1755) representing the difference between the predicted picture and the actual picture is calculated (e.g., at 2650). The residual picture is processed (e.g., at 2655) using a pretrained autoencoder (e.g., 1760). An entropy of a latent space representation of the residual picture is calculated (e.g., at 1765, 2660). A complexity score (e.g., 1770) based at least in part on the entropy is generated (e.g., at 2665). A QP range (e.g., 1775) based at least in part on the complexity score is estimated (e.g., at 2670). The testing process is finalized (e.g., at 1780, 2675).

The initializing of the testing environment further comprises setting up configurations and loading the pretrained long-term video prediction model and the pretrained autoencoder. The receiving of downsampled reference video pictures comprises obtaining pictures from time stamps F(t−x) to F(t−1) (e.g., at 1710). The predicting of future pictures with the pretrained long-term video prediction model comprises forecasting future pictures based at least in part on learned temporal patterns. The generating of predicted future video pictures comprises generating pictures for time steps F(t) to F(t+n) (e.g., at 1720). The storing of the predicted future video pictures in the buffer comprises preparing the pictures for further processing. The calculating of the MSE comprises comparing the predicted picture at the current time stamp with the actual downsampled picture. The determining of whether the MSE is greater than or equal to the threshold comprises evaluating the accuracy of the prediction. The maintaining of the current configuration comprises continuing with the previous number of encoder instances and QP range (e.g., 1750) if the MSE is within acceptable limits. The finalizing of the testing process comprises saving the results and preparing the results for further evaluation or deployment.

In some embodiments, a predictive model and/or predictive engine is modeled, trained, and utilized to predict information for one or more portions of the above-described methods and systems. For example, one or more predictive models 2700 can ingest data about picture complexity, motion, and initial QP values. The model 2700 can predict the optimal number of frame-synced parallel encoders needed based on historical data and current picture complexity. The model 2700 can dynamically adjust QP values and buffer sizes to optimize encoding performance and maintain high picture quality with low latency.

Also for example, the model 2700 can predict optimal encoding settings, such as resolution, framerate, and bitrate distribution, based on past performance data. The model 2700 can dynamically update the number of encoder instances and bitrate values to ensure efficient encoding and delivery. The model 2700 can manage the client device decoder buffer size and adjust encoding parameters to maintain ultra-low latency.

Further, for example, the model 2700 can predict the required number of encoder instances based on video complexity and desired bitrate. The model 2700 can set and adjust initial QP values to ensure the encoded video pictures meet the required bitrate without exceeding it. The model 2700 can maintain synchronization across encoder instances by transmitting the state of the encoder for the selected encoded video picture.

In addition, for example, the model 2700 can predict the required buffer size based on latency requests from external systems and adjust the buffer size accordingly. The model 2700 can determine optimal times to pause and resume video encoding and rendering to manage buffer levels effectively. The model 2700 can use deep learning to predict the optimal number of encoder instances and QP ranges based on picture complexity.

Moreover, for example, the model 2700 can use deep learning to predict the optimal number of encoder instances based on picture complexity. The model 2700 can predict and distribute QP values across encoder instances to optimize encoding quality and efficiency. The model 2700 can integrate with long-term video prediction systems to enhance encoding decisions based on predicted future pictures.

Furthermore, for example, the model 2700 can be trained using residual pictures and conditional parameters to predict the number of encoder instances required as described above. The model 2700 can encode input data into a latent space to capture complex patterns and relationships for better prediction accuracy. The model 2700 can use combined loss functions, such as reconstruction loss and KL-Divergence loss, to improve training outcomes.

Additionally, for example, the model 2700 can use a pretrained VAE to predict the number of encoder instances based on residual pictures and conditional parameters. The model 2700 can use a pretrained QP distribution prediction model to determine QP values for each encoder instance. The model 2700 can adjust QP values based on feedback from a virtual buffer model and conditional parameters to maintain encoding quality.

Still further, for example, the model 2700 can be trained to predict future pictures based on past reference pictures and conditional parameters. The model 2700 can capture temporal dependencies to enhance long-term video prediction accuracy. The model 2700 can iteratively refine its predictions based on residual pictures and minimize errors using metrics like MSE.

Throughout the present disclosure, in some embodiments, determinations, predictions, likelihoods, and the like are determined with one or more predictive models. In some embodiments, the model receives various forms of data about users, media content items, devices, servers, and more. This includes usage data, load-balancing data, and metadata. The model performs analysis based on hard rules, learning rules, hard models, learning models, usage data, load data, analytics, metadata, profile information, or combinations of these. The model outputs predictions of a future state of any of the devices described. Load-increasing events are determined by load-balancing processes. The model is based on inputs including hard rules, user-defined rules, rules defined by content providers, hard models, learning models, or combinations of these. The model is trained with data using various data processes, analytical processes, and machine learning approaches. It includes regression and classification analyses. An example of a multi-layer neural network is provided. The model is based on data engineering and modeling processes, and is operationalized using registration, deployment, monitoring, and retraining processes. The model is configured to output results to one or multiple devices, which can perform various functions. The devices can be a server, tablet, media display device, network-connected computer, media device, computing device, or combinations of these. The model outputs a current state, future state, determination, prediction, or likelihood. These outputs may be compared to a predetermined or determined standard. If the standard is satisfied or rejected, the predictive process outputs at least one of the current state, future state, determination, prediction, or likelihood to any device or module disclosed.

In some embodiments, the model ingests diverse forms of data about users, digital content items, devices, and more. This encompasses user interaction data, load-distribution data, and metadata. The model conducts analysis based on deterministic rules, learned rules, deterministic models, learned models, user interaction data, load data, analytics, metadata, user profile information, or combinations thereof. The model generates predictions of a future state of any of the described devices. Load-increasing events are identified by load-distribution processes.

The model is constructed based on inputs including deterministic rules, user-defined rules, rules defined by content providers, deterministic models, learned models, or combinations thereof. The model is trained with data using various data processing methods, analytical processes, and machine learning techniques. It includes regression and classification analyses. An example of a deep neural network is provided.

The model is built upon data engineering and modeling processes and is operationalized using registration, deployment, monitoring, and retraining processes. The model is designed to output results to one or multiple devices, which can perform various functions. The devices can be a server, tablet, digital display device, network-connected computer, media device, computing device, or combinations thereof.

The model outputs a current state, future state, determination, prediction, or probability. These outputs may be compared to a predetermined or determined benchmark. If the benchmark is met or not met, the predictive process outputs at least one of the current state, future state, determination, prediction, or probability to any device or module disclosed.

Figure 27:
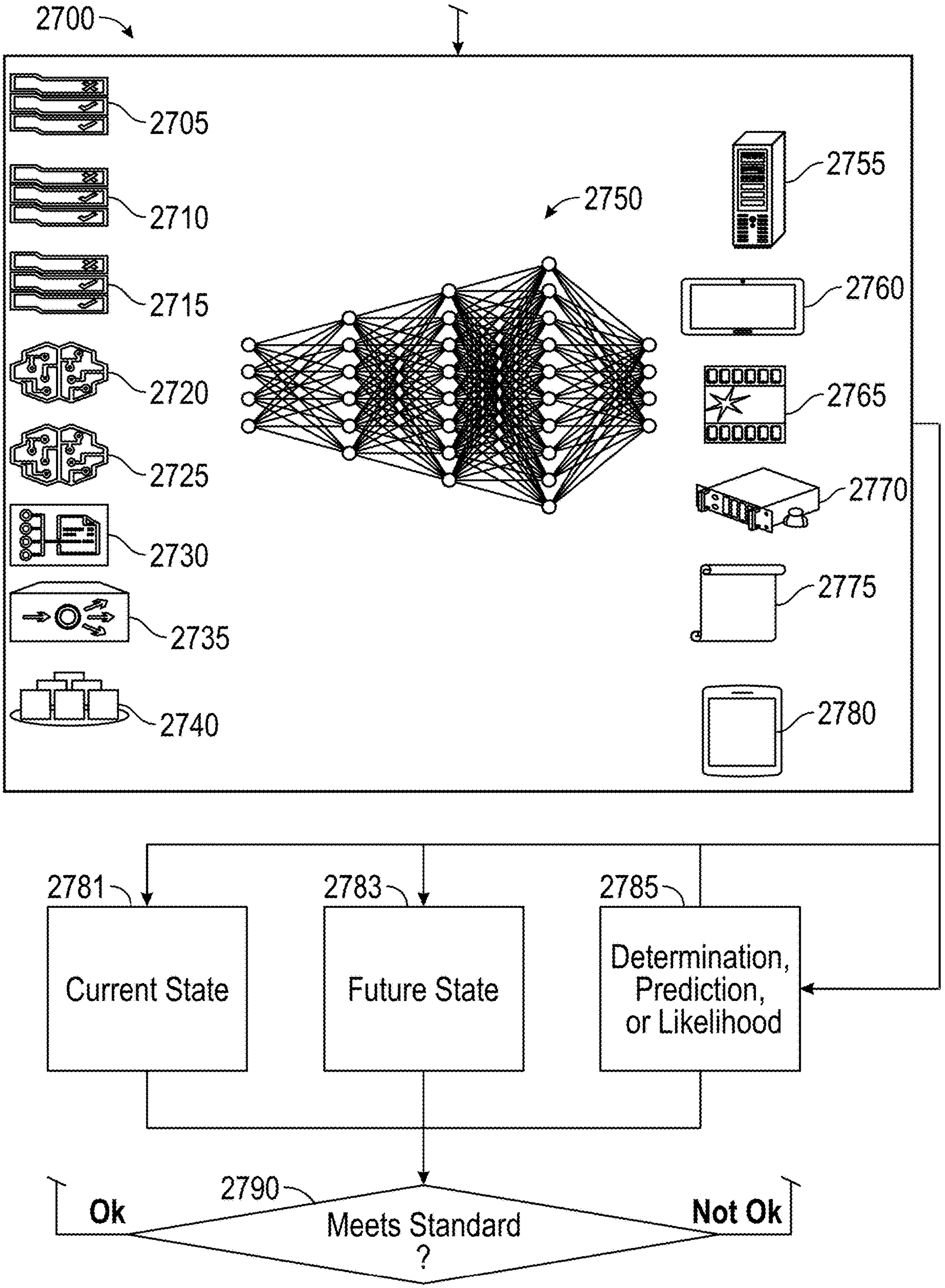
FIG. 27 depicts an artificial intelligence system, in accordance with some embodiments of the disclosure.

For example, FIG. 27 depicts a predictive model. A prediction process 2700 includes a predictive model 2750 in some embodiments. The predictive model 2750 receives as input various forms of data about one, more or all the users, media content items, devices, servers, and data described in the present disclosure. The predictive model 2750 performs analysis based on at least one of hard rules, learning rules, hard models, learning models, usage data, load data, analytics of the same, metadata, profile information, combinations of the same, or the like. The predictive model 2750 outputs one or more predictions of a future state of any of the devices described in the present disclosure. A load-increasing event is determined by load-balancing processes, e.g., least connection, least bandwidth, round robin, server response time, weighted versions of the same, resource-based processes, and address hashing. The predictive model 2750 is based on input including at least one of a hard rule 2705, a user-defined rule 2710, a rule defined by a content provider 2715, a hard model 2720, a learning model 2725, combinations of the same, or the like.

The predictive model 2750 receives as input usage data 2730. The predictive model 2750 is based, in some embodiments, on at least one of a usage pattern of the user or media device, a usage pattern of the requesting media device, a usage pattern of the media content item, a usage pattern of the communication system or network, a usage pattern of the profile, a usage pattern of the media device, combinations of the same, or the like.

The predictive model 2750 receives as input load-balancing data 2735. The predictive model 2750 is based on at least one of load data of the display device, load data of the requesting media device, load data of the media content item, load data of the communication system or network, load data of the profile, load data of the media device, combinations of the same, or the like.

The predictive model 2750 receives as input metadata 2740. The predictive model 2750 is based on at least one of metadata of the streaming service, metadata of the requesting media device, metadata of the media content item, metadata of the communication system or network, metadata of the profile, metadata of the media device, combinations of the same, or the like. The metadata includes information of the type represented in the media device manifest.

The predictive model 2750 is trained with data. The training data is developed in some embodiments using one or more data processes including but not limited to data selection, data sourcing, and data synthesis. The predictive model 2750 is trained in some embodiments with one or more analytical processes including but not limited to classification and regression trees (CART), discrete choice models, linear regression models, logistic regression, logit versus probit, multinomial logistic regression, multivariate adaptive regression splines, probit regression, regression processes, survival or duration analysis, and time series models. The predictive model 2750 is trained in some embodiments with one or more machine learning approaches including but not limited to supervised learning, unsupervised learning, semi-supervised learning, reinforcement learning, and dimensionality reduction. The predictive model 2750 in some embodiments includes regression analysis including analysis of variance (ANOVA), linear regression, logistic regression, ridge regression, and/or time series. The predictive model 2750 in some embodiments includes classification analysis including decision trees and/or neural networks. In FIG. 27, a depiction of a multi-layer neural network is provided as a non-limiting example of a predictive model 2750, the neural network including an input layer (left side), three hidden layers (middle), and an output layer (right side) with 32 neurons and 192 edges, which is intended to be illustrative, not limiting. The predictive model 2750 is based on data engineering and/or modeling processes. The data engineering processes include exploration, cleaning, normalizing, feature engineering, and scaling. The modeling processes include model selection, training, evaluation, and tuning. The predictive model 2750 is operationalized using registration, deployment, monitoring, and/or retraining processes.

The predictive model 2740 is configured to output results to a device or multiple devices. The device includes means for performing one, more, or all the features referenced herein of the systems, methods, processes, and outputs of one or more of FIGS. 1-26, in any suitable combination. The device is at least one of a server 2755, a tablet 2760, a media display device 2765, a network-connected computer 2770, a media device 2775, a computing device 2780, combinations of the same, or the like.

The predictive model 2750 is configured to output a current state 2781, and/or a future state 2783, and/or a determination, a prediction, or a likelihood 2785, and the like. The current state 2781, and/or the future state 2783, and/or the determination, the prediction, or the likelihood 2785, and the like may be compared 2790 to a predetermined or determined standard. In some embodiments, the standard is satisfied (2790=OK) or rejected (2790=NOT OK). If the standard is satisfied or rejected, the predictive process 2700 outputs at least one of the current state, the future state, the determination, the prediction, the likelihood to any device or module disclosed herein, combinations of the same, or the like. In some embodiments, the predictive model 2750 incorporates one or more LLMs.

A communication system is provided including a computing device, a server, and a communication network. Both the server and the communication network can exist in multiple forms and can connect directly or indirectly. The computing device includes control circuitry, a display, and input/output (I/O) circuitry. The control circuitry can execute systems, methods, processes, and outputs. Both the computing device and server include control circuitry and storage, which can store content, metadata, data, user profiles, messages, and commands for an application. The computing device communicates with an I/O device and can receive and process user inputs locally or transmit them to the remote server for processing. Both the server and the computing device can transmit and receive content via the communication network or directly, and the processing circuitry receives the user input and converts it to digital signals.

In some embodiments, the system is a distributed network architecture with an edge device (a type of computing device 2802), a cloud server (a type of server 2804), and an internet of things (IoT) network (a type of communication network 2806). Both the edge device and server have microservices and data lakes. The edge device includes a user interface and I/O ports. User interactions can be processed at the edge or in the cloud. The system can transmit and receive digital assets via the IoT network. The edge device communicates with an IoT device and can be various types of smart devices capable of displaying and interacting with digital content. The communication paths in the system can be optimized for latency and bandwidth efficiency.

Figure 28:
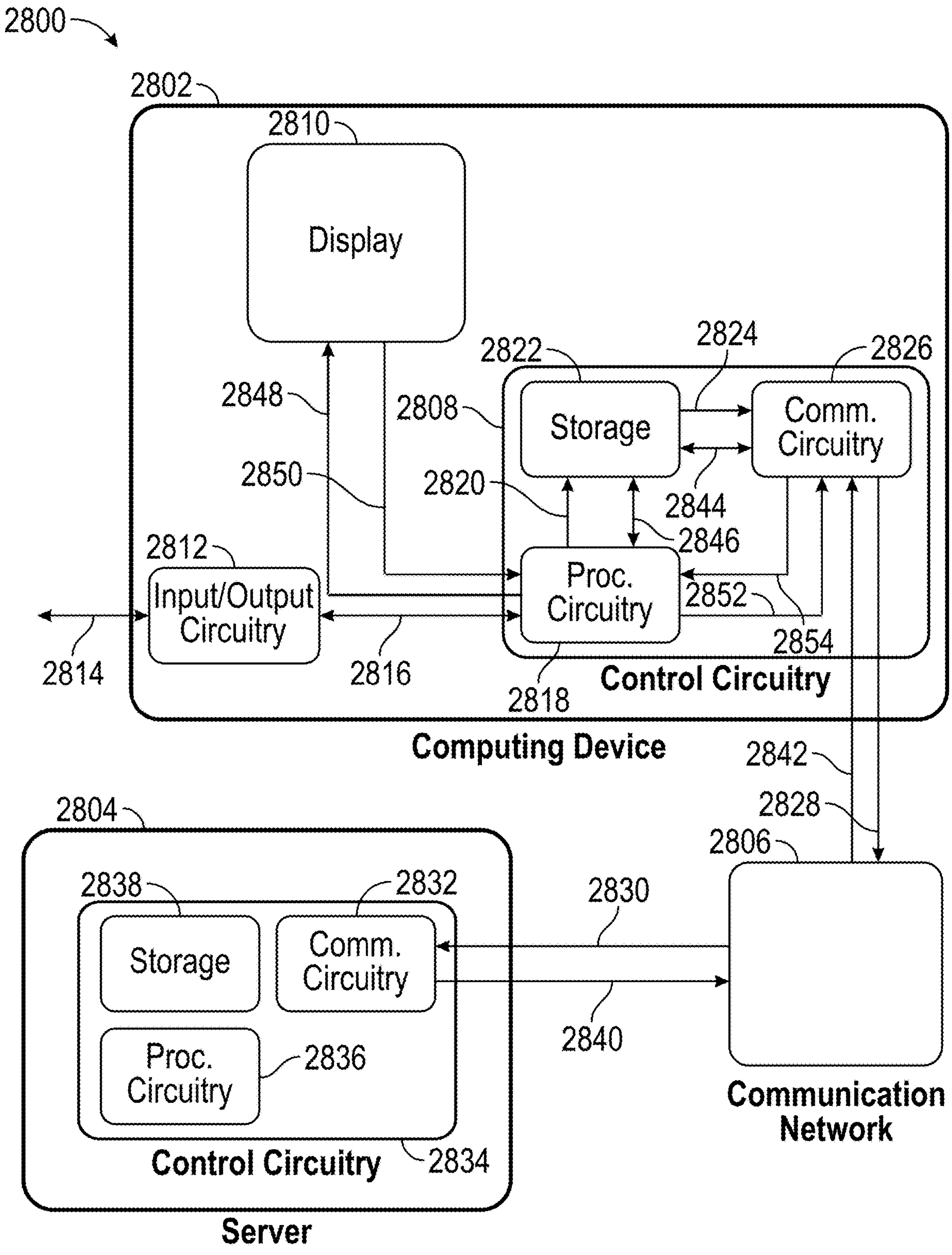
FIG. 28 depicts a system including a server, a communication network, and a computing device for performing the methods and processes, in accordance with some embodiments of the disclosure.

FIG. 28 depicts a block diagram of system 2800, in accordance with some embodiments. The system is shown to include computing device 2802, server 2804, and a communication network 2806. It is understood that while a single instance of a component may be shown and described relative to FIG. 28, additional embodiments of the component may be employed. For example, server 2804 may include, or may be incorporated in, more than one server. Similarly, communication network 2806 may include, or may be incorporated in, more than one communication network. Server 2804 is shown communicatively coupled to computing device 2802 through communication network 2806. While not shown in FIG. 28, server 2804 may be directly communicatively coupled to computing device 2802, for example, in a system absent or bypassing communication network 2806.

Communication network 2806 may include one or more network systems, such as, without limitation, the internet, LAN, Wi-Fi, wireless, or other network systems suitable for audio processing applications. The system 2800 of FIG. 28 excludes server 2804, and functionality that would otherwise be implemented by server 2804 is instead implemented by other components of the system depicted by FIG. 28, such as one or more components of communication network 2806. In still other embodiments, server 2804 works in conjunction with one or more components of communication network 2806 to implement certain functionality described herein in a distributed or cooperative manner. Similarly, the system depicted by FIG. 28 excludes computing device 2802, and functionality that would otherwise be implemented by computing device 2802 is instead implemented by other components of the system depicted by FIG. 28, such as one or more components of communication network 2806 or server 2804 or a combination of the same. In other embodiments, computing device 2802 works in conjunction with one or more components of communication network 2806 or server 2804 to implement certain functionality described herein in a distributed or cooperative manner.

Computing device 2802 includes control circuitry 2808, display 2810 and I/O circuitry 2812. Control circuitry 2808 may be based on any suitable processing circuitry and includes control circuits and memory circuits, which may be disposed on a single integrated circuit or may be discrete components. As referred to herein, processing circuitry should be understood to mean circuitry based on at least one microprocessors, microcontrollers, digital signal processors, programmable logic devices, field-programmable gate arrays (FPGAs), application-specific integrated circuits (ASICs), system-on-chip (SoC), application-specific standard parts (ASSPs), indium phosphide (InP)-based monolithic integration and silicon photonics, non-classical devices, organic semiconductors, compound semiconductors, "More Moore" devices, "More than Moore" devices, cloud-computing devices, combinations of the same, or the like, and may include a multi-core processor (e.g., dual-core, quad-core, hexa-core, or any suitable number of cores). In some embodiments, processing circuitry may be distributed across multiple separate processors or processing units, for example, multiple of the same type of processing units (e.g., two Intel Core i9 processors) or multiple different processors (e.g., an Intel Core i7 processor and an Intel Core i9 processor). Some control circuits may be implemented in hardware, firmware, or software. Control circuitry 2808 in turn includes communication circuitry 2826, storage 2822 and processing circuitry 2818. Either of control circuitry 2808 and 2834 may be utilized to execute or perform any or all the systems, methods, processes, and outputs of one or more of FIGS. 1-27, or any combination of steps thereof (e.g., as enabled by processing circuitries 2818 and 2836, respectively).

In addition to control circuitry 2808 and 2834, computing device 2802 and server 2804 may each include storage (storage 2822, and storage 2838, respectively). Each of storages 2822 and 2838 may be an electronic storage device. As referred to herein, the phrase "electronic storage device" or "storage device" should be understood to mean any device for storing electronic data, computer software, or firmware, such as random-access memory, read-only memory, cloud-based storage, hard drives, optical drives, digital video disc (DVD) recorders, compact disc (CD) recorders, BLU-RAY disc (BD) recorders, BLU-RAY 3D disc recorders, digital video recorders (DVRs, sometimes called personal video recorders, or PVRs), solid state devices, quantum storage devices, gaming consoles, gaming media, or any other suitable fixed or removable storage devices, and/or any combination of the same. Each of storage 2822 and 2838 may be used to store several types of content, metadata, and/or other types of data. Non-volatile memory may also be used (e.g., to launch a boot-up routine and other instructions). Cloud-based storage may be used to supplement storages 2822 and 2838 or instead of storages 2822 and 2838. In some embodiments, a user profile and messages corresponding to a chain of communication may be stored in one or more of storages 2822 and 2838. Each of storages 2822 and 2838 may be utilized to store commands, for example, such that when each of processing circuitries 2818 and 2836, respectively, are prompted through control circuitries 2808 and 2834, respectively. Either of processing circuitries 2818 or 2836 may execute any of the systems, methods, processes, and outputs of one or more of FIGS. 1-27, or any combination of steps thereof.

In some embodiments, control circuitry 2808 and/or 2834 executes instructions for an application stored in memory (e.g., storage 2822 and/or storage 2838). Specifically, control circuitry 2808 and/or 2834 may be instructed by the application to perform the functions discussed herein. In some embodiments, any action performed by control circuitry 2808 and/or 2834 may be based on instructions received from the application. For example, the application may be implemented as software or a set of and/or one or more executable instructions that may be stored in storage 2822 and/or 2838 and executed by control circuitry 2808 and/or 2834. The application may be a client/server application where only a client application resides on computing device 2802, and a server application resides on server 2804.

The application may be implemented using any suitable architecture. For example, it may be a stand-alone application wholly implemented on computing device 2802. In such an approach, instructions for the application are stored locally (e.g., in storage 2822), and data for use by the application is downloaded on a periodic basis (e.g., from an out-of-band feed, from an internet resource or using another suitable approach). Control circuitry 2808 may retrieve instructions for the application from storage 2822 and process the instructions to perform the functionality described herein. Based on the processed instructions, control circuitry 2808 may determine a type of action to perform based at least in part on input received from I/O circuitry 2812 or from communication network 2806.

The computing device 2802 is configured to communicate with an I/O device (not shown) via the I/O circuitry 2812. In some embodiments, the user input 2814 is received from the I/O device. A wired and/or wireless connection between the I/O circuitry 2812 and the I/O device is provided in some embodiments. The I/O device may be, for example, at least one of a keyboard, a mouse, a touchscreen, a microphone, a scanner, a joystick, a graphics tablet, a monitor, a printer, speakers, headphones, a projector, a headset, a wearable device, a gaming controller, an external hard drive, a USB hard drive, an SD card, a network interface card (NIC), combinations of the same, or the like.

In client/server-based embodiments, control circuitry 2808 may include communication circuitry suitable for communicating with an application server (e.g., server 2804) or other networks or servers. The instructions for conducting the functionality described herein may be stored on the application server. Communication circuitry may include a cable modem, an Ethernet card, or a wireless modem for communication with other equipment, or any other suitable communication circuitry. Such communication may involve the internet or any other suitable communication networks or paths (e.g., communication network 2806). In another example of a client/server-based application, control circuitry 2808 runs a web browser that interprets web pages provided by a remote server (e.g., server 2804). For example, the remote server may store the instructions for the application in a storage device.

The remote server may process the stored instructions using circuitry (e.g., control circuitry 2834) and/or generate displays. Computing device 2802 may receive the displays generated by the remote server and may display the content of the displays locally via display 2810. For example, display 2810 may be utilized to present a string of characters. This way, the processing of the instructions is performed remotely (e.g., by server 2804) while the resulting displays, such as the display windows described elsewhere herein, are provided locally on computing device 2804. Computing device 2802 may receive inputs from the user via input/output circuitry 2812 and transmit those inputs to the remote server for processing and generating the corresponding displays.

Alternatively, computing device 2802 may receive inputs from the user via input/output circuitry 2812 and process and display the received inputs locally, by control circuitry 2808 and display 2810, respectively. For example, input/output circuitry 2812 may correspond to a keyboard and/or a set of and/or one or more speakers/microphones which are used to receive user inputs (e.g., input as displayed in a search bar or a display of FIG. 28 on a computing device). Input/output circuitry 2812 may also correspond to a communication link between display 2810 and control circuitry 2808 such that display 2810 updates based at least in part on inputs received via input/output circuitry 2812 (e.g., simultaneously update what is shown in display 2810 based on inputs received by generating corresponding outputs based on instructions stored in memory via a non-transitory, computer-readable medium).

Server 2804 and computing device 2802 may transmit and receive content and data such as media content via communication network 2806. For example, server 2804 may be a media content provider, and computing device 2802 may be a smart television configured to download or stream media content, such as a live news broadcast, from server 2804. Control circuitry 2834, 2808 may send and receive commands, requests, and other suitable data through communication network 2806 using communication circuitry 2832, 2826, respectively. Alternatively, control circuitry 2834, 2808 may communicate directly with each other using communication circuitry 2832, 2826, respectively, avoiding communication network 2806.

It is understood that computing device 2802 is not limited to the embodiments and methods shown and described herein. In nonlimiting examples, computing device 2802 may be a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a handheld computer, a stationary telephone, a personal digital assistant (PDA), a mobile telephone, a portable video player, a portable music player, a portable gaming machine, a smartphone, or any other device, computing equipment, or wireless device, and/or combination of the same, capable of suitably displaying and manipulating media content.

Computing device 2802 receives user input 2814 at input/output circuitry 2812. For example, computing device 2802 may receive a user input such as a user swipe or user touch. It is understood that computing device 2802 is not limited to the embodiments and methods shown and described herein.

User input 2814 may be received from a user selection-capturing interface that is separate from device 2802, such as a remote-control device, trackpad, or any other suitable user movement-sensitive, audio-sensitive or capture devices, or as part of device 2802, such as a touchscreen of display 2810. Transmission of user input 2814 to computing device 2802 may be accomplished using a wired connection, such as an audio cable, USB cable, ethernet cable and the like attached to a corresponding input port at a local device, or may be accomplished using a wireless connection, such as Bluetooth, Wi-Fi, WiMAX, GSM, UTMS, CDMA, TDMA, 8G, 4G, 4G LTE, 5G, NearLink, ultra-wideband technology, or any other suitable wireless transmission protocol. Input/output circuitry 2812 may include a physical input port such as a 12.5 mm (0.4921 inch) audio jack, RCA audio jack, USB port, ethernet port, or any other suitable connection for receiving audio over a wired connection or may include a wireless receiver configured to receive data via Bluetooth, Wi-Fi, WiMAX, GSM, UTMS, CDMA, TDMA, 3G, 4G, 4G LTE, 5G, NearLink, ultra-wideband technology, or other wireless transmission protocols.

Processing circuitry 2818 may receive user input 2814 from input/output circuitry 2812 using communication path 2816. Processing circuitry 2818 may convert or translate the received user input 2814 that may be in the form of audio data, visual data, gestures, or movement to digital signals. In some embodiments, input/output circuitry 2812 performs the translation to digital signals. In some embodiments, processing circuitry 2818 (or processing circuitry 2836, as the case may be) conducts disclosed processes and methods.

Processing circuitry 2818 may provide requests to storage 2822 by communication path 2820. Storage 2822 may provide requested information to processing circuitry 2818 by communication path 2846. Storage 2822 may transfer a request for information to communication circuitry 2826 which may translate or encode the request for information to a format receivable by communication network 2806 before transferring the request for information by communication path 2828. Communication network 2806 may forward the translated or encoded request for information to communication circuitry 2832, by communication path 2830.

At communication circuitry 2832, the translated or encoded request for information, received through communication path 2830, is translated or decoded for processing circuitry 2836, which will provide a response to the request for information based on information available through control circuitry 2834 or storage 2838, or a combination thereof. The response to the request for information is then provided back to communication network 2806 by communication path 2840 in an encoded or translated format such that communication network 2806 forwards the encoded or translated response back to communication circuitry 2826 by communication path 2842.

At communication circuitry 2826, the encoded or translated response to the request for information may be provided directly back to processing circuitry 2818 by communication path 2854 or may be provided to storage 2822 through communication path 2844, which then provides the information to processing circuitry 2818 by communication path 2846. Processing circuitry 2818 may also provide a request for information directly to communication circuitry 2826 through communication path 2852, where storage 2822 responds to an information request (provided through communication path 2820 or 2844) by communication path 2824 or 2846 that storage 2822 does not contain information pertaining to the request from processing circuitry 2818.

Processing circuitry 2818 may process the response to the request received through communication paths 2846 or 2854 and may provide instructions to display 2810 for a notification to be provided to the users through communication path 2848. Display 2810 may incorporate a timer for providing the notification or may rely on inputs through input/output circuitry 2812 from the user, which are forwarded through processing circuitry 2818 through communication path 2848, to determine how long or in what format to provide the notification. When display 2810 determines the display has been completed, a notification may be provided to processing circuitry 2818 through communication path 2850.

The communication paths provided in FIG. 28 between computing device 2802, server 2804, communication network 2806, and all subcomponents depicted are examples and may be modified to reduce processing time or enhance processing capabilities for each step in the processes disclosed herein by one skilled in the art.

Terminology

The terminology used herein is for the purpose of describing particular embodiments only and is not intended to be limiting of the disclosure.

It is to be understood that various terms relating to latency may be understood as set forth in the following. These latency terms are not intended to be limiting but exemplary. "High" latency is, e.g., about 45 seconds or more. An example of this is DASH and/or HLS with 10-second segments. "Typical" latency ranges, e.g., from about 10 to about 45 seconds. This can be seen in DASH and/or HLS with 6-second segments. DASH and/or HLS with 2-second segments falls between low latency and typical latency. "Low" latency is, e.g., between about 1 and 10 seconds. Examples include DASH and/or HLS with fragmented or 1-second segments, cable, IPTV, satellite, over-the-air broadcast, social media, messaging, live sports, game streaming, and eSports. Online gambling, betting, and auctioning fall between ultra-low latency and low latency. "Ultra-low" latency is, e.g., about 100 milliseconds to about 1 second. Cloud gaming, videoconferencing, and Voice over IP (VOIP) straddle the line between near-real-time latency and ultra-low latency. "Near-real-time" latency is, e.g., less than about 100 milliseconds. An example of this is surgical robots. Other examples include different game genres. For example, for a role playing fantasy game, a latency of less than about 100 milliseconds is likely sufficient. Whereas, in a first-person shooter game, end-to-end latency below about 40 milliseconds is desirable. In another example, VR cloud gaming pushes these latencies even lower to below about 20 milliseconds.

Throughout the specification the term "comprising" shall be understood to have a broad meaning similar to the term "including" and will be understood to imply the inclusion of a stated integer or step or group of integers or steps but not the exclusion of any other integer or step or group of integers or steps. This definition also applies to variations on the term "comprising" such as "comprise" and "comprises."

Throughout the specification the phrases "in response to" and "based on" shall be understood to have a broad meaning unless context requires otherwise. For example, "in response to" can refer to a step that is in direct or indirect response to a prior step, and "based on" can refer to a step that is based at least in part on a prior step.

As used herein, the terms "real time," "simultaneous," "substantially on-demand," and the like are understood to be nearly instantaneous but may include delay due to practical limits of the system. Such delays may be in the order of milliseconds or microseconds, depending on the application and nature of the processing. Relatively longer delays (e.g., greater than a millisecond) may result due to communication or processing delays, particularly in remote and cloud-computing environments.

As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Although at least some embodiments are described as using a plurality of units or modules to perform a process or processes, it is understood that the process or processes may also be performed by one or a plurality of units or modules. Additionally, it is understood that the term controller/control unit may refer to a hardware device that includes a memory and a processor. The memory may be configured to store the units or the modules, and the processor may be specifically configured to execute said units or modules to perform one or more processes which are described herein.

Unless specifically stated or obvious from context, as used herein, the term "about" is understood as within a range of normal tolerance in the art, for example within 2 standard deviations of the mean. "About" may be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

The use of the terms "first", "second", "third", and so on, herein, are provided to identify structures or operations, without describing an order of structures or operations, and, to the extent the structures or operations are used in an embodiment, the structures may be provided or the operations may be executed in a different order from the stated order unless a specific order is definitely specified in the context.

The methods and/or any instructions for performing any of the embodiments discussed herein may be encoded on computer-readable media. Computer-readable media includes any media capable of storing data. The computer-readable media may be transitory, including, but not limited to, propagating electrical or electromagnetic signals, or may be non-transitory (e.g., a non-transitory, computer-readable medium accessible by an application via control or processing circuitry from storage) including, but not limited to, volatile and non-volatile computer memory or storage devices such as a hard disk, floppy disk, USB drive, DVD, CD, media cards, register memory, processor caches, random-access memory (RAM), UltraRAM, cloud-based storage, and the like.

The interfaces, processes, and analysis described may, in some embodiments, be performed by an application. The application may be loaded directly onto each device of any of the systems described or may be stored in a remote server or any memory and processing circuitry accessible to each device in the system. The generation of interfaces and analysis there-behind may be performed at a receiving device, a sending device, or some device or processor therebetween.

Any use of a phrase such as "in some embodiments" or the like with reference to a feature is not intended to link the feature to another feature described using the same or a similar phrase. Any and all embodiments disclosed herein are combinable or separately practiced as appropriate. Absence of the phrase "in some embodiments" does not infer that the feature is necessary. Inclusion of the phrase "in some embodiments" does not infer that the feature is not applicable to other embodiments or even all embodiments.

The systems and processes discussed herein are intended to be illustrative and not limiting. One skilled in the art would appreciate that the actions of the processes discussed herein may be omitted, modified, combined, duplicated, rearranged, and/or substituted, and any additional actions may be performed without departing from the scope of the invention. More generally, the disclosure herein is meant to provide examples and is not limiting. Only the claims that follow are meant to set bounds as to what the present disclosure includes. Furthermore, it should be noted that the features and limitations described in any some embodiments may be applied to any other embodiment herein, and flowcharts or examples relating to some embodiments may be combined with any other embodiment in a suitable manner, done in different orders, or done in parallel. In addition, the methods and systems described herein may be performed in real time. It should also be noted that the methods and/or systems described herein may be applied to, or used in accordance with, other methods and/or systems.

This description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method for controlling video encoding in an encoding system for delivery of content, the method comprising:

instantiating one or more frame-synced parallel encoders based at least in part on a complexity of at least one of a picture, a portion of the picture, or a residue of the picture and an amount of motion from picture to picture over a look-back period;

providing a range of initial quantization parameter (QP) values to the instantiated one or more frame-synced parallel encoders;

encoding a picture with each of the instantiated one or more frame-synced parallel encoders into an encoded picture;

calculating a size of each encoded picture of the instantiated one or more frame-synced parallel encoders;

based at least in part on the size of each encoded picture of the instantiated one or more frame-synced parallel encoders, selecting one of the each encoded picture of the instantiated one or more frame-synced parallel encoders; and causing delivery of the selected one of each encoded picture of the instantiated one or more frame-synced parallel encoders.

2. The method of claim 1, wherein the selecting which encoded picture of the instantiated one or more frame-synced parallel encoders to deliver is based at least in part on a highest available picture quality and a lowest available latency of the encoding of the picture or a derivative of a speed of delivery of the encoded picture.

3. The method of claim 1, wherein the initial QP values are determined based at least in part on a complexity estimation system and a size of a virtual buffer model.

4. The method of claim 3, further comprising:

controlling the size of the virtual buffer model through an application programming interface (API); and adjusting the virtual buffer model based at least in part on changing latency requirements, wherein:

the API is configured with one or more predefined latency thresholds, and the controlling the size of the virtual buffer model is based at least in part on the one or more predefined latency thresholds.

5. The method of claim 3, wherein the size of the virtual buffer model is dynamically adjusted based at least in part on real-time feedback.

6. The method of claim 1, wherein a number of the instantiated one or more frame-synced parallel encoders is directly proportional to a determined complexity and the amount of motion from picture to picture.

7. The method of claim 1, further comprising:

monitoring encoding performance; and adjusting the initial QP values to optimize the encoding performance.

8. The method of claim 1, wherein a rate controller of the encoding system prioritizes a picture for delivery to maintain a highest possible picture quality at a lowest possible latency.

9. The method of claim 1, wherein a rate controller of the encoding system predicts and controls future encoding requirements based at least in part on historical data of picture sizes.

10. The method of claim 1, wherein a rate controller of the encoding system switches between different encoding profiles based at least in part on the complexity and the amount of motion from picture to picture.

11. An encoding system for controlling video encoding for delivery of content, the system comprising:

one or more frame-synced parallel encoders instantiated based at least in part on a complexity of a picture, a portion of the picture, or a residue of the picture and an amount of motion from picture to picture over a look-back period;

a quantization parameter (QP) value provider configured to provide a range of initial QP values to the instantiated one or more frame-synced parallel encoders, wherein each of the instantiated one or more frame-synced parallel encoders is configured to encode a picture into an encoded picture;

a size calculator configured to calculate a size of each encoded picture of the instantiated one or more frame-synced parallel encoders;

a selector configured to select one of the encoded pictures based at least in part on the size of each encoded picture; and a delivery module configured to cause delivery of the selected encoded picture.

12. The system of claim 11, wherein the selector is further configured to select the encoded picture based at least in part on a highest available picture quality and a lowest available latency of the encoding of the picture or a derivative of a speed of delivery of the encoded picture.

13. The system of claim 11, wherein the QP value provider is further configured to determine the initial QP values based at least in part on a complexity estimation system and a size of a virtual buffer model.

14. The system of claim 13, further comprising:

an application programming interface (API) configured to control the size of the virtual buffer model; and an adjustment module configured to adjust the virtual buffer model based at least in part on changing latency requirements, wherein the API is configured with one or more predefined latency thresholds, and the adjustment module is configured to control the size of the virtual buffer model based at least in part on the one or more predefined latency thresholds.

15. The system of claim 14, wherein the adjustment module is further configured to dynamically adjust the size of the virtual buffer model based at least in part on real-time feedback.

16. The system of claim 11, wherein a number of the instantiated one or more frame-synced parallel encoders is directly proportional to a determined complexity and the amount of motion from picture to picture.

17. The system of claim 11, further comprising:

a performance monitor configured to monitor encoding performance; and an adjustment module configured to adjust the initial QP values to optimize the encoding performance.

18. The system of claim 11, wherein a rate controller of the encoding system is configured to prioritize a picture for delivery to maintain a highest possible picture quality at the lowest available latency.

19. The system of claim 11, wherein a rate controller of the encoding system is configured to predict and control future encoding requirements based at least in part on historical data of picture sizes.

20. The system of claim 11, wherein a rate controller of the encoding system is configured to switch between different encoding profiles based at least in part on the complexity and the amount of motion from picture to picture.

* * * * *